US009678601B2

(12) United States Patent
Pettersson et al.

(10) Patent No.: US 9,678,601 B2
(45) Date of Patent: *Jun. 13, 2017

(54) OPTICAL TOUCH SCREENS

(71) Applicant: Neonode Inc., Santa Clara, CA (US)

(72) Inventors: Robert Pettersson, Huddinge (SE); Per Rosengren, Solna (SE); Erik Rosengren, Stockholm (SE); Stefan Holmgren, Sollentuna (SE); Lars Sparf, Vällingby (SE); Richard Berglind, Älvsjö (SE); Thomas Eriksson, Stockholm (SE); Karl Erik Patrik Nordström, Huddinge (SE); Gunnar Martin Fröjdh, Dalarö (SE); Xiatao Wang, Solna (SE); Remo Behdasht, Ugchelen (NL)

(73) Assignee: Neonode Inc., San Jose, CA (US)

( * ) Notice: Subject to any disclaimer, the term of this patent is extended or adjusted under 35 U.S.C. 154(b) by 68 days.

This patent is subject to a terminal disclaimer.

(21) Appl. No.: 14/726,533

(22) Filed: May 31, 2015

(65) Prior Publication Data

US 2015/0261339 A1    Sep. 17, 2015

Related U.S. Application Data

(63) Continuation of application No. 14/311,366, filed on Jun. 23, 2014, now Pat. No. 9,063,614, which is a
(Continued)

(51) Int. Cl.
*G06F 3/042* (2006.01)
*G06F 3/041* (2006.01)
*G06F 3/0354* (2013.01)

(52) U.S. Cl.
CPC .......... *G06F 3/042* (2013.01); *G06F 3/03547* (2013.01); *G06F 3/0416* (2013.01);
(Continued)

(58) Field of Classification Search
CPC .... G06F 3/042; G06F 3/03547; G06F 3/0425; G06F 3/0421; G06F 3/0428;
(Continued)

(56) References Cited

U.S. PATENT DOCUMENTS 4,243,879 A    1/1981    Carroll et al.
4,267,443 A    5/1981    Carroll et al.
(Continued)

FOREIGN PATENT DOCUMENTS

EP    0601651 A1    6/1994
EP    1906632 A1    4/2008
(Continued)

OTHER PUBLICATIONS

Moeller et al., ZeroTouch: An Optical Multi-Touch and Free-Air Interaction Architecture, Proc. CHI 2012 Proceedings of the 2012 Annual Conference Extended Abstracts on Human Factors in Computing Systems, ACM, New York, NY, pp. 2165-2174, May 5, 2012.
(Continued)

*Primary Examiner* — Adam R Giesy
(74) *Attorney, Agent, or Firm* — Soquel Group LLC

(57) ABSTRACT

Activating a plurality of light emitters and light detectors around a screen, each emitter-detector pair corresponding to a light path crossing the screen, wherein some of the light paths are blocked when one or more objects touch the screen, providing a look-up table, listing, for each cell from a plurality of cells, those light paths that traverse that cell when no object is touching the screen, wherein the cells partition the screen, for each cell: accessing the look-up table to identify those light paths that traverse that cell, determining whether the thus-identified light paths are blocked during the activating and, if affirmative, recognizing that cell as being a touched cell, and combining adjacent touched cells into a common touch location, thereby calcu-
(Continued)

lating one or more touch locations wherein each touch location is a combination of one or more constituent touched cells.

12 Claims, 84 Drawing Sheets

Related U.S. Application Data continuation of application No. PCT/US2014/040579, filed on Jun. 3, 2014, and a continuation-in-part of application No. 13/052,511, filed on Mar. 21, 2011, now Pat. No. 9,471,170, which is a continuation-in-part of application No. 12/371,609, filed on Feb. 15, 2009, now Pat. No. 8,339,379, and a continuation-in-part of application No. 12/760,567, filed on Apr. 15, 2010, now Pat. No. 9,213,443, and a continuation-in-part of application No. 12/760,568, filed on Apr. 15, 2010, now abandoned.

(60) Provisional application No. 61/830,671, filed on Jun. 4, 2013, provisional application No. 61/833,161, filed on Jun. 10, 2013, provisional application No. 61/911,915, filed on Dec. 4, 2013, provisional application No. 61/919,759, filed on Dec. 22, 2013, provisional application No. 61/923,775, filed on Jan. 6, 2014, provisional application No. 61/950,868, filed on Mar. 11, 2014, provisional application No. 61/379,012, filed on Sep. 1, 2010, provisional application No. 61/380,600, filed on Sep. 7, 2010, provisional application No. 61/410,930, filed on Nov. 7, 2010, provisional application No. 61/169,779, filed on Apr. 16, 2009.

(52) U.S. Cl.
CPC .......... *G06F 3/0421* (2013.01); *G06F 3/0425* (2013.01); *G06F 3/0428* (2013.01); *G06F 2203/04102* (2013.01); *G06F 2203/04104* (2013.01); *G06F 2203/04109* (2013.01)

(58) Field of Classification Search
CPC ......... G06F 3/0416; G06F 2203/04109; G06F 2203/04102; G06F 2203/04104
See application file for complete search history.

(56) References Cited

U.S. PATENT DOCUMENTS

| | | |
|---|---|---|
| 4,301,447 A | 11/1981 | Funk et al. |
| 4,588,258 A | 5/1986 | Hoopman |
| 4,641,426 A | 2/1987 | Hartman et al. |
| 4,672,364 A | 6/1987 | Lucas |
| 4,703,316 A | 10/1987 | Sherbeck |
| 4,761,637 A | 8/1988 | Lucas et al. |
| 4,928,094 A | 5/1990 | Smith |
| 5,036,187 A | 7/1991 | Yoshida et al. |
| 5,162,783 A | 11/1992 | Moreno |
| 5,194,863 A | 3/1993 | Barker et al. |
| 5,220,409 A | 6/1993 | Bures |
| 5,414,413 A | 5/1995 | Tamaru et al. |
| 5,559,727 A | 9/1996 | Deley et al. |
| 5,577,733 A | 11/1996 | Downing |
| 5,603,053 A | 2/1997 | Gough et al. |
| 5,729,250 A | 3/1998 | Bishop et al. |
| 5,748,185 A | 5/1998 | Stephan et al. |
| 5,825,352 A | 10/1998 | Bisset et al. |
| 5,880,462 A | 3/1999 | Hsia |
| 5,889,236 A | 3/1999 | Gillespie et al. |
| 5,914,709 A | 6/1999 | Graham et al. |
| 5,936,615 A | 8/1999 | Waters |
| 5,943,044 A | 8/1999 | Martinelli et al. |
| 5,946,134 A | 8/1999 | Benson et al. |
| 5,988,645 A | 11/1999 | Downing |
| 6,010,061 A | 1/2000 | Howell |
| 6,091,405 A | 7/2000 | Lowe et al. |
| 6,333,735 B1 | 12/2001 | Anvekar |
| 6,340,979 B1 | 1/2002 | Beaton et al. |
| 6,362,468 B1 | 3/2002 | Murakami et al. |
| 6,421,042 B1 | 7/2002 | Omura et al. |
| 6,429,857 B1 | 8/2002 | Masters et al. |
| 6,690,365 B2 | 2/2004 | Hinckley et al. |
| 6,690,387 B2 | 2/2004 | Zimmerman et al. |
| 6,707,449 B2 | 3/2004 | Hinckley et al. |
| 6,757,002 B1 | 6/2004 | Oross et al. |
| 6,788,292 B1 | 9/2004 | Nako et al. |
| 6,803,906 B1 | 10/2004 | Morrison et al. |
| 6,836,367 B2 | 12/2004 | Seino et al. |
| 6,864,882 B2 | 3/2005 | Newton |
| 6,947,032 B2 | 9/2005 | Morrison et al. |
| 6,954,197 B2 | 10/2005 | Morrison et al. |
| 6,972,401 B2 | 12/2005 | Akitt et al. |
| 6,972,834 B1 | 12/2005 | Oka et al. |
| 7,030,861 B1 | 4/2006 | Westerman et al. |
| 7,133,032 B2 | 11/2006 | Cok |
| 7,170,590 B2 | 1/2007 | Kishida |
| 7,176,905 B2 | 2/2007 | Baharav et al. |
| 7,184,030 B2 | 2/2007 | McCharles et al. |
| 7,339,580 B2 | 3/2008 | Westerman et al. |
| 7,352,940 B2 | 4/2008 | Charters et al. |
| 7,369,724 B2 | 5/2008 | Deane |
| 7,372,456 B2 | 5/2008 | McLintock |
| 7,429,706 B2 | 9/2008 | Ho |
| 7,855,716 B2 | 12/2010 | McCreary et al. |
| 8,022,941 B2 | 9/2011 | Smoot |
| 8,120,625 B2 | 2/2012 | Hinckley |
| 8,139,045 B2 | 3/2012 | Jang et al. |
| 8,243,047 B2 | 8/2012 | Chiang et al. |
| 8,269,740 B2 | 9/2012 | Sohn et al. |
| 8,350,831 B2 | 1/2013 | Drumm |
| 8,482,547 B2 | 7/2013 | Christiansson et al. |
| 8,508,505 B2 | 8/2013 | Shin et al. |
| 8,581,884 B2 | 11/2013 | Fahraeus et al. |
| 9,292,132 B2 | 3/2016 | An et al. |
| 2001/0002694 A1 | 6/2001 | Nakazawa et al. |
| 2001/0022579 A1 | 9/2001 | Hirabayashi |
| 2001/0026268 A1 | 10/2001 | Ito |
| 2001/0028344 A1 | 10/2001 | Iwamoto et al. |
| 2001/0055006 A1 | 12/2001 | Sano et al. |
| 2002/0067348 A1 | 6/2002 | Masters et al. |
| 2002/0109843 A1 | 8/2002 | Ehsani et al. |
| 2002/0175900 A1 | 11/2002 | Armstrong |
| 2003/0231308 A1 | 12/2003 | Granger |
| 2003/0234346 A1 | 12/2003 | Kao |
| 2004/0046960 A1 | 3/2004 | Wagner et al. |
| 2004/0140961 A1 | 7/2004 | Cok |
| 2004/0201579 A1 | 10/2004 | Graham |
| 2005/0073508 A1 | 4/2005 | Pittel et al. |
| 2005/0104860 A1 | 5/2005 | McCreary et al. |
| 2005/0122308 A1 | 6/2005 | Bell et al. |
| 2005/0174473 A1 | 8/2005 | Morgan et al. |
| 2005/0271319 A1 | 12/2005 | Graham |
| 2006/0001654 A1 | 1/2006 | Smits |
| 2006/0018586 A1 | 1/2006 | Kishida |
| 2006/0132454 A1 | 6/2006 | Chen et al. |
| 2006/0161870 A1 | 7/2006 | Hotelling et al. |
| 2006/0161871 A1 | 7/2006 | Hotelling et al. |
| 2006/0229509 A1 | 10/2006 | Al-Ali et al. |
| 2007/0024598 A1 | 2/2007 | Miller et al. |
| 2007/0052693 A1 | 3/2007 | Watari |
| 2007/0084989 A1 | 4/2007 | Lange et al. |
| 2007/0146318 A1 | 6/2007 | Juh et al. |
| 2007/0152984 A1 | 7/2007 | Ording et al. |
| 2007/0176908 A1 | 8/2007 | Lipman et al. |
| 2008/0008472 A1 | 1/2008 | Dress et al. |
| 2008/0012850 A1 | 1/2008 | Keating, III |
| 2008/0013913 A1 | 1/2008 | Lieberman et al. |
| 2008/0055273 A1 | 3/2008 | Forstall |
| 2008/0056068 A1 | 3/2008 | Yeh et al. |

(56) References Cited

U.S. PATENT DOCUMENTS

| | | |
|---|---|---|
| 2008/0068353 A1 | 3/2008 | Lieberman et al. |
| 2008/0080811 A1 | 4/2008 | Deane |
| 2008/0093542 A1 | 4/2008 | Lieberman et al. |
| 2008/0100593 A1 | 5/2008 | Skillman et al. |
| 2008/0117183 A1 | 5/2008 | Yu et al. |
| 2008/0122792 A1 | 5/2008 | Izadi et al. |
| 2008/0122796 A1 | 5/2008 | Jobs et al. |
| 2008/0122803 A1 | 5/2008 | Izadi et al. |
| 2008/0158174 A1 | 7/2008 | Land et al. |
| 2008/0221711 A1 | 9/2008 | Trainer |
| 2008/0259053 A1 | 10/2008 | Newton |
| 2008/0273019 A1 | 11/2008 | Deane |
| 2008/0278460 A1 | 11/2008 | Arnett et al. |
| 2008/0297487 A1 | 12/2008 | Hotelling et al. |
| 2009/0027357 A1 | 1/2009 | Morrison |
| 2009/0058833 A1 | 3/2009 | Newton |
| 2009/0066673 A1 | 3/2009 | Molne et al. |
| 2009/0096994 A1 | 4/2009 | Smits |
| 2009/0102815 A1 | 4/2009 | Juni |
| 2009/0135162 A1 | 5/2009 | Van De Wijdeven et al. |
| 2009/0139778 A1 | 6/2009 | Butler et al. |
| 2009/0153519 A1 | 6/2009 | Suarez Rovere |
| 2009/0167724 A1 | 7/2009 | Xuan et al. |
| 2010/0002291 A1 | 1/2010 | Fukuyama |
| 2010/0079407 A1 | 4/2010 | Suggs |
| 2010/0079409 A1 | 4/2010 | Sirotich et al. |
| 2010/0079410 A1 | 4/2010 | Chiang et al. |
| 2010/0095234 A1 | 4/2010 | Lane et al. |
| 2010/0149073 A1 | 6/2010 | Chaum et al. |
| 2010/0289755 A1 | 11/2010 | Zhu et al. |
| 2010/0295821 A1 | 11/2010 | Chang et al. |
| 2010/0302185 A1 | 12/2010 | Han et al. |
| 2011/0043826 A1 | 2/2011 | Kiyose |
| 2011/0044579 A1 | 2/2011 | Travis et al. |
| 2011/0050639 A1 | 3/2011 | Challener et al. |
| 2011/0050650 A1 | 3/2011 | McGibney et al. |
| 2011/0057906 A1 | 3/2011 | Raynor et al. |
| 2011/0063214 A1 | 3/2011 | Knapp |
| 2011/0074734 A1 | 3/2011 | Wassvik et al. |
| 2011/0074736 A1 | 3/2011 | Takakura |
| 2011/0075418 A1 | 3/2011 | Mallory et al. |
| 2011/0090176 A1 | 4/2011 | Christiansson et al. |
| 2011/0116104 A1 | 5/2011 | Kao et al. |
| 2011/0157097 A1 | 6/2011 | Hamada et al. |
| 2011/0163956 A1 | 7/2011 | Zdralek |
| 2011/0163996 A1 | 7/2011 | Wassvik et al. |
| 2011/0169780 A1 | 7/2011 | Goertz et al. |
| 2011/0175533 A1 | 7/2011 | Holman et al. |
| 2011/0175852 A1 | 7/2011 | Goertz et al. |
| 2011/0179368 A1 | 7/2011 | King et al. |
| 2011/0205175 A1 | 8/2011 | Chen |
| 2011/0205186 A1 | 8/2011 | Newton et al. |
| 2011/0216040 A1 | 9/2011 | Yen et al. |
| 2011/0221706 A1 | 9/2011 | McGibney et al. |
| 2011/0227487 A1 | 9/2011 | Nichol et al. |
| 2011/0227874 A1 | 9/2011 | Fahraeus et al. |
| 2011/0242056 A1 | 10/2011 | Lee et al. |
| 2011/0248151 A1 | 10/2011 | Holcombe et al. |
| 2012/0050226 A1 | 3/2012 | Kato |
| 2012/0056821 A1 | 3/2012 | Goh |
| 2012/0068971 A1 | 3/2012 | Pemberton-Pigott |
| 2012/0068973 A1 | 3/2012 | Christiansson et al. |
| 2012/0086672 A1 | 4/2012 | Tseng et al. |
| 2012/0098753 A1 | 4/2012 | Lu |
| 2012/0098794 A1 | 4/2012 | Kleinert et al. |
| 2012/0176343 A1 | 7/2012 | Holmgren et al. |
| 2012/0188203 A1 | 7/2012 | Yao et al. |
| 2012/0188206 A1 | 7/2012 | Sparf et al. |
| 2012/0212457 A1 | 8/2012 | Drumm |
| 2012/0212458 A1 | 8/2012 | Drumm |
| 2012/0218229 A1 | 8/2012 | Drumm |
| 2012/0306793 A1 | 12/2012 | Liu et al. |
| 2013/0021302 A1 | 1/2013 | Drumm |
| 2013/0044071 A1 | 2/2013 | Hu et al. |
| 2013/0127788 A1 | 5/2013 | Drumm |
| 2013/0135259 A1 | 5/2013 | King et al. |
| 2013/0141395 A1 | 6/2013 | Holmgren et al. |
| 2013/0215034 A1 | 8/2013 | Oh et al. |

FOREIGN PATENT DOCUMENTS

| | | | |
|---|---|---|---|
| JP | 11-232024 A | | 8/1999 |
| WO | 8600446 A1 | | 1/1986 |
| WO | 8600447 A1 | | 1/1986 |
| WO | 2008004103 A2 | | 1/2008 |
| WO | 2008133941 A2 | | 11/2008 |
| WO | 2010015408 A1 | | 2/2010 |
| WO | 2010134865 A1 | | 11/2010 |

OTHER PUBLICATIONS

Moeller et al., ZeroTouch: A Zero-Thickness Optical Multi-Touch Force Field, CHI EA '11 Proceedings of the 2011 Annual Conference Extended Abstracts on Human Factors in Computing Systems, ACM, New York, NY, pp. 1165-1170, May 2011.

Moeller et al., IntangibleCanvas: Free-Air Finger Painting on a Projected Canvas, CHI EA '11 Proceedings of the 2011 Annual Conference Extended Abstracts on Human Factors in Computing Systems, ACM, New York, NY, pp. 1615-1620, May 2011.

Moeller et al., Scanning FTIR: Unobtrusive Optoelectronic Multi-Touch Sensing through Waveguide Transmissivity Imaging, TEI '10 Proceedings of the Fourth International Conference on Tangible, Embedded, and Embodied Interaction, ACM, New York, NY, pp. 73-76, Jan. 2010.

Van Loenen et al., Entertaible: A Solution for Social Gaming Experiences, Tangible Play: Research and Design for Tangible and Tabletop Games Workshop, Intelligent User Interfaces Conference 2007, Workshop Proceedings, pp. 16-19, Jan. 28, 2007.

Johnson, Enhanced Optical Touch Input Panel, IBM Technical Disclosure Bulletin vol. 28, No. 4, pp. 1760-1762, Sep. 1985.

Wallace, "LED Optics: Efficient LED collimators have simple design", Jun. 5, 2012. http://www.laserfocusworld.com/articles/print/volume-48/issue-06/world-news/efficient-led-collimators-have-simple-design.html.

U.S. Appl. No. 13/311,366, Notice of Allowance, Jan. 12, 2015, 10 pages.

PCT Application No. PCT/US2014/040579, International Preliminary Report on Patentability, Dec. 8, 2015, 8 pages.

PCT Application No. PCT/US2014/040579, Search Report and Written Opinion, Dec. 5, 2014, 11 pages.

Korean Patent Application No. 10-2015-7036757, Office Action, Nov. 2, 2016, 6 pages.

OPTICAL TOUCH SCREENS

CROSS-REFERENCE TO RELATED APPLICATIONS

This application is a continuation of U.S. patent application Ser. No. 14/311,366, now U.S. Pat. No. 9,063,614, entitled OPTICAL TOUCH SCREENS, and filed on Jun. 23, 2014 by inventors Robert Pettersson, Per Rosengren, Erik Rosengren, Stefan Holmgren, Lars Sparf, Richard Berglind, Thomas Eriksson, Karl Erik Patrik Nordström, Gunnar Martin Fröjdh, Xiatao Wang and Remo Behdasht. U.S. patent application Ser. No. 14/311,366 is a continuation of PCT Patent Application No. PCT/US14/40579, entitled OPTICAL TOUCH SCREENS, and filed on Jun. 3, 2014 by inventors Robert Pettersson, Per Rosengren, Erik Rosengren, Stefan Holmgren, Lars Sparf, Richard Berglind, Thomas Eriksson, Karl Erik Patrik Nordström, Gunnar Martin Fröjdh, Xiatao Wang and Remo Behdasht.

U.S. patent application Ser. No. 14/311,366 is a continuation-in-part of U.S. patent application Ser. No. 13/052,511, now U.S. Pat. No. 9,471,170, entitled LIGHT-BASED TOUCH SCREEN WITH SHIFT-ALIGNED EMITTER AND RECEIVER LENSES, and filed on Mar. 21, 2011 by inventors Magnus Goertz, Thomas Eriksson, Joseph Shain, Anders Jansson, Niklas Kvist, Robert Pettersson, Lars Sparf and John Karlsson.

PCT Patent Application No. PCT/US14/40579 claims priority benefit from:

- U.S. Provisional Patent Application No. 61/830,671, entitled MULTI-TOUCH OPTICAL TOUCH SCREENS WITHOUT GHOST POINTS, and filed on Jun. 4, 2013 by inventors Erik Rosengren, Robert Pettersson, Lars Sparf and Thomas Eriksson;
- U.S. Provisional Patent Application No. 61/833,161, entitled CIRCULAR MULTI-TOUCH OPTICAL TOUCH SCREENS, and filed on Jun. 10, 2013 by inventors Richard Berglind, Erik Rosengren, Robert Pettersson, Lars Sparf, Thomas Eriksson, Gunnar Martin Fröjdh and Xiatao Wang;
- U.S. Provisional Patent Application No. 61/919,759, entitled OPTICAL TOUCH SCREENS WITH TOUCH-SENSITIVE BORDERS, and filed on Dec. 22, 2013 by inventors Remo Behdasht, Erik Rosengren, Robert Pettersson, Lars Sparf, Thomas Eriksson;
- U.S. Provisional Patent Application No. 61/911,915, entitled CIRCULAR MULTI-TOUCH OPTICAL TOUCH SCREENS, and filed on Dec. 4, 2013 by inventors Richard Berglind, Erik Rosengren, Robert Pettersson, Lars Sparf, Thomas Eriksson, Gunnar Martin Fröjdh and Xiatao Wang;
- U.S. Provisional Patent Application No. 61/923,775, entitled MULTI-TOUCH OPTICAL TOUCH SCREENS WITHOUT GHOST POINTS, and filed on Jan. 6, 2014 by inventors Per Rosengren, Stefan Holmgren, Erik Rosengren, Robert Pettersson, Lars Sparf and Thomas Eriksson; and
- U.S. Provisional Patent Application No. 61/950,868, entitled OPTICAL TOUCH SCREENS, and filed on Mar. 11, 2014 by inventors Karl Erik Patrik Nordström, Per Rosengren, Stefan Holmgren, Erik Rosengren, Robert Pettersson, Lars Sparf and Thomas Eriksson.

U.S. patent application Ser. No. 13/052,511 claims priority benefit from:

- U.S. Provisional Patent Application No. 61/379,012, entitled OPTICAL TOUCH SCREEN SYSTEMS USING REFLECTED LIGHT, and filed on Sep. 1, 2010 by inventors Magnus Goertz, Thomas Eriksson, Joseph Shain, Anders Jansson, Niklas Kvist and Robert Pettersson;
- U.S. Provisional Patent Application No. 61/380,600, entitled OPTICAL TOUCH SCREEN SYSTEMS USING REFLECTED LIGHT, and filed on Sep. 7, 2010 by inventors Magnus Goertz, Thomas Eriksson, Joseph Shain, Anders Jansson, Niklas Kvist and Robert Pettersson; and
- U.S. Provisional Patent Application No. 61/410,930, entitled OPTICAL TOUCH SCREEN SYSTEMS USING REFLECTED LIGHT, and filed on Nov. 7, 2010 by inventors Magnus Goertz, Thomas Eriksson, Joseph Shain, Anders Jansson, Niklas Kvist, Robert Pettersson and Lars Sparf.

U.S. patent application Ser. No. 13/052,511 is a continuation-in-part of:

- U.S. patent application Ser. No. 12/371,609, now U.S. Pat. No. 8,339,379, entitled LIGHT-BASED TOUCH SCREEN, and filed on Feb. 15, 2009 by inventors Magnus Goertz, Thomas Eriksson and Joseph Shain;
- U.S. patent application Ser. No. 12/760,567, now U.S. Pat. No. 9,213,443, entitled OPTICAL TOUCH SCREEN SYSTEMS USING REFLECTED LIGHT, and filed on Apr. 15, 2010 by inventors Magnus Goertz, Thomas Eriksson and Joseph Shain;
- U.S. patent application Ser. No. 12/760,568, entitled OPTICAL TOUCH SCREEN SYSTEMS USING WIDE LIGHT BEAMS, and filed on Apr. 15, 2010 by inventors Magnus Goertz, Thomas Eriksson and Joseph Shain.

U.S. patent application Ser. No. 12/760,567 claims priority benefit from U.S. Provisional Patent Application No. 61/169,779, entitled OPTICAL TOUCH SCREEN, and filed on Apr. 16, 2009 by inventors Magnus Goertz, Thomas Eriksson and Joseph Shain.

The contents of all of these applications are hereby incorporated by reference in their entireties.

FIELD OF THE INVENTION

The field of the present invention is light-based touch screens.

BACKGROUND OF THE INVENTION

Many consumer electronic devices are now being built with touch sensitive surfaces (track pad or touch screen), for use with finger or stylus touch user inputs. These devices range from small screen devices such as mobile phones and car entertainment systems, to mid-size screen devices such as notebook computers, to large screen devices such as check-in stations at airports.

In computing, multi-touch refers to a touch sensing surface's ability to recognize the presence of two or more points of contact with the surface. This plural-point awareness is often used to implement advanced functionality such as pinch to zoom or activating predefined programs (Wikipedia, "multi-touch"). The Windows 8 operating system from Microsoft Corporation requires a touch screen supporting a minimum of 5-point digitizers. WINDOWS® is a registered trademark of Microsoft Corporation.

The present invention relates to light-based touch sensitive surfaces. Light-based touch sensitive surfaces surround the surface borders with light emitters and light detectors to create a light beam grid above the surface. An object touching the surface blocks a corresponding portion of the beams.

Reference is made to FIG. 1, which is a diagram of a prior art, light-based touch screen having 16 LEDs and 16 PDs. Screen 801 in FIG. 1 is surrounded by emitters 101 along two edges and photodiode (PD) receivers 201 along the remaining two edges, which together enable a lattice of light beams 300 covering the screen.

Light-based touch detection systems are unable to accurately recognize many instances of two or more points of contact with the surface. Reference is made to FIGS. 2 and 3, which are illustrations of instances of ambiguous multi-touch detections in prior art touch screens. FIGS. 2 and 3 show different instances of two, diagonally opposed touches 901 and 902 that are ambiguous vis-à-vis the light grid of FIG. 1. As shown in FIGS. 2 and 3, the same light beams are blocked in both instances.

There is further ambiguity when more than two objects touch the screen simultaneously. Reference is made to FIGS. 4 and 5, which are illustrations of instances of ghosted touches in prior art touch screens. The two-touch cases shown in FIGS. 2 and 3 are also ambiguous vis-à-vis the three-touch case, 901-903, shown in FIG. 4, and vis-à-vis the four-touch case, 901-904, shown in FIG. 5. In each of the cases illustrated in FIGS. 2-5, row and column PDs a-h show an absence of light in the same locations. The ambiguity illustrated in FIGS. 4 and 5 is caused by "ghosting", which refers to an effect where the shadow of a first object obscures a second object and prevents the second object from being detected.

Light-based touch screens have many advantages over other touch sensor technologies such as capacitive and resistive solutions. Inter alia, light-based touch screens enable lower bill-of-materials cost than capacitive solutions, especially for large screens. Light-based touch screens are also superior to capacitive and resistive solutions in that a light-based touch screen does not require an additional physical layer on top of the screen that impairs the screen image. This is an important advantage for devices employing reflective screens where the brightness of the screen image depends on reflected light, rather than a backlight. Reference is made to U.S. Pat. No. 8,674,966 for ASIC CONTROLLER FOR A LIGHT-BASED TOUCH SCREEN, incorporated herein by reference in its entirety, which teaches faster scan rates for light-based touch screens than are available using prior art capacitive screens. It would be advantageous to provide a light-based touch screen that is operative to detect multi-touch gestures and that is compatible with the requirements of the Windows 8 operating system.

One drawback of prior art light-based touch screens is the need to accommodate the numerous light emitters and light detectors along all four edges of the screen. This requirement makes it difficult to insert light-based touch detection into an existing electronic device without significantly changing the layout of the device's internal components. It would be advantageous to reduce the number of components required and to enable placing them in a limited area rather than surrounding the entire screen. Reducing the total number of light emitters and light detectors required has the added benefit of reducing the bill-of-materials (BOM).

SUMMARY

Embodiments of the present invention provide unambiguous multi-touch detection based on blocked light beams. Other embodiments of the present invention provide 2D touch detection using a one-dimensional array of light emitters along only one edge of the screen and an opposite array of light detectors along the opposite edge of the screen.

There is thus provided in accordance with an embodiment of the present invention a rectangular arrangement of light emitters and light detectors, where light emitters are arranged along two adjacent edges of the rectangular arrangement and light detectors are arranged along the two remaining edges. Light from each emitter is detected by a plurality of the detectors. Each beam from an emitter to a detector traverses a plurality of screen pixels. A table stored in computer memory lists, for each beam, all of the pixels that lie in the beam's path. For each blocked beam, all of the pixels in the beam's path are marked as blocked; and for each non-blocked beam, all of the pixels in the beam's path are marked as unblocked. This creates a map with three types of pixels: fully blocked, fully unblocked and partially blocked. A partially blocked pixel is traversed by several beams, only some of which are blocked. A fully blocked pixel is traversed by several beams, all of which are blocked. The fully blocked pixels correspond to the touch locations. The system then connects adjacent blocked pixels to construct blobs of contiguous blocked pixels. Each blob, or set of contiguous blocked pixels, is treated as a single touch location.

There is additionally provided in accordance with an embodiment of the present invention a touchscreen featuring a row of light emitters along the bottom edge of the screen and a row of light detectors along the top edge of the screen. Each light emitter projects a very wide beam that is detected by all of the light detectors. The x-coordinate of an object touching the screen corresponds to a blocked beam that runs parallel to the side edges of the screen. The y-coordinate is determined by identifying the intersections between diagonal blocked beams.

There is further provided in accordance with an embodiment of the present invention a lens for placement opposite a diode in an optical touch sensor, including an upper portion including an upper refractive surface located nearer to the diode, and an upper reflector located further from the diode, the upper reflector being curved in two dimensions and cut horizontally by a top horizontal plane of the lens, and a lower portion, coplanar with the diode, including a lower refractive surface located nearer to the diode, and a lower reflector located further from the diode, the lower reflector being curved in the two dimensions and cut horizontally by a bottom horizontal plane of the lens, wherein the upper and the lower reflectors are symmetrical and vertically aligned, and wherein non-collimated light reflected by the lower reflector onto the upper reflector is partially collimated in the two dimensions by the lower reflector and further collimated in the two dimensions by the upper reflector.

In cases where the lens' viewing angle of the diode is large, the height of the lens between the top and bottom horizontal planes is less than the height required for a curved reflector, cut vertically by a rear vertical backplane of the lens, to partially collimate and further collimate the non-collimated light.

There is yet further provided in accordance with an embodiment of the present invention a method a method for calculating multiple touch locations on a screen including activating a plurality of emitters and detectors around the perimeter of a screen, wherein each emitter-detector pair corresponds to a light beam crossing the screen, from among a plurality of such light beams, and wherein some of the light beams are blocked by one or more objects touching the screen, providing a look-up table listing, for each light beam from the plurality of light beams, other light beams from the plurality of light beams, that intersect that light beam, and their respective points of intersection, (a) identifying a first blocked light beam, (b) accessing the look-up table to identify a second blocked light beam that intersects the first blocked beam, (c) accessing the look-up table to identify intersection points of other blocked light beams that neighbor the intersection point of the thus-identified first and second blocked beams, (d) repeating operations (b) and (c) until all neighboring intersections points of blocked beams have been identified, and group the thus-identified neighboring intersections as a single touch point, and (e) repeating operations (a)-(d) for remaining blocked light beams that were not yet grouped at operation (d).

There is moreover provided in accordance with an embodiment of the present invention a method for calculating multiple touch locations on a screen including activating a plurality of emitters and detectors around the perimeter of a screen, wherein each emitter-detector pair corresponds to a light beam crossing the screen, from among a plurality of such light beams, and wherein some of the light beams are blocked by one or more objects touching the screen, identifying the screen as an initial touch candidate region, for each candidate region: (a) identifying an unblocked light beam crossing that candidate region, (b) dividing that candidate region into multiple candidate regions, separated by the thus-identified unblocked light beam, and (c) repeating operations (a) and (b) for all unblocked beams, and designating the candidate regions whose sizes are larger than a minimum size, as being unique touch locations.

There is additionally provided in accordance with an embodiment of the present invention a method for calculating a touch location on a screen including providing a plurality of emitters and detectors around the perimeter of a screen, wherein each emitter-detector pair corresponds to a wide light beam crossing the screen, from among a plurality of wide light beams, activating a screen scan pairing each emitter with an opposite detector, (a) identifying those wide light beams, from the plurality of wide light beams, that are being blocked by an object touching the screen, (b) identifying an area of intersection between substantially perpendicularly oriented ones of the blocked wide beams identified at operation (a), (c) identifying additional blocked wide beams that cross the area of intersection identified at operation (b), (d) determining a degree of blockage for each additional blocked wide light beam identified at operation (c), (e) identifying two-dimensional shapes formed by the intersection of each additional blocked wide light beam identified at operation (c) with the blocked wide light beams identified at operation (a), and (f) calculating a weighted average of the centers-of-gravity of the thus-identified two-dimensional shapes, wherein each center-of-gravity's weight in the sum corresponds to its respective degree of blockage determined at operation (c).

There is further provided in accordance with an embodiment of the present invention a circular touch sensor including a housing, a surface mounted in the housing, including a circular portion exposed to receive touch input, a plurality of light detectors mounted in the housing along a semicircular contour corresponding to a half of the circular portion, wherein an angular pitch between neighboring detectors is constant, a plurality of light emitters mounted in the housing along an opposite semicircular contour corresponding to the opposite portion of the circular portion, and arranged in groups such that an angular pitch between neighboring emitters within each group is $\theta$, and such that an angular pitch between nearest emitters in different groups is $\theta+\alpha$, where $\alpha$ is positive, and a processor connected to the emitters and to the detectors, for synchronously co-activating emitter-detector pairs, and configured to calculate a two-dimensional location of an object touching the circular portion, based on outputs of the detectors.

There is yet further provided in accordance with an embodiment of the present invention a circular touch sensor including a housing, a surface mounted in the housing including a circular portion exposed to receive touch input, a plurality of light emitters mounted in the housing along a semicircular contour corresponding to half of the circular portion, wherein an angular pitch between neighboring emitters is constant, a plurality of light detectors mounted in the housing along an opposite semicircular contour corresponding to the opposite half of the circular portion, and arranged in groups such that an angular pitch between neighboring detectors within each group is $\theta$, and such that an angular pitch between nearest detectors in different groups is $\theta+\alpha$, where $\alpha$ is positive, and a processor connected to the emitters and to the detectors, for synchronously co-activating emitter-detector pairs, and configured to calculate a two-dimensional location of an object touching the circular portion, based on outputs of the detectors.

BRIEF DESCRIPTION OF THE DRAWINGS

The present invention will be more fully understood and appreciated from the following detailed description, taken in conjunction with the drawings in which.

The following table catalogues the numbered elements and lists the figures in which each numbered element appears. Similarly numbered elements represent elements of the same type, but they need not be identical elements.

Numbered Elements

Figure 1:
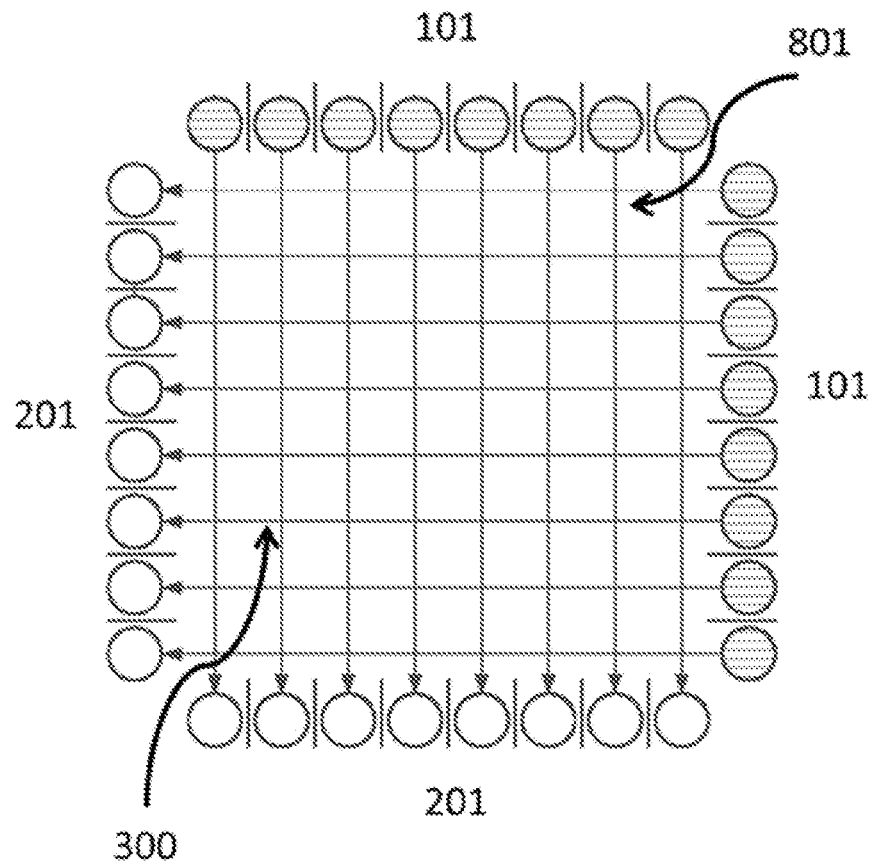
FIG. 1 is a diagram of a prior art, light-based touch screen having 16 LEDs and 16 PDs.
Figure 2:
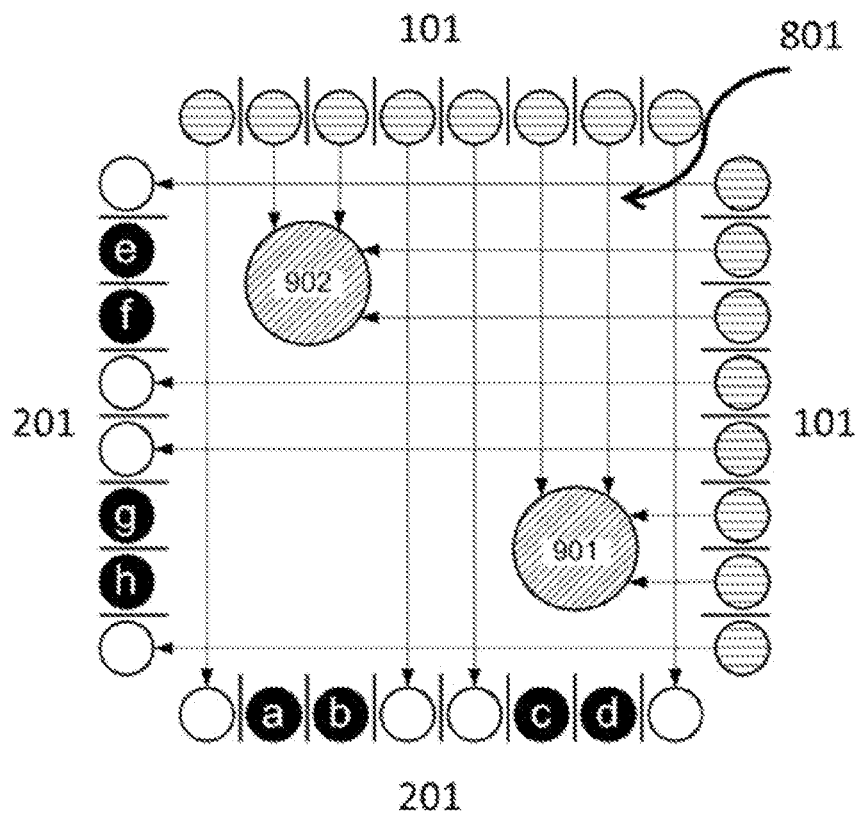
FIGS. 2 and 3 are illustrations of instances of ambiguous multi-touch detections in prior art touch screens.
Figure 3:
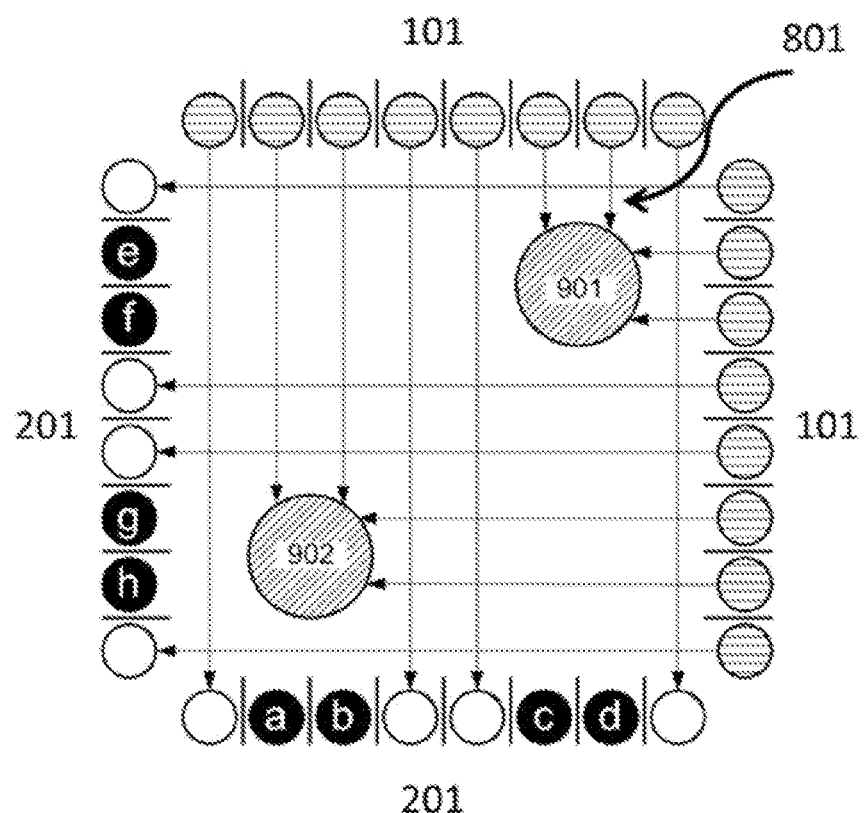
Figure 4:
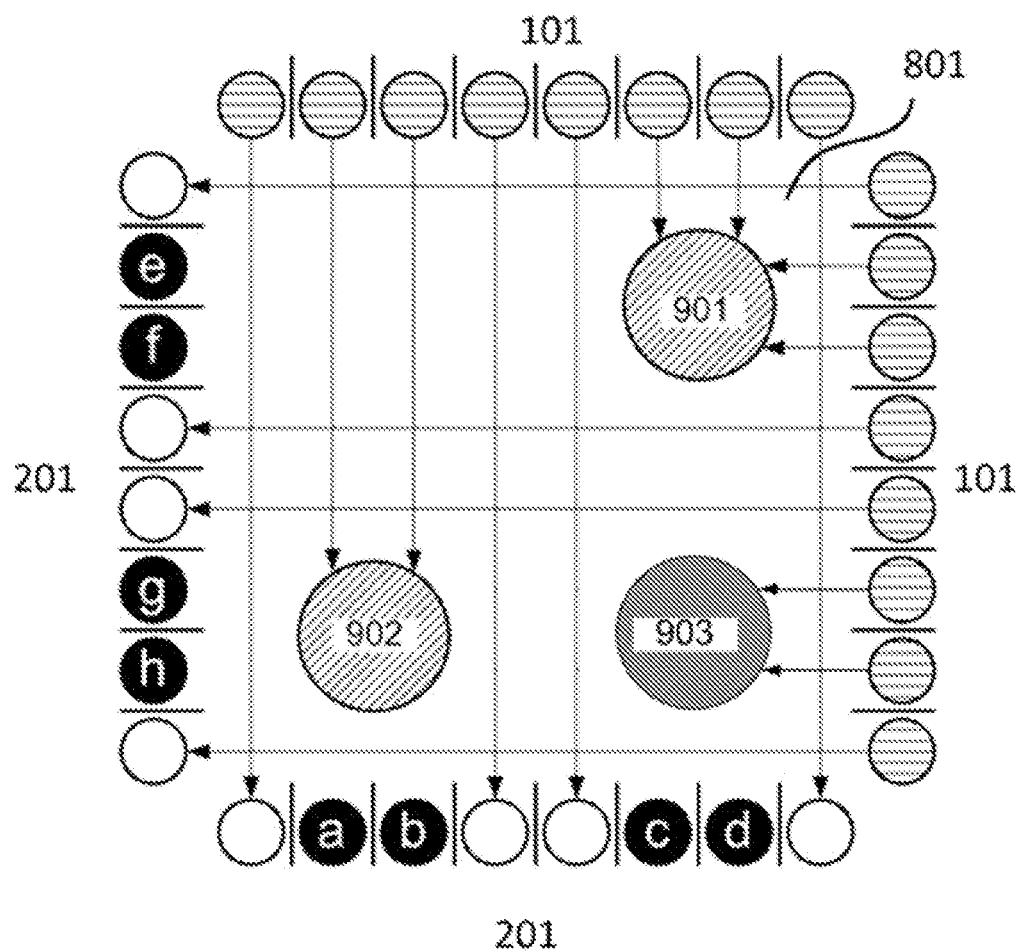
FIGS. 4 and 5 are illustrations of instances of ghosted touches in prior art touch screens.
Figure 5:
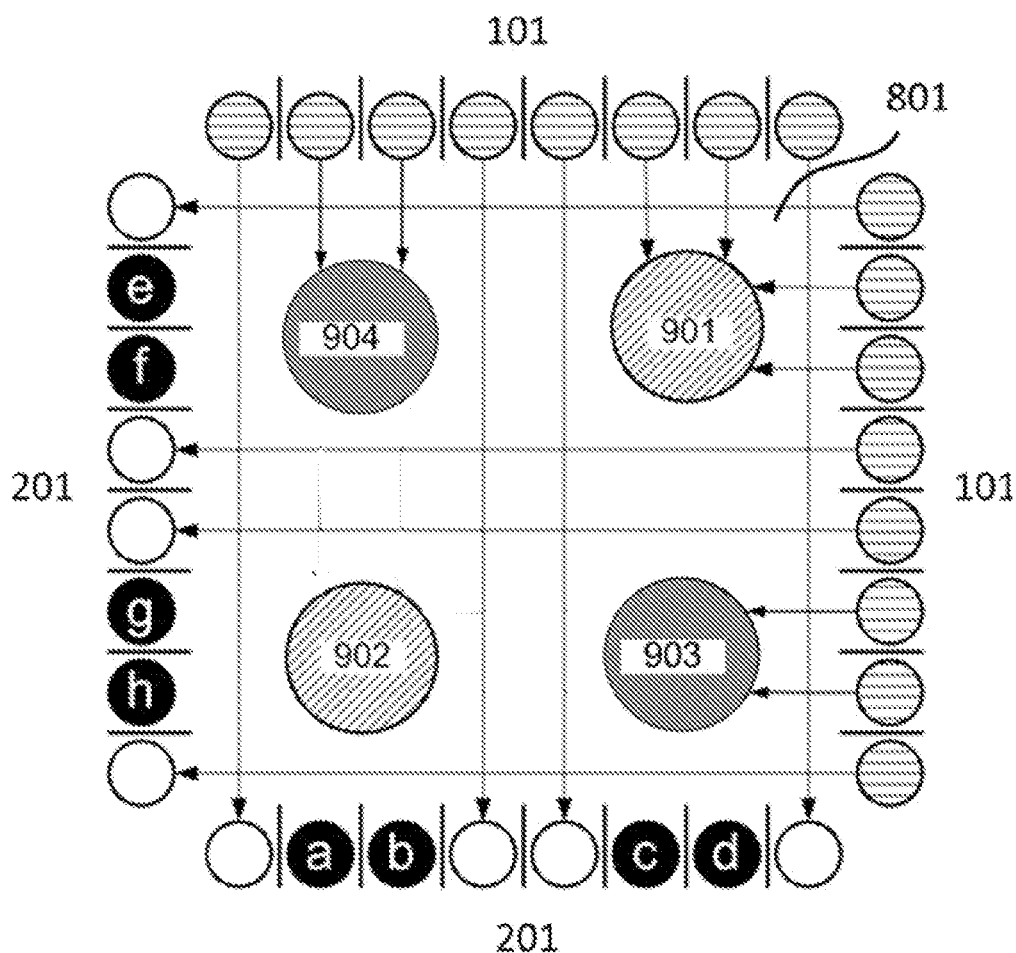

| Element | Description | FIGS. |
|---|---|---|
| 101-103 | emitters | 1-7, 32-34, 40, -42, 57, 58 |
| 104 | LED chip | 36, 38 |
| 105 | plastic shell | 36, 38 |
| 106-111 | emitter | 21, 22, 31, 39, 44-58, 61, 63, 66-69, 83, 84 |
| 201-203, 205-207 | photodetector | 1-7, 21, 22, 31-34, 39, 40, 50, 57, 61, 63, 66-69 |
| 210 | photodetector chip | 43 |
| 211 | plastic shell | 43 |
| 220 | photodetector | 83 |
| 300-306 | light beam | 1, 10, 14, 15 |
| 307, 308 | blocked light beam | 17, 18 |
| 311-314 | intersection point | 10 |
| 316-319 | area q | 30 |
| 320-326 | light beam | 21-26, 30, 31, 39, 40, 57, 58 |
| 327 | iso-curve | 24, 26 |
| 328 | area q | 24, 26 |
| 330 | iso-curve | 25, 26 |
| 331 | area q | 25, 26 |
| 332-335 | light beam | 27-30, 76, 83, 84 |
| 336 | iso-curve | 27, 29 |
| 337 | area q | 27, 29 |
| 338 | iso-curve | 28, 29 |
| 339 | area q | 28, 29 |
| 341 | light beam | 44, 45 |
| 342 | gap | 45 |
| 343-348, 354 | light beam | 44-48, 50 |
| 355-359 | light intensity distribution | 50, 51 |
| 360 | light beams | 59, 66-68 |
| 400 | lens | 36 |
| 401 | entry surface | 36, 38, 42, 43 |
| 402 | exit surface | 36, 38 |
| 403-407 | lens | 21, 22, 31, 39, 50 |
| 410 | light guide frame | 40, 57 |
| 411, 412, 416 | light guide | 41-46, 49, 51, 58 |
| 417 | radius | 46 |
| 419 | viewing angle | 46 |
| 420 | refractive surface | 45, 46 |
| 421 | reflective surface | 45, 46 |
| 422 | refractive surface | 45, 46 |
| 423 | lens | 45, 46 |
| 424 | light guide | 77-83 |
| 425 | light shield | 82 |
| 429 | light guide | 47 |
| 430 | entry surface | 47 |
| 431 | exit surface | 47 |
| 432 | air gap | 47 |
| 433 | lens | 47 |
| 440 | light guide | 48 |
| 441 | reflective surface | 48 |
| 442 | refractive surface | 48 |
| 443 | air gap | 48 |
| 444 | lens | 48 |
| 451 | curved mirror | 49 |
| 452 | light guide | 49 |
| 460 | lens | 52-54, 56 |
| 461 | curved reflective surface | 52, 54 |
| 462 | curved reflective surface | 52, 54 |
| 463 | entry surface | 52-54 |
| 464 | exit surface | 52-54 |
| 465 | light beam | 53, 54 |
| 466 | upper lens portion | 52, 54 |
| 467 | lower lens portion | 52, 54 |
| 470 | light guide | 55 |
| 471 | curved reflective surface | 55 |
| 472 | height of parabola | 55 |
| 473 | reflector | 55 |
| 474 | bezel height | 55 |
| 476 | height for light channel | 55 |
| 478 | height | 55 |
| 479, 480 | light guide | 59-65 |
| 481 | backplane of light guide | 55 |
| 482 | depth of parabola | 52 |
| 483 | top horizontal plane | 52, 54 |
| 484 | bottom horizontal plane | 52, 54 |
| 601-605 | step in flowchart | 8 |
| 612-614 | screenshot | 8 |
| 615-619 | touch point | 8, 19, 32 |
| 620-624 | step in flowchart | 9 |
| 630 | screenshot | 9 |
| 633-636 | light beam | 9 |
| 637-639 | intersection point | 9 |
| 640 | screenshot | 9 |
| 641-643 | light beam | 9 |
| 645-647 | intersection point | 9 |
| 650 | screenshot | 9 |
| 651 | circle indicating touch area | 9, 11 |
| 652 | PCB | 41-43, 58 |
| 653-656 | candidate touch area (q) | 13-18 |
| 657-659 | PCB | 60, 61, 63 |
| 660 | screenshot | 9 |
| 661 | pcb | 75, 79-81, 83 |
| 664-671 | step in flowchart | 35 |
| 701-705 | touch point | 12 |
| 710 | controller | 7 |
| 711 | calculating unit | 57 |
| 715 | processor | 75 |
| 801-803 | screen | 1-5, 13-19, 21, 22, 24-28, 32-34, 41-43, 49, 50, 58-68 |
| 804 | crease | 64, 65 |
| 810 | touch plate | 78-81, 83 |
| 811 | top cover | 78-81 |
| 812 | bottom cover | 78-81 |
| 900 | arrow | 58 |
| 901-904 | touch point | 2-5 |
| 905 | touch object | 21, 22, 31 |
| 906 | rhomboid intersection area | 33 |
| 910 | touch object | 67-69 |
| 911 | screw | 79-81 |
| 912 | wire | 78-80 |
| 913 | haptic vibrator | 79, 80 |

DETAILED DESCRIPTION

Aspects of the present invention relate to light-based touch screens and light-based touch surfaces. Throughout this specification, the terms "touch screen" and "touch sensitive surface" include touch sensitive electronic displays and touch surfaces that do not include an electronic display, inter alia, a mouse touchpad as included in many laptop computers and the back cover of a handheld device. They also include airspace enclosed by the rectangular emitter-detector sensor frame provided by the present invention.

According to embodiments of the present invention, a light-based touch sensor includes a plurality of infra-red or near infra-red light-emitting diodes (LEDs) arranged along two adjacent edges of a rectangular touch sensitive surface, as defined above, and a plurality of photodiodes (PDs) arranged along the two remaining adjacent edges. The LEDs project light collimated in height, in order to keep it parallel to the screen surface, but the light is spread out in a wide fan to reach many detectors. When this light is blocked by an inserted object, such as a finger or a stylus, the absence of expected light is detected by the PDs. The LEDs and PDs are controlled for selective activation and de-activation by a controller. Generally, each LED and PD has I/O connectors, and signals are transmitted to specify which LEDs and which PDs are activated. In some embodiments, each LED-PD pair is activated separately. In other embodiments, several PDs are activated concurrently during an LED activation.

Figure 6:
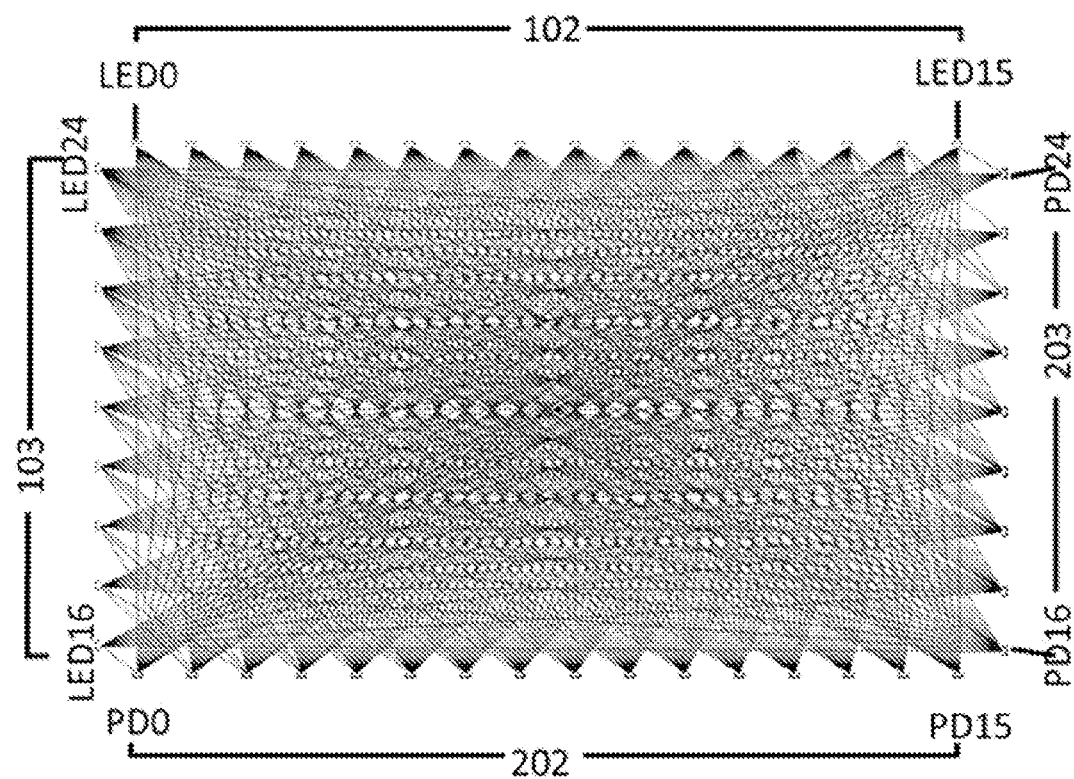
FIG. 6 is an illustration of a network of intersecting light beams in a touch screen system, in accordance with an embodiment of the present invention.

Reference is made to FIG. 6, which is an illustration of a network of intersecting light beams in a touch screen system, in accordance with an embodiment of the present invention. FIG. 6 shows a first plurality of LEDs 102, namely LED0-LED15 along the top edge of a touch screen; a second plurality of LEDs 103, namely LED16-LED24 along the left edge of the touch screen; a first plurality of PDs 202, namely PD0-PD15 along the bottom edge of the screen; and a second plurality of PDs 203, namely PD16-PD24 along the right edge of the touch screen. FIG. 6 also illustrates all of the possible emitter-detector beams.

Figure 7:
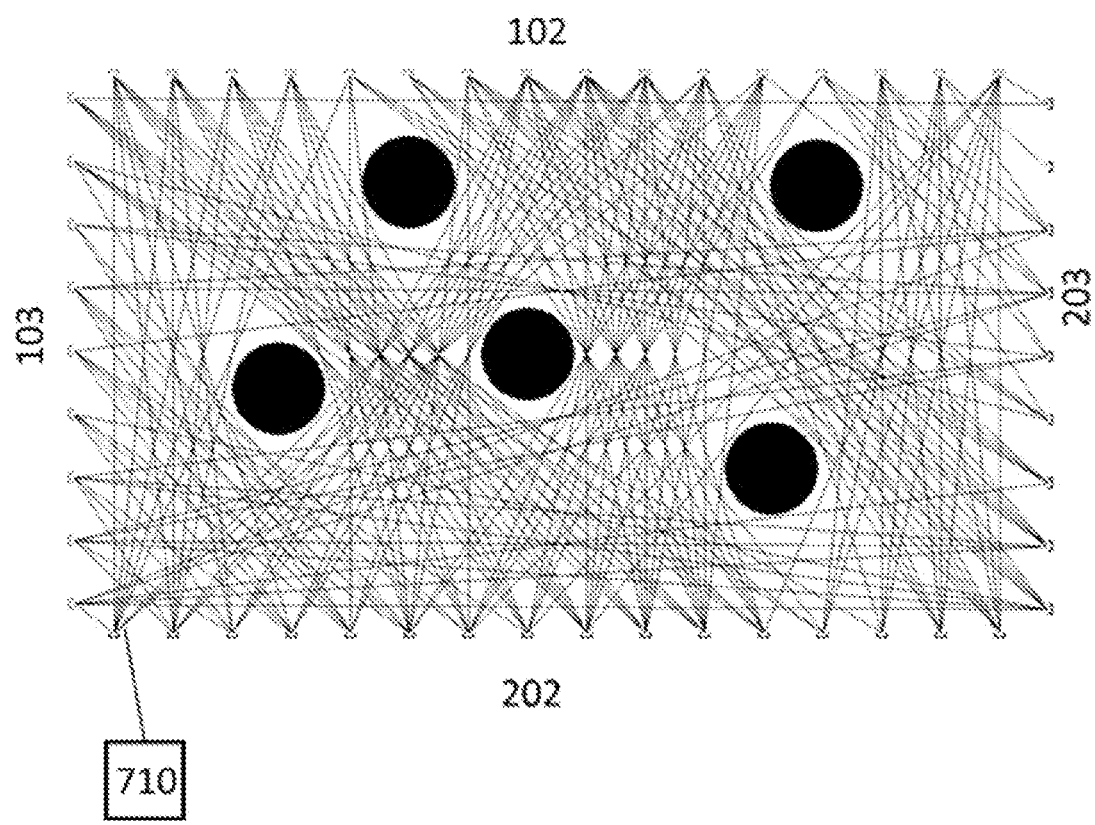
FIG. 7 is an illustration of a network of intersecting light beams detecting five touch points in a touch screen system, in accordance with an embodiment of the present invention.

Reference is made to FIG. 7, which is an illustration of a network of intersecting light beams detecting five touch points in a touch screen system, in accordance with an embodiment of the present invention. FIG. 7 shows the touch screen system of FIG. 6 detecting five touches in accordance with an embodiment of the present invention. The touches are indicated as solid black circles. The lines crossing the screen in FIG. 7 indicate unblocked emitter-detector beams. A controller 710 is shown for controlling activations of the emitters and detectors.

In some embodiments, each emitter has a respective collimating lens apart from the emitter, and each detector has a respective collimating lens apart from the detector. In some embodiments, these collimating lenses form a solid plastic frame along the borders of the rectangular touch screen. In other embodiments, these collimating lenses are absent to enable a wide, 180° spread angle of light beams from each emitter.

Different emitter-detector beams have different levels of detected intensity at their respective detectors. In an exemplary embodiment, 16 diodes are arranged along the screen length and 9 diodes are arranged along the screen width. TABLES I and II below list the detected intensity of unblocked beams from each emitter at each of detectors PD0-PD15 along the screen length (TABLE I), and at each of the detectors PD16-PD24 along the screen width (TABLE II). Empty cells indicate that no signal is detected for the corresponding emitter-detector beam.

TABLE I

Detected intensities of unblocked beams from each emitter at each of the 15 detectors along the screen length

|  | PD0 | PD1 | PD2 | PD3 | PD4 | PD5 | PD6 | PD7 | PD8 | PD9 | PD10 | PD11 | PD12 | PD13 | PD14 | PD15 |
|---|---|---|---|---|---|---|---|---|---|---|---|---|---|---|---|---|
| LED0 | 236 | 236 | 236 | 236 | 236 | 236 | 236 | 236 | 180 | 75 | 39 | 10 |  |  |  |  |
| LED1 | 236 | 236 | 236 | 236 | 236 | 236 | 236 | 236 | 236 | 179 | 101 | 68 | 23 |  |  |  |
| LED2 | 236 | 236 | 236 | 236 | 236 | 236 | 236 | 236 | 236 | 236 | 189 | 126 | 88 | 36 | 18 |  |
| LED3 | 236 | 236 | 236 | 236 | 236 | 236 | 236 | 236 | 236 | 236 | 236 | 174 | 114 | 47 | 32 | 7 |
| LED4 | 236 | 236 | 236 | 236 | 236 | 236 | 236 | 236 | 236 | 236 | 234 | 164 | 100 | 62 | 25 |  |
| LED5 | 236 | 236 | 236 | 236 | 236 | 236 | 236 | 236 | 236 | 236 | 236 | 217 | 122 | 75 | 25 |  |
| LED6 | 236 | 236 | 236 | 236 | 236 | 236 | 236 | 236 | 236 | 236 | 236 | 236 | 236 | 184 | 117 |  |
| LED7 | 236 | 236 | 236 | 236 | 236 | 236 | 236 | 236 | 236 | 236 | 236 | 236 | 236 | 236 | 162 |  |
| LED8 | 236 | 236 | 236 | 236 | 236 | 236 | 236 | 236 | 236 | 236 | 236 | 236 | 236 | 236 | 236 | 234 |
| LED9 | 184 | 169 | 236 | 236 | 236 | 236 | 236 | 236 | 236 | 236 | 236 | 236 | 236 | 236 | 236 | 236 |
| LED10 | 139 | 132 | 165 | 236 | 236 | 236 | 236 | 236 | 236 | 236 | 236 | 236 | 236 | 236 | 236 | 236 |
| LED11 | 84 | 75 | 100 | 195 | 235 | 236 | 236 | 236 | 236 | 236 | 236 | 236 | 236 | 236 | 236 | 236 |
| LED12 | 47 | 49 | 96 | 205 | 236 | 236 | 236 | 236 | 236 | 236 | 236 | 236 | 236 | 236 | 236 | 236 |
| LED13 | 4 |  | 15 | 90 | 122 | 194 | 236 | 236 | 236 | 236 | 236 | 236 | 236 | 236 | 236 | 236 |
| LED14 |  |  |  | 57 | 75 | 162 | 197 | 236 | 236 | 236 | 236 | 236 | 236 | 236 | 236 | 236 |
| LED15 |  |  |  | 26 | 45 | 97 | 148 | 236 | 236 | 236 | 236 | 236 | 236 | 236 | 236 | 236 |
| LED16 | 236 | 236 | 44 |  |  |  |  |  |  |  |  |  |  |  |  |  |
| LED17 | 236 | 236 | 236 | 61 | 12 |  |  |  |  |  |  |  |  |  |  |  |
| LED18 | 145 | 236 | 236 | 236 | 183 |  |  |  |  |  |  |  |  |  |  |  |
| LED19 | 10 | 50 | 236 | 236 | 236 | 236 | 59 |  |  |  |  |  |  |  |  |  |
| LED20 |  |  | 72 | 236 | 236 | 236 | 236 | 77 | 13 |  |  |  |  |  |  |  |
| LED21 |  |  | 4 | 178 | 236 | 236 | 235 | 153 | 120 | 18 |  |  |  |  |  |  |
| LED22 |  |  |  | 1 | 236 | 216 | 177 | 160 | 134 | 70 | 23 |  |  |  |  |  |
| LED23 |  |  |  |  | 57 | 149 | 180 | 159 | 149 | 84 | 49 | 32 | 1 |  |  |  |
| LED24 |  |  |  |  | 29 | 195 | 200 | 183 | 171 | 86 | 61 | 51 | 30 | 14 | 26 |  |

TABLE II

Detected intensities of unblocked beams from each emitter at each of the 9 detectors along the screen width

|  | PD16 | PD17 | PD18 | PD19 | PD20 | PD21 | PD22 | PD23 | PD24 |
|---|---|---|---|---|---|---|---|---|---|
| LED0 |  |  |  |  |  |  |  |  |  |
| LED1 |  |  |  |  |  |  |  |  |  |
| LED2 | 41 | 6 |  |  |  |  |  |  |  |
| LED3 | 49 | 25 |  |  |  |  |  |  |  |
| LED4 | 69 | 62 |  |  |  |  |  |  |  |
| LED5 | 44 | 44 | 15 |  |  |  |  |  |  |
| LED6 | 106 | 130 | 94 | 28 |  |  |  |  |  |
| LED7 | 96 | 139 | 165 | 235 |  |  |  |  |  |
| LED8 | 108 | 141 | 132 | 193 | 26 |  |  |  |  |
| LED9 | 125 | 154 | 169 | 236 | 153 | 17 |  |  |  |
| LED10 | 123 | 172 | 201 | 236 | 236 | 236 |  |  |  |
| LED11 | 27 | 45 | 117 | 236 | 236 | 236 | 98 |  |  |
| LED12 |  |  |  | 236 | 236 | 236 | 236 | 16 |  |
| LED13 |  |  |  |  | 103 | 236 | 236 | 235 | 72 |
| LED14 |  |  |  |  |  | 39 | 236 | 236 | 235 |
| LED15 |  |  |  |  |  |  | 49 | 236 | 235 |
| LED16 | 236 | 171 | 166 | 170 | 162 | 164 | 142 | 142 | 160 |
| LED17 | 236 | 209 | 206 | 235 | 233 | 222 | 204 | 219 | 233 |

TABLE II-continued

Detected intensities of unblocked beams from each emitter at each of the 9 detectors along the screen width

|       | PD16 | PD17 | PD18 | PD19 | PD20 | PD21 | PD22 | PD23 | PD24 |
|-------|------|------|------|------|------|------|------|------|------|
| LED18 | 180  | 201  | 164  | 166  | 179  | 170  | 147  | 169  | 192  |
| LED19 | 197  | 224  | 200  | 209  | 187  | 165  | 151  | 199  | 236  |
| LED20 | 191  | 214  | 193  | 198  | 187  | 170  | 167  | 194  | 213  |
| LED21 | 235  | 235  | 234  | 232  | 212  | 187  | 173  | 211  | 222  |
| LED22 | 204  | 215  | 215  | 226  | 202  | 192  | 188  | 209  | 198  |
| LED23 | 197  | 201  | 217  | 234  | 209  | 201  | 173  | 170  | 169  |
| LED24 | 188  | 183  | 164  | 180  | 129  | 118  | 99   | 99   | 192  |

The maximum detection intensity in TABLES I and II is 236. A detection intensity of at least 10 was found, by experiment, to be sufficiently greater than a noise signal, and therefore useful for detecting touches. In some embodiments, a threshold of ½ the expected intensity is used to determine whether a beam is blocked. Thus, if the expected intensity is 236, a detection signal below 118 renders the beam as blocked, whereas if the expected intensity is 49, a detection signal below 25 renders the beam as blocked.

In addition, certain beams were found to continue being detected even when the entire screen was blocked. These beams, situated at corners of the touch screen, do not need to cross the screen area in order to arrive at their respective detectors. TABLE III lists the detection values registered when the entire rectangular touch screen area is covered by a solid opaque object.

TABLE III

Detected intensities of blocked beams

| LED | PD0 | PD1 | PD2 | PD3 | PD4 | ... | PD15 | PD16 | PD17 | PD18 | PD19 | PD20 | PD21 | PD22 | PD23 | PD24 |
|-----|-----|-----|-----|-----|-----|-----|------|------|------|------|------|------|------|------|------|------|
| 0   |     |     |     |     |     |     |      |      |      |      |      |      |      |      |      |      |
| 1   |     |     |     |     |     |     |      |      |      |      |      |      |      |      |      |      |
| 2   |     |     |     |     |     |     |      |      |      |      |      |      |      |      |      |      |
| 3   |     |     |     |     |     |     |      |      |      |      |      |      |      |      |      |      |
| 4   |     |     |     |     |     |     |      |      |      |      |      |      |      |      |      |      |
| 5   |     |     |     |     |     |     |      |      |      |      |      |      |      |      |      |      |
| 6   |     |     |     |     |     |     |      |      |      |      |      |      |      |      |      |      |
| 7   |     |     |     |     |     |     |      |      |      |      |      |      |      |      |      |      |
| 8   |     |     |     |     |     |     |      |      |      |      |      |      |      |      |      |      |
| 9   |     |     |     |     |     |     |      |      |      |      |      |      |      |      |      |      |
| 10  |     |     |     |     |     |     |      |      |      |      |      |      |      |      |      |      |
| 11  |     |     |     |     |     |     |      |      |      |      |      |      |      |      |      |      |
| 12  |     |     |     |     |     |     |      |      |      |      |      |      |      |      |      |      |
| 13  |     |     |     |     |     |     |      |      |      |      |      |      |      |      |      |      |
| 14  |     |     |     |     |     |     |      |      |      |      |      |      |      |      |      | 235  |
| 15  |     |     |     |     |     |     |      |      |      |      |      |      | 44   |      | 235  | 235  |
| 16  | 236 | 236 | 40  |     |     |     |      |      |      |      |      |      |      |      |      |      |
| 17  | 236 |     |     |     |     |     |      |      |      |      |      |      |      |      |      |      |
| 18  | 135 |     |     |     |     |     |      |      |      |      |      |      |      |      |      |      |
| 19  | 8   |     |     |     |     |     |      |      |      |      |      |      |      |      |      |      |
| 20  |     |     |     |     |     |     |      |      |      |      |      |      |      |      |      |      |
| 21  |     |     |     |     |     |     |      |      |      |      |      |      |      |      |      |      |
| 22  |     |     |     |     |     |     |      |      |      |      |      |      |      |      |      |      |
| 23  |     |     |     |     |     |     |      |      |      |      |      |      |      |      |      |      |
| 24  |     |     |     |     |     |     |      |      |      |      |      |      |      |      |      |      |

TABLE IV lists with an 'x' the useful beams in this exemplary embodiment by including beams from TABLES I and II having an unblocked detection value of at least 10, and excluding the beams detected in TABLE III.

TABLE IV

Usable detection beams

|       | PD0 | PD1 | PD2 | PD3 | PD4 | PD5 | PD6 | PD7 | PD8 | PD9 | PD10 | PD11 | PD12 | PD13 | PD14 | PD15 | PD16 | PD17 | PD18 | PD19 | PD20 | PD21 | PD22 | PD23 | PD24 |
|-------|-----|-----|-----|-----|-----|-----|-----|-----|-----|-----|------|------|------|------|------|------|------|------|------|------|------|------|------|------|------|
| LED0  | X   | X   | X   | X   | X   | X   | X   | X   | X   | X   | X    |      |      |      |      |      |      |      |      |      |      |      |      |      |      |
| LED1  | X   | X   | X   | X   | X   | X   | X   | X   | X   | X   | X    | X    |      |      |      |      |      |      |      |      |      |      |      |      |      |
| LED2  | X   | X   | X   | X   | X   | X   | X   | X   | X   | X   | X    | X    | X    |      | X    |      |      |      |      |      |      |      |      |      |      |
| LED3  | X   | X   | X   | X   | X   | X   | X   | X   | X   | X   | X    | X    |      |      | X    | X    |      |      |      |      |      |      |      |      |      |
| LED4  | X   | X   | X   | X   | X   | X   | X   | X   | X   | X   | X    | X    | X    | X    | X    | X    |      |      |      |      |      |      |      |      |      |
| LED5  | X   | X   | X   | X   | X   | X   | X   | X   | X   | X   | X    | X    | X    | X    | X    | X    | X    |      |      |      |      |      |      |      |      |
| LED6  | X   | X   | X   | X   | X   | X   | X   | X   | X   | X   | X    | X    | X    | X    | X    | X    | X    | X    |      |      |      |      |      |      |      |
| LED7  | X   | X   | X   | X   | X   | X   | X   | X   | X   | X   | X    | X    | X    | X    | X    | X    | X    | X    |      |      |      |      |      |      |      |
| LED8  | X   | X   | X   | X   | X   | X   | X   | X   | X   | X   | X    | X    | X    | X    | X    | X    | X    | X    | X    |      |      |      |      |      |      |
| LED9  | X   | X   | X   | X   | X   | X   | X   | X   | X   | X   | X    | X    | X    | X    | X    | X    | X    | X    | X    | X    |      |      |      |      |      |
| LED10 | X   | X   | X   | X   | X   | X   | X   | X   | X   | X   | X    | X    | X    | X    | X    | X    | X    | X    | X    | X    |      |      |      |      |      |
| LED11 | X   | X   | X   | X   | X   | X   | X   | X   | X   | X   | X    | X    | X    | X    | X    | X    | X    | X    | X    | X    | X    |      |      |      |      |
| LED12 | X   | X   | X   | X   | X   | X   | X   | X   | X   | X   | X    | X    | X    | X    |      |      |      | X    | X    | X    | X    |      |      |      |      |
| LED13 |     | X   | X   | X   | X   | X   | X   | X   | X   | X   | X    | X    | X    | X    |      |      |      |      | X    | X    | X    | X    |      |      |      |
| LED14 |     |     | X   | X   | X   | X   | X   | X   | X   | X   | X    | X    | X    |      |      |      |      |      |      |      | X    | X    | X    |      |      |

TABLE IV-continued

Usable detection beams

|  | PD 0 | PD 1 | PD 2 | PD 3 | PD 4 | PD 5 | PD 6 | PD 7 | PD 8 | PD 9 | PD 10 | PD 11 | PD 12 | PD 13 | PD 14 | PD 15 | PD 16 | PD 17 | PD 18 | PD 19 | PD 20 | PD 21 | PD 22 | PD 23 | PD 24 |
|---|---|---|---|---|---|---|---|---|---|---|---|---|---|---|---|---|---|---|---|---|---|---|---|---|---|
| LED15 |  |  | X | X | X | X | X | X | X | X | X | X | X | X | X |  |  |  |  |  |  |  |  |  |  |
| LED16 |  |  |  |  |  |  |  |  |  |  |  |  |  |  |  |  | X | X | X | X | X | X | X | X | X |
| LED17 |  | X | X | X | X |  |  |  |  |  |  |  |  |  |  |  | X | X | X | X | X | X | X | X | X |
| LED18 | X | X | X | X |  |  |  |  |  |  |  |  |  |  |  |  | X | X | X | X | X | X | X | X | X |
| LED19 | X | X | X | X | X | X |  |  |  |  |  |  |  |  |  |  | X | X | X | X | X | X | X | X | X |
| LED20 |  | X | X | X | X | X | X |  |  |  |  |  |  |  |  |  | X | X | X | X | X | X | X | X | X |
| LED21 |  | X | X | X | X | X | X | X |  |  |  |  |  |  |  |  | X | X | X | X | X | X | X | X | X |
| LED22 |  |  | X | X | X | X | X | X | X |  |  |  |  |  |  |  | X | X | X | X | X | X | X | X | X |
| LED23 |  |  | X | X | X | X | X | X | X | X |  |  |  |  |  |  | X | X | X | X | X | X | X | X | X |
| LED24 |  |  | X | X | X | X | X | X | X | X | X | X |  |  |  |  | X | X | X | X | X | X | X | X | X |

Touch Coordinate Method

Figure 8:
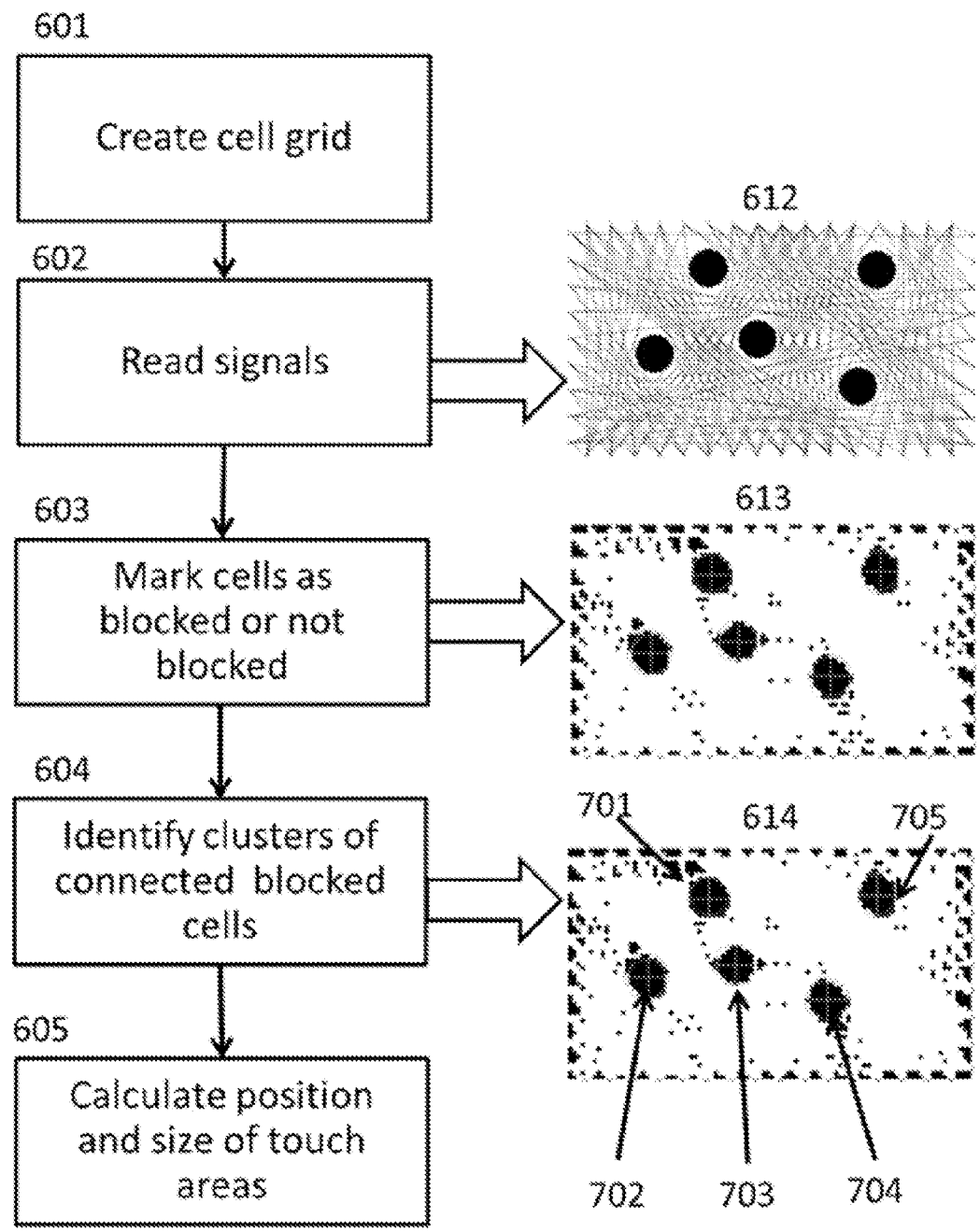
FIG. 8 is a flow chart describing a first method for identifying touch locations, in accordance with an embodiment of the present invention.

This section describes in detail the operations to determine a tracked object's location. Reference is made FIG. 8, which is a flow chart describing a first method for identifying touch locations, in accordance with an embodiment of the present invention. FIG. 8 shows a first method for calculating touch positions. At step 601 the touch sensitive area is parsed into a two-dimensional (2D) pixel or cell grid. In addition, a table is generated storing a list of pixels or cells traversed by each active detection beam marked in TABLE IV. In some embodiments, the table is stored as a list of pixel entries, each pixel entry storing a list of beams that pass through the pixel. In other embodiments, the table is stored as a list of light beam entries, each light beam entry storing a list of pixels along its beam path. Step 601 is performed offline. In some embodiments, the cells are of different sizes depending on location. For example, at the center of the screen the cells are smaller corresponding to the high density of beams vis-à-vis cells near the edges of the screen where the density of beams is lower. In some embodiments, the cells are not aligned along a two dimensional grid. Rather, each cell surrounds a point of intersection between two beams.

At step 602 a scan is performed for all usable beams listed in TABLE IV. Each beam is marked as either blocked or unblocked, according to a detection threshold, as described hereinabove. Screenshot 612 illustrates the unblocked beams in a case of five simultaneous touches.

At step 603 each pixel in the 2D cell grid from step 601 receives a binary value (blocked=1/not blocked=0). This binary value is a logical AND between all of the binary values from step 602 of LED-to-PD light beams that pass through the cell, according to the stored list from step 601. Thus, in this method unblocked beams are used to mark cells as untouched. A single, unblocked beam passing through a grid cell is sufficient to mark the cell as untouched. According to an alternative method described below intersections of blocked beams are used to fill the grid from step 601. Screenshot 613 illustrates cells marked as untouched (white) and touched (black).

At step 604 touch areas are formed by connecting neighboring blocked grid cells: for each pixel in step 603 having a value of 1 (blocked), four immediate neighbors are checked, namely, top, bottom, left and right neighbors. Any neighbor having a value of 1 is connected. Screenshot 614 illustrates five touch locations 701-705 identified by joining connected neighbors.

At step 605 the touch coordinates and area of each touch location are calculated. In some embodiments, the area of a touch location is the sum of its pixels and the touch position is the center of gravity of the area. In some embodiments, a valid touch location must have a minimum area, e.g., based on the expected size of a finger. Furthermore, in some embodiments a maximum size for a touch object is also provided. When a touch area exceeds the maximum size it is either discarded or it is assumed to contain multiple objects placed together on the screen. Thus, the touch sensor is operable to distinguish between a single finger performing a gesture and multiple fingers placed together performing the same gesture. Similarly, when the system tracks multiple touch objects, the system is operable to continue tracking them as multiple objects even after they are brought together based on the large size of the touch object, e.g., in a pinch gesture.

Figure 9:
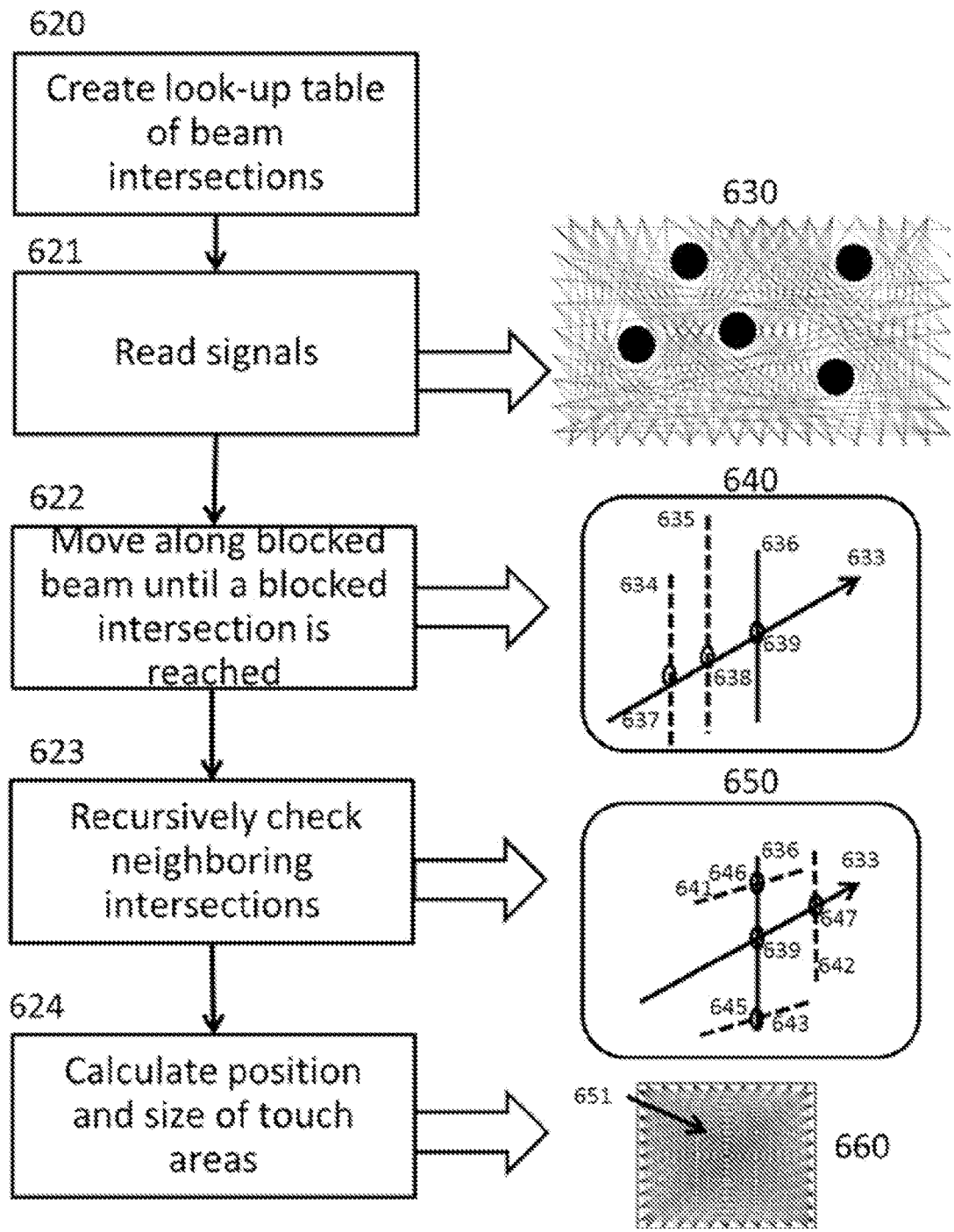
FIG. 9 is a flow chart describing a second method for identifying touch locations, in accordance with an embodiment of the present invention.

Reference is made to FIG. 9, which is a flow chart describing a second method for identifying touch locations, in accordance with an embodiment of the present invention. At step 620 a lookup table of intersection points between light beams is generated. In this table, every entry includes, for each light beam of the usable light beams listed in Table IV, other beams that intersect that beam and their respective points of intersection, and for each point of intersection the lookup table includes pointers to four neighboring intersection points, namely two immediate neighboring intersection points along each of the two intersecting beams. These neighboring intersection points are illustrated in FIG. 10.

Figure 10:
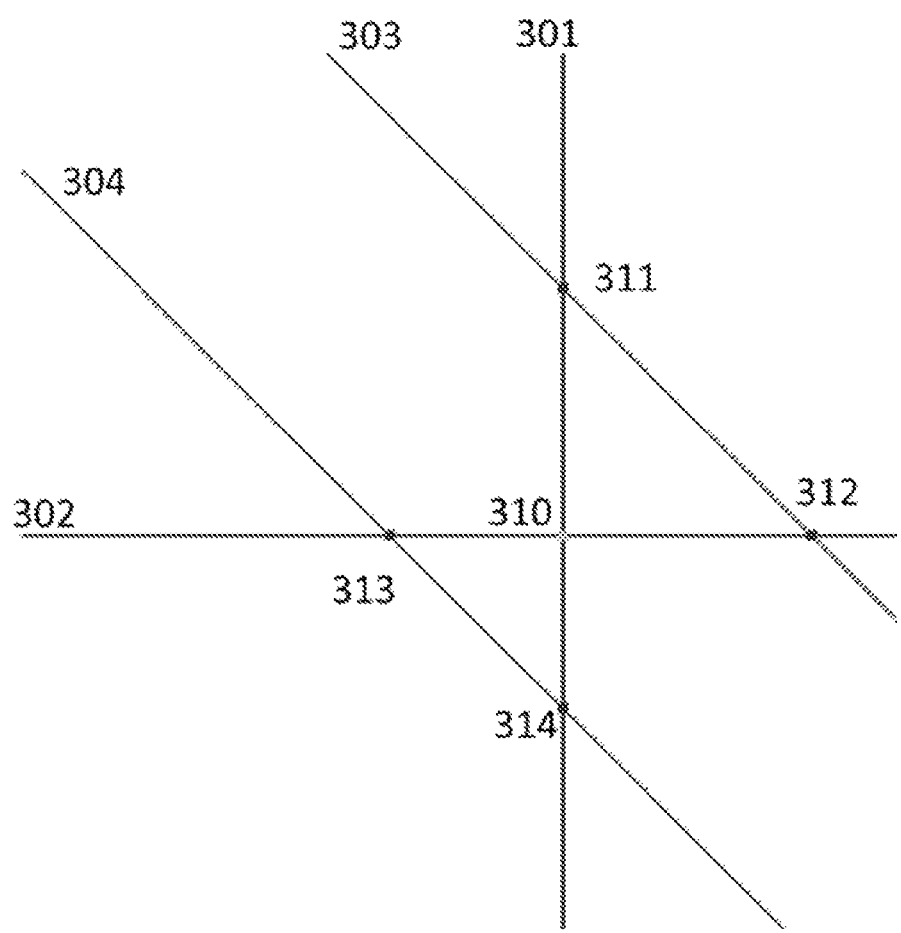
FIG. 10 is an illustration of neighboring intersections used by the method of FIG. 9, in accordance with an embodiment of the present invention.

Reference is made to FIG. 10, which is an illustration of neighboring intersections used by the method of FIG. 9, in accordance with an embodiment of the present invention. FIG. 10 shows two primary intersecting beams 301, 302 intersecting at point 310. Two additional beams, 303, 304, also intersect beams 301, 302 at points 311-314. The lookup table entry for intersection point 310 includes the coordinates of point 310 and pointers to neighboring intersection points 311-314.

Returning to FIG. 9, at step 621 all usable beams, as listed in TABLE IV, are scanned and assigned a binary blocked/unblocked value by comparing the beam's detection value to a threshold. In some embodiments, a normalized detection value is used instead of a binary value; the normalized values from neighboring beams are then interpolated to refine the touch location calculation.

At step 622 blocked beams are analyzed in the following manner. When a first blocked beam is identified, the method checks every intersection point along the blocked beam to see if that point is an intersection of two blocked beams. When such an intersection point is identified, the method recursively checks all immediate neighboring intersection points for additional intersections of two blocked beams until no further intersection points of two blocked beams are found. All neighboring intersection points that are also formed by two blocked beams are assumed to belong to the same touch object and are therefore grouped together. This recursive method finds all of the connected intersections belonging to a single touch object. The method is then repeated beginning with a blocked beam not already used in the previous steps. The resulting network of connected intersection points, where pairs of blocked beams intersect, is illustrated inside circle 651 in FIG. 11.

Figure 11:
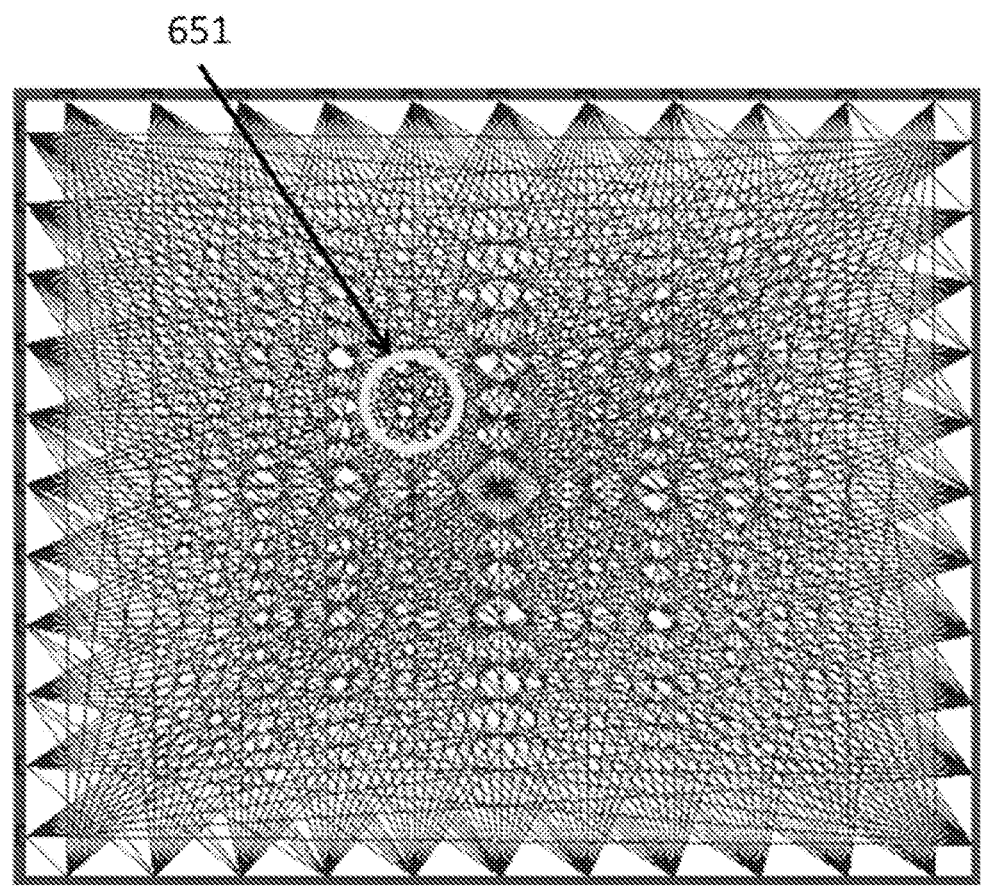
FIG. 11 is an illustration of a network of connected blocked beams used to locate a touch object, in accordance with an embodiment of the present invention.

Reference is made to FIG. 11, which is an illustration of a network of connected blocked beams used to locate a touch object, in accordance with an embodiment of the present invention. FIG. 11 shows blocked and non-blocked beams in a case of one touch. FIG. 11 is a color figure. Green lines represent non-blocked beams and red lines represent blocked beams. Thus, a significant intersection point is a point at which two red lines intersect. From a first such red intersection point, the current method recursively builds a network of connected red intersections. This area is the red area marked in FIG. 11 by yellow circle 651.

Step 622 is illustrated by frame 640 in FIG. 9. Frame 640 includes a first blocked beam 633. Three intersection points 637-639 along beam 633 are shown. Points 637 and 638 are where beam 633 intersects two non-blocked beams, 634 and 635, respectively. Point 639 is an intersection between beam 633 and a second blocked beam 636. Intersecting beam 636 is the second blocked beam identified by this method.

At step 623 the method recursively checks intersection points neighboring point 639 to create a network or web of neighboring intersections that belong to the same touch object. This is illustrated in FIG. 9 by frame 650, showing first intersection point 639 and neighboring intersection points 645-647. Point 647 is the next intersection point along beam 633; points 645 and 646 are neighboring intersections along second blocked beam 636. Point 645 is where beam 636 meets beam 643, and point 646 is where beam 636 meets beam 641. The recursive nature of this step means that if any of these points 645-647 are also formed by two blocked beams, the search expands to their neighbors. The list of neighboring intersections is generated offline and stored in memory. The method begins by sequentially checking the beams. The first blocked beam branches the search to check its neighbors. A list of checked beams is used to avoid checking neighbor beams again when the method resumes sequentially checking for a first blocked beam.

At step 624 the method proceeds to analyze the connected intersection points to extract the first and last blocked intersection point on each beam. This provides an outline of the touch area. Thus, in FIG. 11, these outermost points form yellow circle 651 that surrounds the network, or web, of red lines. A miniaturized version of FIG. 11 is presented in frame 660 in FIG. 9, with yellow circle 651 surrounding the web of red beams. The touch location is calculated as the average of these two endpoints for all beams. The width and height of the touch area are calculated by determining the area's left, right, top and bottom coordinates. These are determined by the maximum and minimum coordinates of intersection points in each direction, or alternatively, by averaging the coordinates of two or three maximum and minimum intersection points in each direction.

If a candidate touch location includes at least one unique blocked beam, i.e., a blocked beam that does not pass through any other candidate touch locations, then it is confirmed to be an actual touch location. If no unique blocked beam corresponds to a candidate touch location, i.e., if all blocked beams passing through the candidate location pass through at least one other confirmed touch location, then that candidate touch location is discarded. In this way phantom touches, i.e., locations corresponding to intersections of blocked beams that are not generated by an object at the intersection location, but rather by two objects that cast a light-beam shadow on that location, are discarded.

Figure 12:
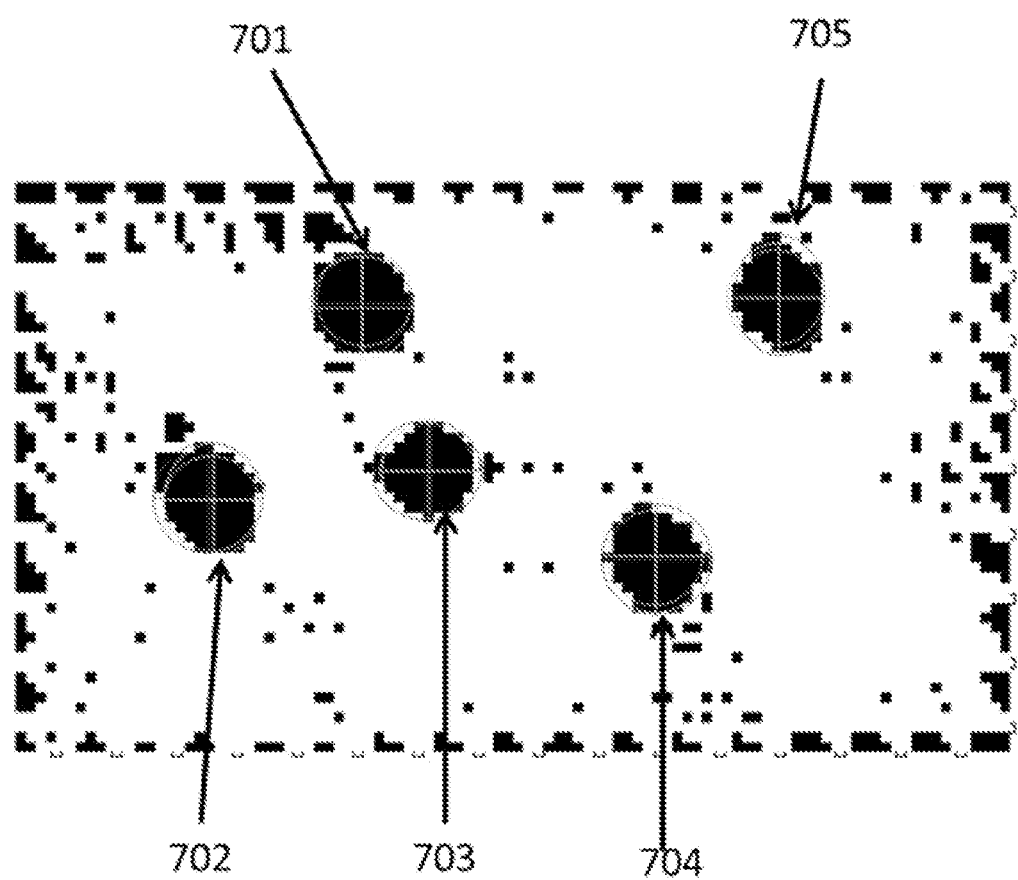
FIG. 12 is an illustration of five identified touch objects identified by a touch screen, in accordance with an embodiment of the present invention.

Reference is made to FIG. 12, which is a map of locations at which detection beams intersect. As explained hereinabove, an intersection for which every intersecting beam is blocked is marked as a blocked intersection. Blocked intersections are shaded black in FIG. 12. FIG. 12 shows five clusters of blocked intersections 701-705 corresponding to five touch objects identified by the system and methods described hereinabove. Additional blocked intersections are shown, but they belong to clusters too small to qualify as touch objects.

Figure 13:
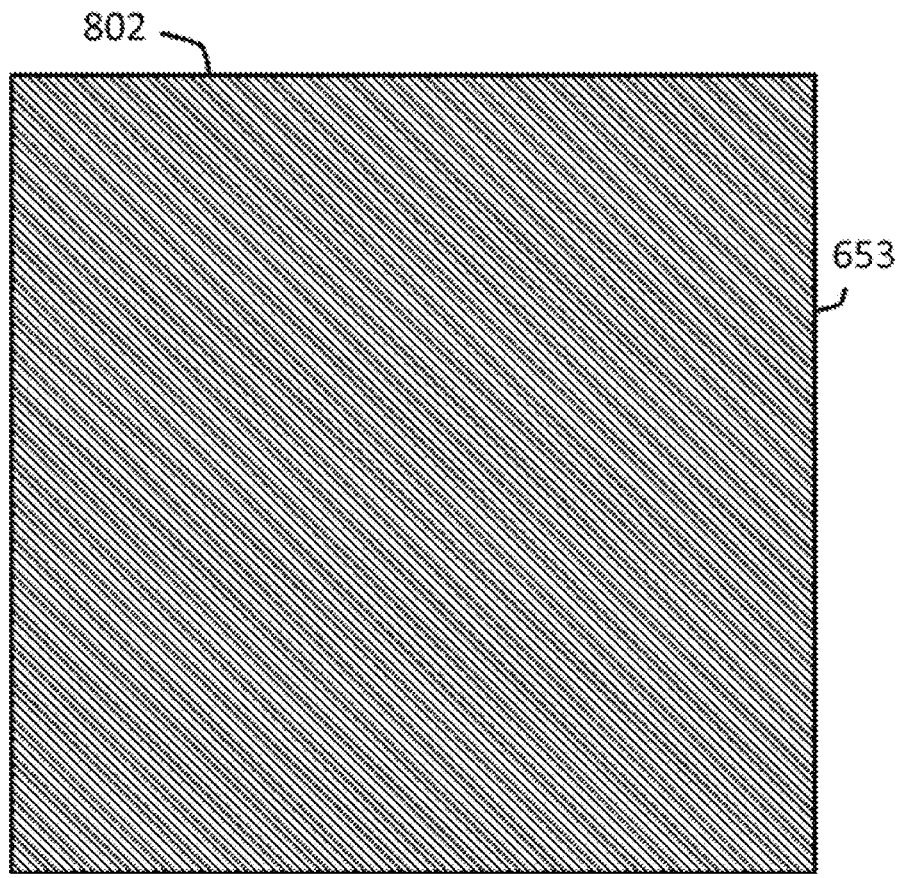
FIGS. 13-18 are illustrations of an alternative method for determining touch locations, whereby portions of a large, candidate touch area are excluded based on unblocked thin light beams, in accordance with an embodiment of the present invention.
Figure 14:
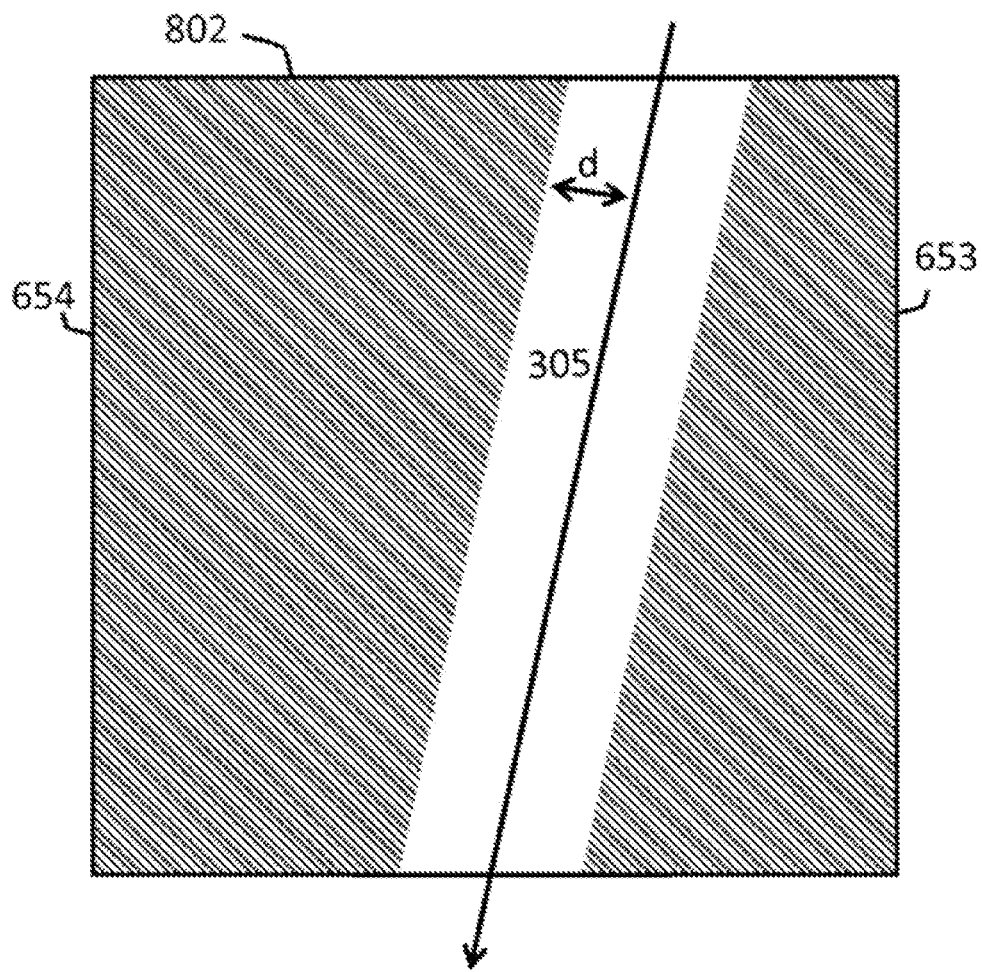
Figure 15:
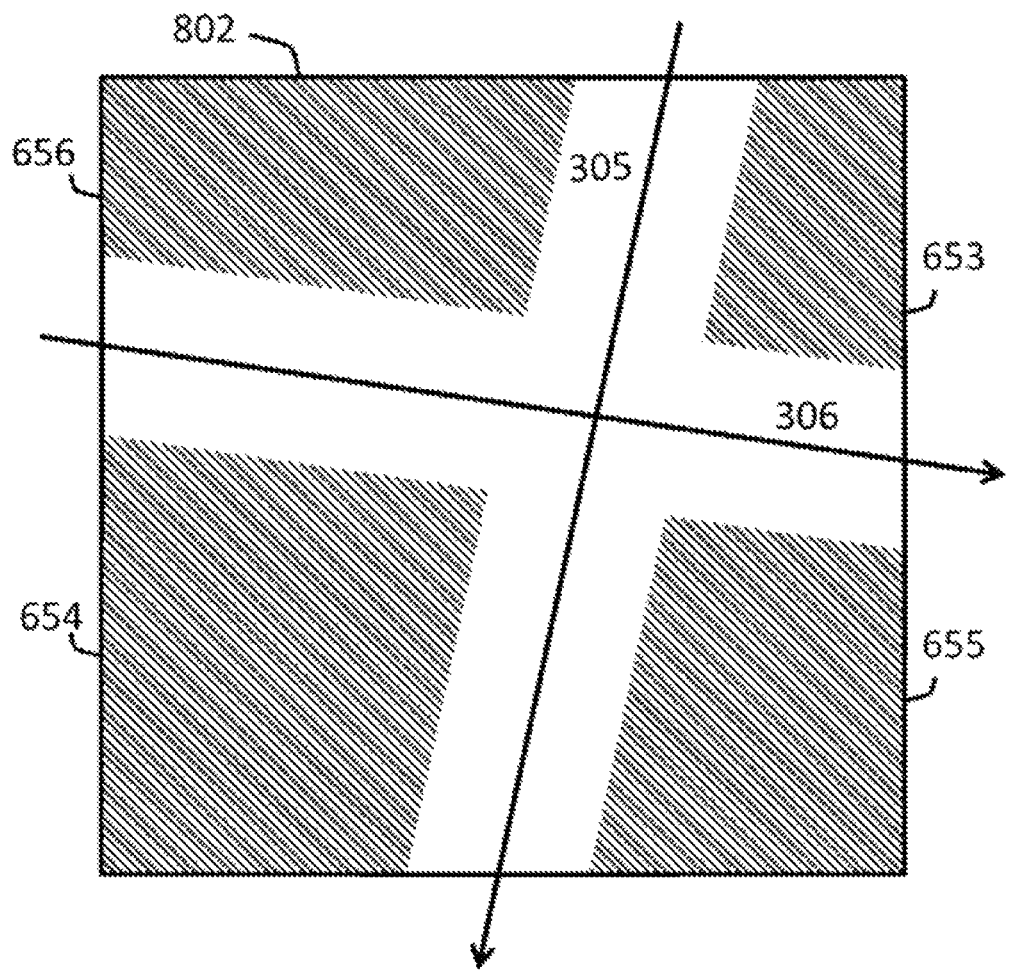
Figure 16:
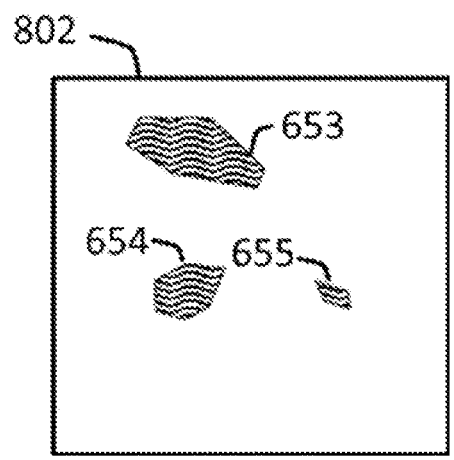

Reference is made to FIGS. 13-18, which are illustrations of an alternative method for determining touch locations, whereby portions of a large, candidate touch area are excluded based on unblocked thin light beams, in accordance with an embodiment of the present invention. The method uses very thin beams and assumes that any object touching the screen has a radius of at least d. The method begins by defining the entire screen as a potential touch area Q in which touch objects of radius d may be present. FIG. 13 shows a screen 802 with area Q indicated by shaded area 653. An unobstructed narrow beam indicates that no object having radius d is located within a distance d from the beam. This situation is illustrated in FIG. 14 showing unobstructed, narrow beam 305 passing across screen 802. Based on the assumption that any touch object has a radius d, it is evident that no such touch object is located within distance d of beam 305. Therefore a corridor having a width of 2d along beam 305 is removed or excluded from Q, splitting Q into two polygons 653 and 654. As more unobstructed beams are added, more areas are removed from Q. Thus, in FIG. 15 two unobstructed beams 305 and 306 are shown, whereby Q is divided into four polygons 653-656. Eventually, Q becomes an increasing number of separate, convex polygons, with an increasing number of edges, as illustrated in FIG. 16, where Q has been reduced to three convex polygons 653-655. When implementing this method it is sometimes advantageous to advance through neighboring beams rather than distant beams. For example, referring back to FIG. 15, it can be seen that a second unblocked beam alongside beam 305 would reduce the size of Q without adding any additional polygons, whereas in FIG. 16 unblocked beam 306 adds two new polygons 355 and 356. Additional polygons in Q require, inter alia, more memory to store the additional polygon data.

In some implementations, the method does not proceed beyond dividing Q based on unblocked narrow beams. The method ends when all unblocked beams have been analyzed. Each remaining polygon in Q is assumed to contain a touch object, but the object's location within the polygon is unknown. Reference is made to FIG. 16 showing three polygons 653-655 remaining in Q, and thus three objects are assumed to be touching screen 802 at these three locations, respectively. In some embodiments each polygon's center of gravity is assumed to be the center of its respective touch object.

Figure 17:
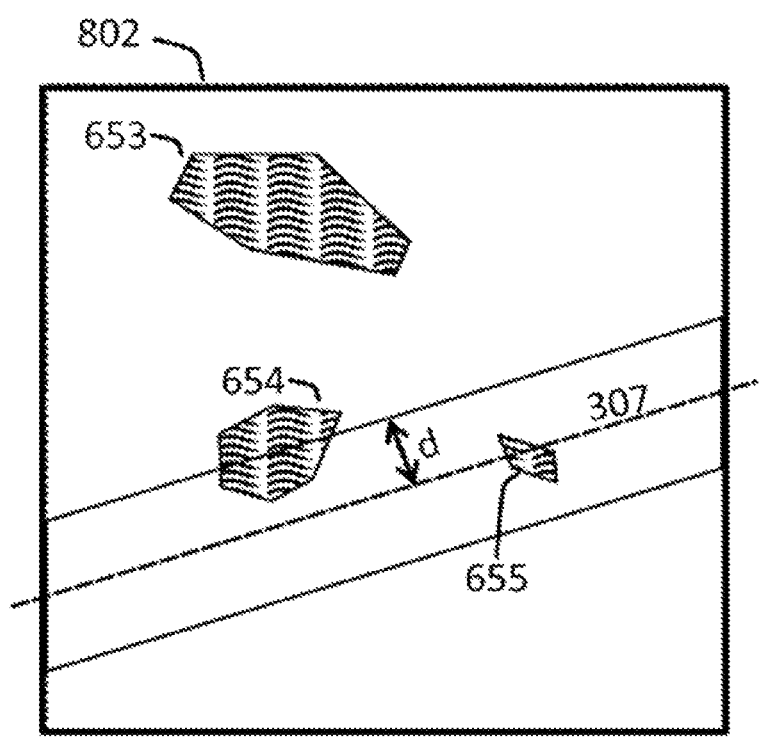
Figure 18:
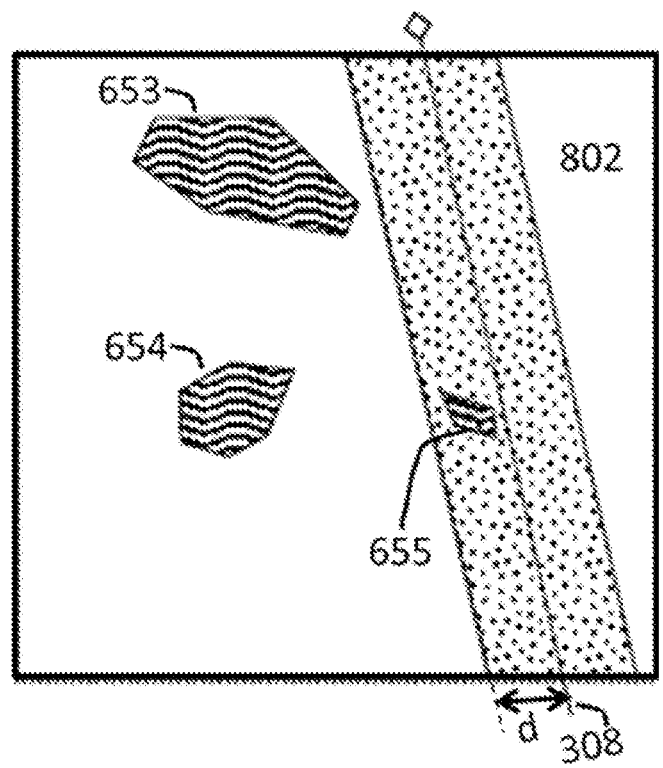

Certain touch patterns will generate more separate polygons in Q than touch points. These extra polygons are known as ghost points. One way of disambiguating or eliminating ghost points is to continue the method with a second step of analyzing blocked beams, as explained with reference to FIGS. 17 and 18. Each blocked beam i indicates a region $O_i$ along the beam containing at least one touch object with radius d. Since touch objects can only exist in Q, there is at least one object where $O_i$ intersects Q, i.e., $O_i \cap Q \neq \emptyset$. FIG. 17 shows blocked beam 307. Two polygons in Q lie within a distance d from the path of this beam, namely, polygons 654 and 655, and both polygons are equally likely to contain the blocking object. In order to resolve this ambiguity, only polygons in Q having a unique blocked beam, i.e., the blocked beam passes through only one polygon in Q, are assumed to contain a touch object. FIG. 18 shows a second blocked beam 308. Only one polygon in Q lies within a distance d from the path of this beam, namely, polygon 655. Therefore, polygon 655 definitely contains a touch object. Polygon 654 may contain an additional touch object, or it may be a ghost point. In cases when multiple objects are being tracked, polygons in Q crossed by non-unique blocked beams that seem to correspond to a tracked object are assumed to contain the tracked object. Thus, if the location of 654 corresponds to a previously tracked touch object, polygon 654 is assigned a touch object, but otherwise it is ignored as a ghost point.

The center of an assumed touch object is the center of gravity of its polygon Q. Alternatively, the center of an assumed touch object is the center of gravity of the polygon defined by $O_i \cap Q$, which may be smaller than polygon 654. Thus, polygons in Q traversed by a unique blocked beam definitely contain a touch object, whereas polygons in Q not traversed by a unique blocked beam but only by blocked beams that traverse multiple polygons in Q possibly contain a touch object. In some embodiments, these possible touch candidates are reported as possible, not definite, touch locations.

Figure 19:
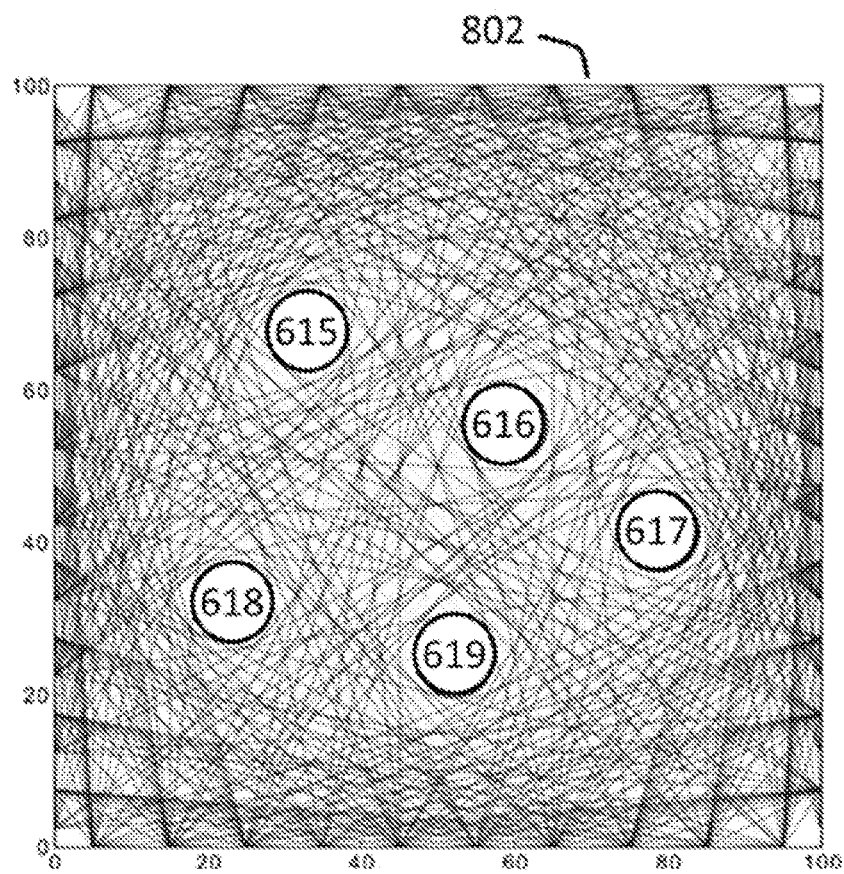
FIG. 19 is an illustration of five circles indicating areas though which no beams pass due to touch objects, in accordance with an embodiment of the present invention.

Reference is made to FIG. 19, which is an illustration of five circles 615-619 indicating areas though which no beams pass due to touch objects, in accordance with an embodiment of the present invention. Using the method illustrated in FIGS. 13-18, area Q inside each circle is the resulting touch candidate area. Thus, five touch objects are identified using only the unblocked beams shown in FIG. 19.

Figure 20:
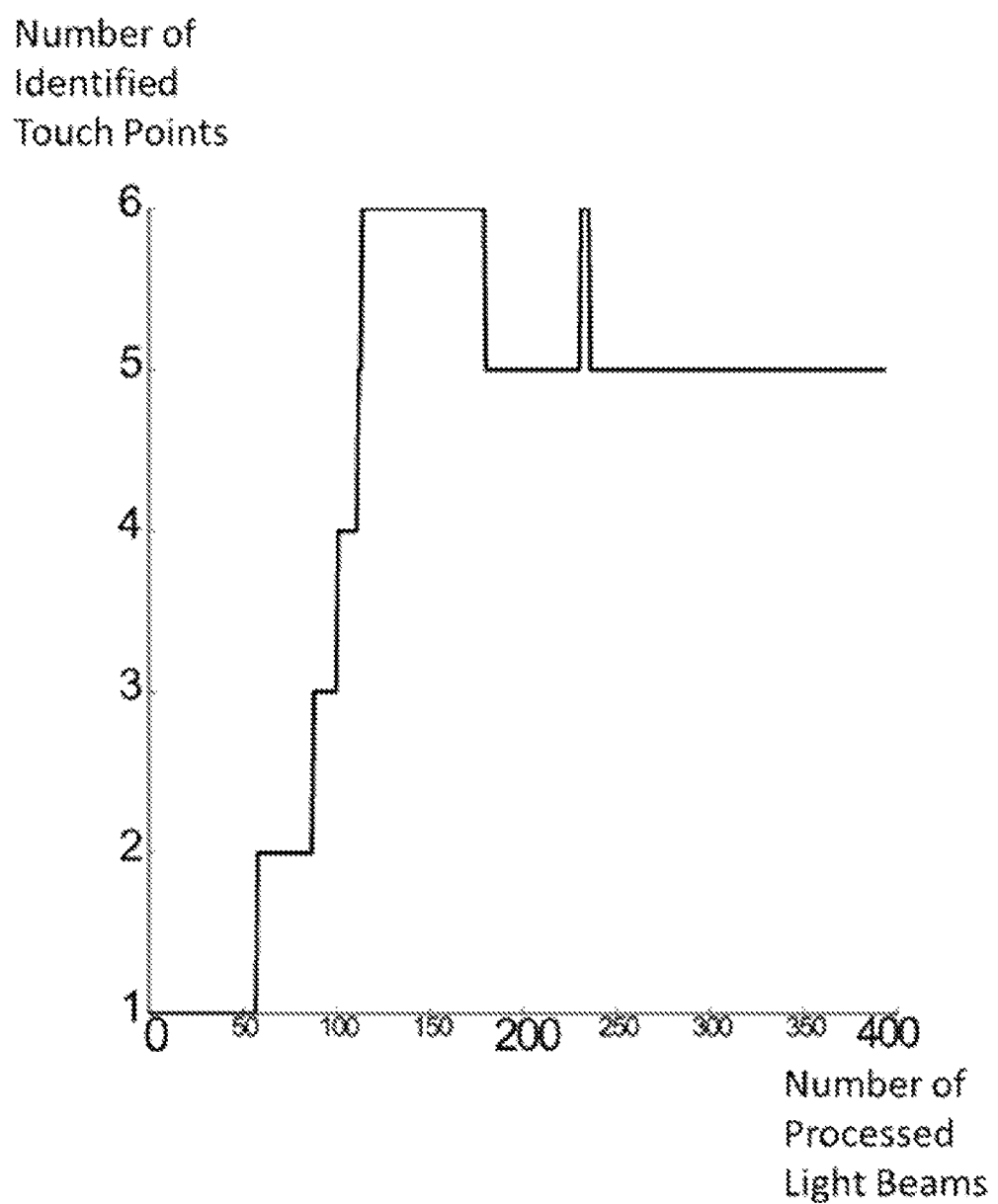
FIG. 20 is a graph tracking the number of separate touch candidate areas as a function of the number of unblocked beams, in accordance with an embodiment of the present invention.

Reference is made to FIG. 20, which is a graph tracking the number of separate touch candidate areas as a function of the number of unblocked beams, in accordance with an embodiment of the present invention. The x-axis represents the number of beams analyzed in a touch system, and the y-axis represents the number of individual polygons identified in Q. After analyzing 150 beams, six separate polygons are identified in Q. However, once 250 beams have been analyzed, one of the polygons was eliminated because some of the unobstructed beams 150-250 passed within d of the sixth polygon, removing it from Q.

In order to detect a touch object, having an assumed minimum diameter d, anywhere on the screen, every location on the screen must be within a distance d of at least one beam. Therefore, any area not within a distance d of at least one beam is identified and removed from Q. Put another way, any area farther than d from all beams is an undetectable area R. Any area common to Q and R, namely, $R \cap Q$, is a blind area. Such areas are defined by the beam layout and by the size of d and should be masked out of Q as it is not possible to determine if an object will be present there.

A variation of the method that excludes portions of area Q based on unblocked beams is now described. The method described above uses narrow beams, such that a beam is either blocked or unblocked, i.e., each beam has a binary state. The variation uses wide beams that can be partially blocked. In the case of wide beams an amount of blockage is used to determine where within the beam the blocking object may be located and excluding the remaining portion of the beam from Q.

Figure 21:
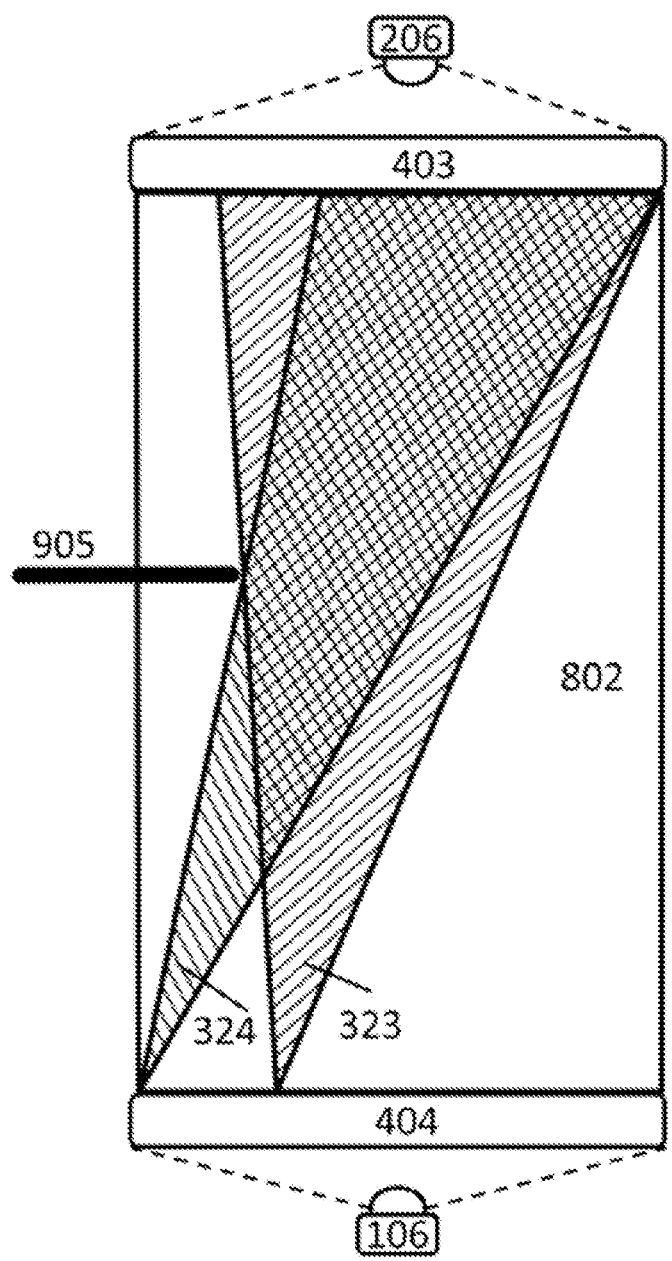
FIGS. 21 and 22 are simplified illustrations of a partially blocked wide beam, that illustrate effects of where a blocking object is placed, in accordance with an embodiment of the present invention.
Figure 22:
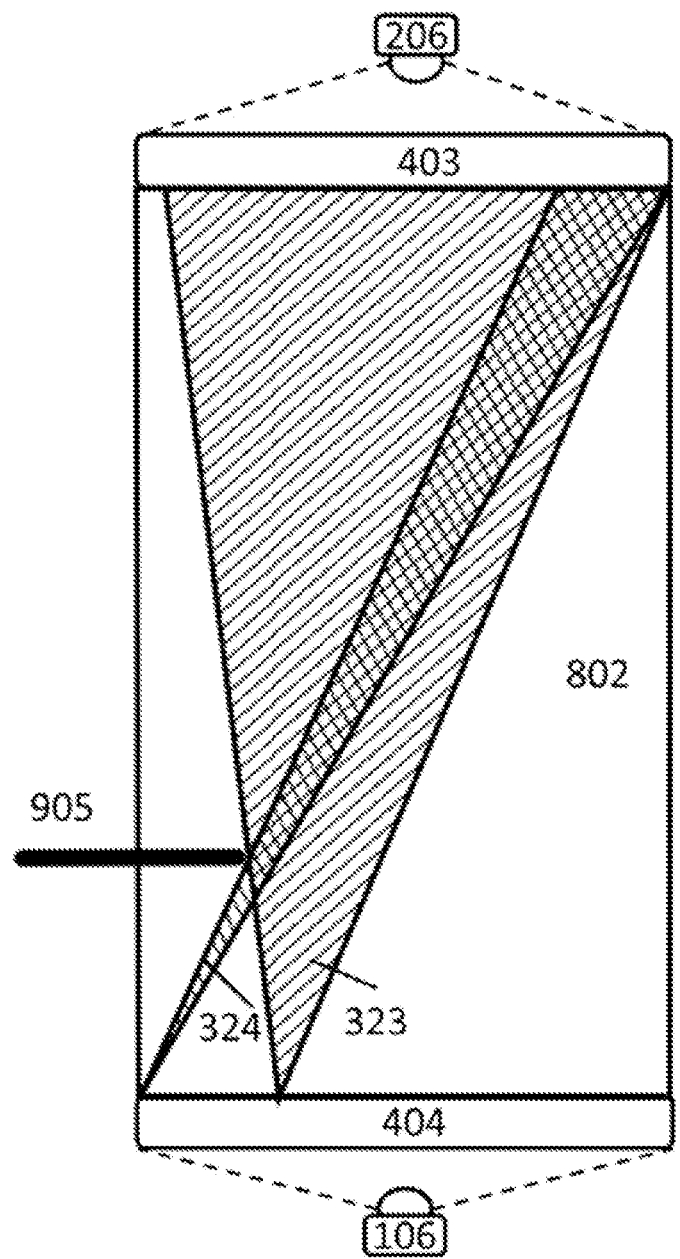

Reference is made to FIGS. 21 and 22, which are simplified illustrations of a partially blocked wide beam, that illustrate effects of where a blocking object is placed, in accordance with an embodiment of the present invention. FIG. 21 shows beams of light 323 and 324 exiting from an extended emitter lens 404 and arriving at an extended receiver lens 403. A wide beam from emitter 106 passing through lens 404 to receiver 206 via lens 403 can be simulated as a series of point-source beams originating along lens 404, each point-source beam spreading to cover receiver lens 403. Two such beams are shown in FIG. 21, namely beams 323 and 324. In FIG. 21, touch object 905 blocks a portion of these beams from reaching the left edge of receiver lens 403. The method assumes that any blocking object, e.g., pointer 905, has a radius of at least d and that the object blocks the beam from one of the beam's edges inward. Thus, the amount of expected light that is absent at receiver 206 indicates the extent that a touch object of radius d has entered this beam. FIG. 21 illustrates beam blockage when object 905 is inserted mid-way between lenses 404 and 403. Greater amounts of light are blocked when object 905 is inserted nearer to either lens 404 or lens 403 and object 905 is inserted less than half-way through the beam.

FIG. 22 shows object 905 inserted near emitter lens 404, and its effect on simulated point-source beams 323 and 324. In this case the total amount of detected light at receiver 206 is less than the amount detected in the case of FIG. 21, even though object 905 is inserted to the same extent through the wide beam (from lens 404 to lens 403). A similar amount of light is detected when object 905 is inserted near lens 403.

Thus, when an object having a radius d blocks a portion of a wide beam, the portion extending from the side of the beam inward, the outer edge of the object must be somewhere along a curve within the beam. Beam light intensities for all possible touch points of an object with radius d are calculated numerically using the model illustrated by FIGS. 21 and 22.

Figure 23:
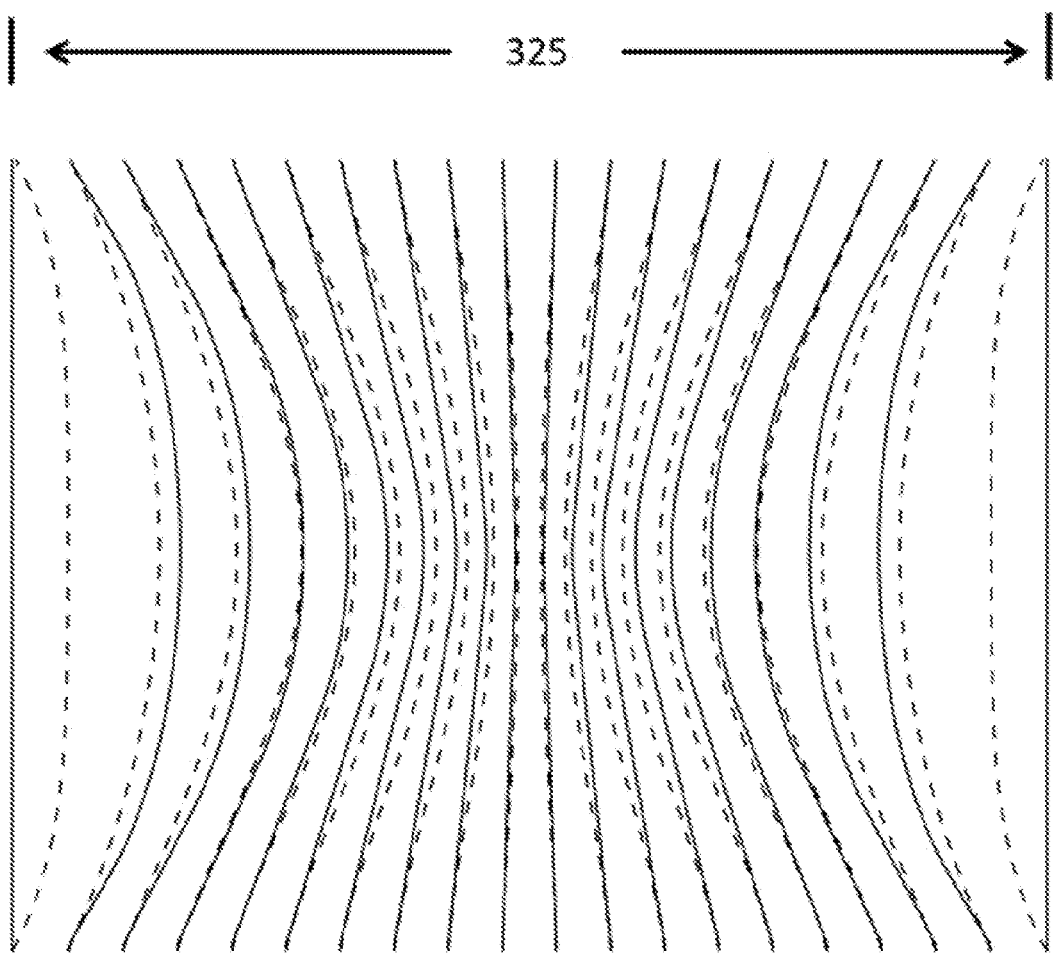
FIG. 23 is a simplified exemplary illustration of iso-curves across the width of a wide light beam, in accordance with an embodiment of the present invention.

Reference is made to FIG. 23, which is a simplified exemplary illustration of iso-curves across the width of a wide light beam, in accordance with an embodiment of the present invention. FIG. 23 shows the result of the above calculation displayed as a set of solid curves. The dashed curves are an approximation using a least squares fit polynomial. The solid and dashed curves are referred to as "iso-curves" (iso means equal). Thus, if the outer edge of the touch object is anywhere along an iso-curve the amount of light detected is the same.

In some embodiments of the present invention, the iso-curves are measured on the device. This is particularly suitable for systems that employ complex light guides in which the light intensity distribution across the width of the wide beam is not a simple curve, such as the light guide illustrated in FIG. 44, as explained below with reference to FIG. 51. In other embodiments of the present invention, the iso-curves are calculated as follows. When the beam is obstructed from the left to some edge (x, y), light emitted from position α on the source will shine on the sensor from the projection of the edge $\beta_0$, to the right edge of the sensor. Integrating the lit up ratio of the sensor over all emitting positions gives the total detected light intensity from the sensor. Left to right for x, α and $\beta_0$ range from 0 to 1, and y—the coordinate along the beam from source to sensor, also ranges from 0 to 1. The formulas for calculating the intensity ratio I are given by Equations (1) and (2):

$$\beta_0(x, y, \alpha) = \begin{cases} 1, & \gamma > 0 \\ 0, & \gamma < 0, \\ \gamma, & \text{otherwise} \end{cases} \quad \gamma = \alpha - \frac{x-\alpha}{y} \quad (1)$$

$$I = \int_{\alpha=0}^{1} 1 - \beta_0(x, y, \alpha) d\alpha \quad (2)$$

In some embodiments of the present invention, the iso-curves are measured on the device and added as a multiplier along with $\alpha$ and $\beta_0$.

FIG. 23 illustrates a plurality of iso-curves in wide beam 325 representing steps of 5% of the unobstructed light intensity. Thus, the leftmost curve represents the possible locations of the object's outer edge when 5% of the intensity of beam 325 is blocked, the second from left represents 10% blocked intensity, etc. The iso-curves marking the possible object edge on the right half of beam 325 are a mirror reflection of the iso-beams on the left half of beam 325. Although FIG. 23 illustrates specific iso-curves, they are not quantum steps, as evidenced by Equations (1) and (2) above. Rather, the iso-curves progress linearly across the entire width of beam 325 and the illustrated curves in FIG. 23 are merely examples.

Conceptually, each iso-curve is the equivalent of a thin beam in the previous method. That is, in the previous method, an unblocked thin beam means that the object of radius d was at least a distance d away from the beam path. Similarly, when for example 20% of wide beam 325 is blocked, that means that, with reference to the iso-curves in FIG. 23, the edge is somewhere along the fourth iso-curve from the left, or the fourth iso-curve from the right. The object cannot be right of the fourth-from-left iso-curve or to the left of the fourth-from-right iso-curve and thus these areas are removed from Q. Moreover, because the method is searching for the center coordinates of the touch object, a margin of width d along these iso-curves can further be removed from Q. This process is explained with reference to FIGS. 24-30.

Figure 24:
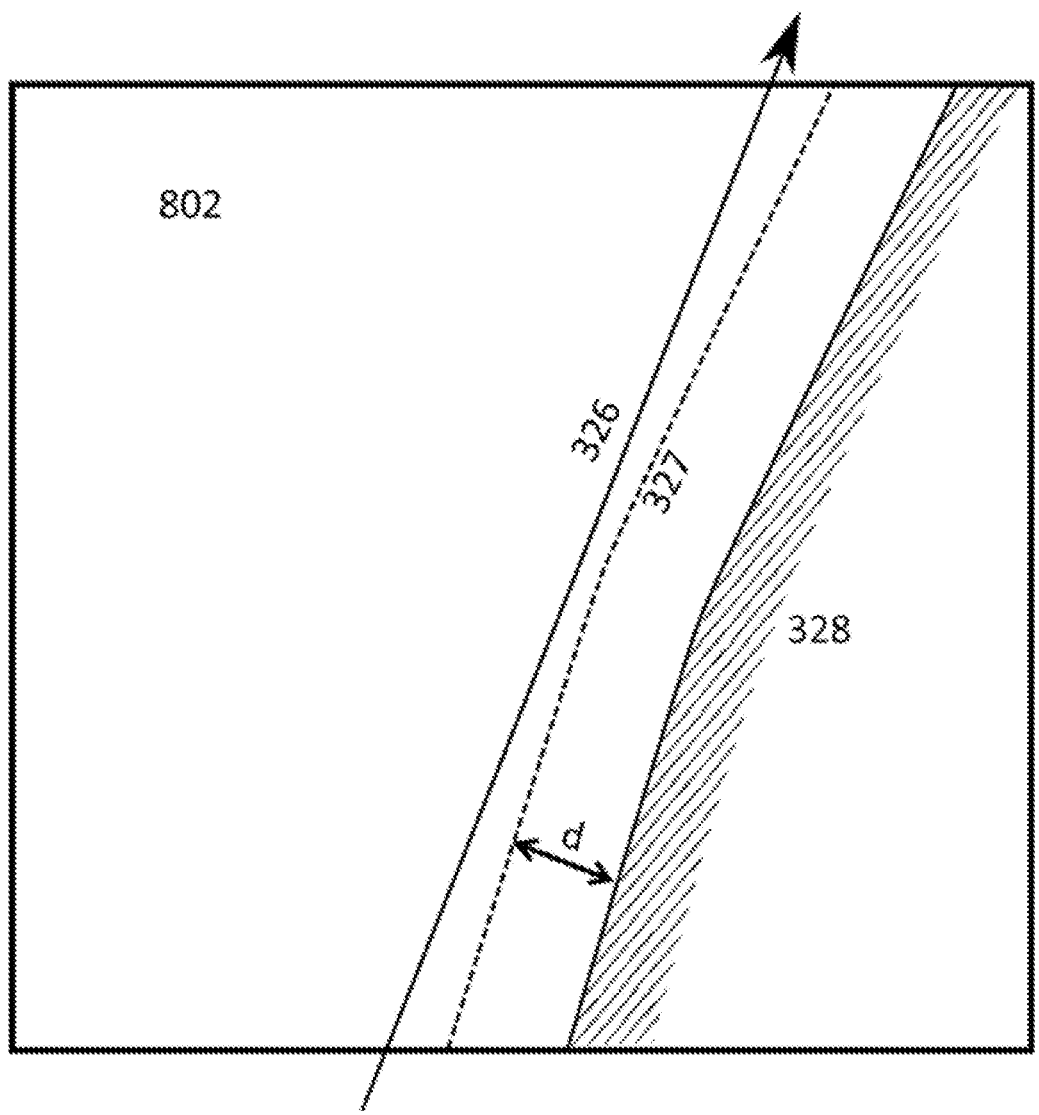
FIGS. 24-30 are simplified illustrations of a method of touch location determination, whereby portions of a large, candidate touch area are excluded based on unblocked, and partially blocked, wide light beams, in accordance with an embodiment of the present invention.

Reference is made to FIGS. 24-30, which are simplified illustrations of a method of touch location determination, whereby portions of a large, candidate touch area are excluded based on unblocked, and partially blocked, wide light beams, in accordance with an embodiment of the present invention. FIG. 24 shows the center 326 of a partially blocked wide beam crossing the screen. The amount of expected light missing from this wide beam is less than 50%; i.e., more than 50% of the beam's light was detected. A corresponding iso-curve 327 is shown to the left of center 326 indicating a border along which the object blocking this beam may be located. The object may be located anywhere to the right of iso-curve 327, but it cannot extend to the left beyond this iso-curve. Thus the area covered by this wide beam and left of iso-curve 327 can be removed from Q, assuming the object entered the beam from the beam's right edge. Moreover, because the method seeks the coordinates of the center of the object, a margin of width d to the right of iso-curve 327 can be further removed from Q. The area remaining in Q is area 328.

Figure 25:
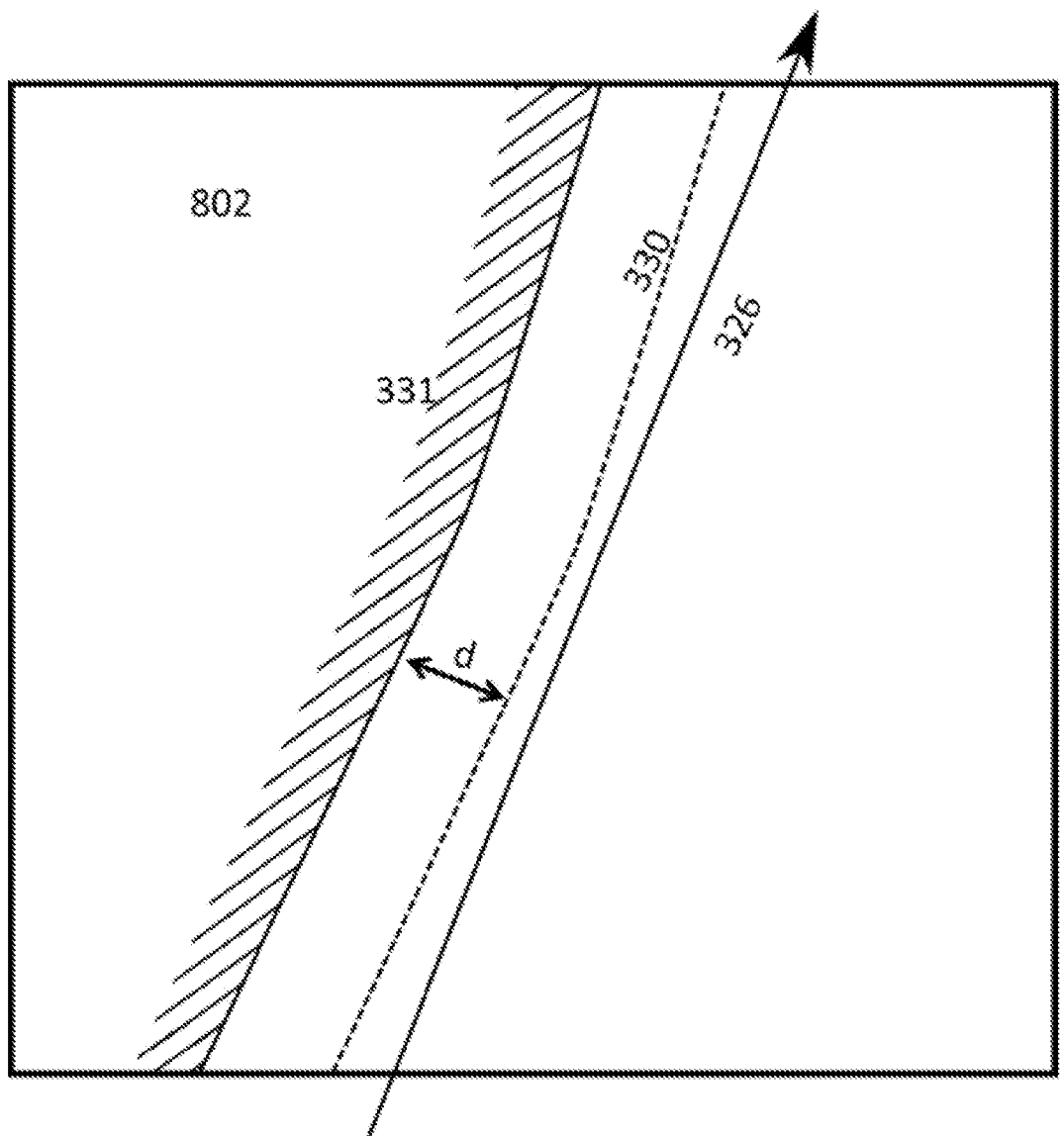

FIG. 25 shows center 326 of the same beam as in FIG. 24, but shows how Q is reduced when the object was inserted into this wide beam from the left. The corresponding iso-curve 330 is shown, to the right of which, the object cannot be located. And an additional margin having width d is shown along iso-curve 330 inside which the center of the object cannot be located. The area thus remaining in Q is shaded area 331.

Figure 26:
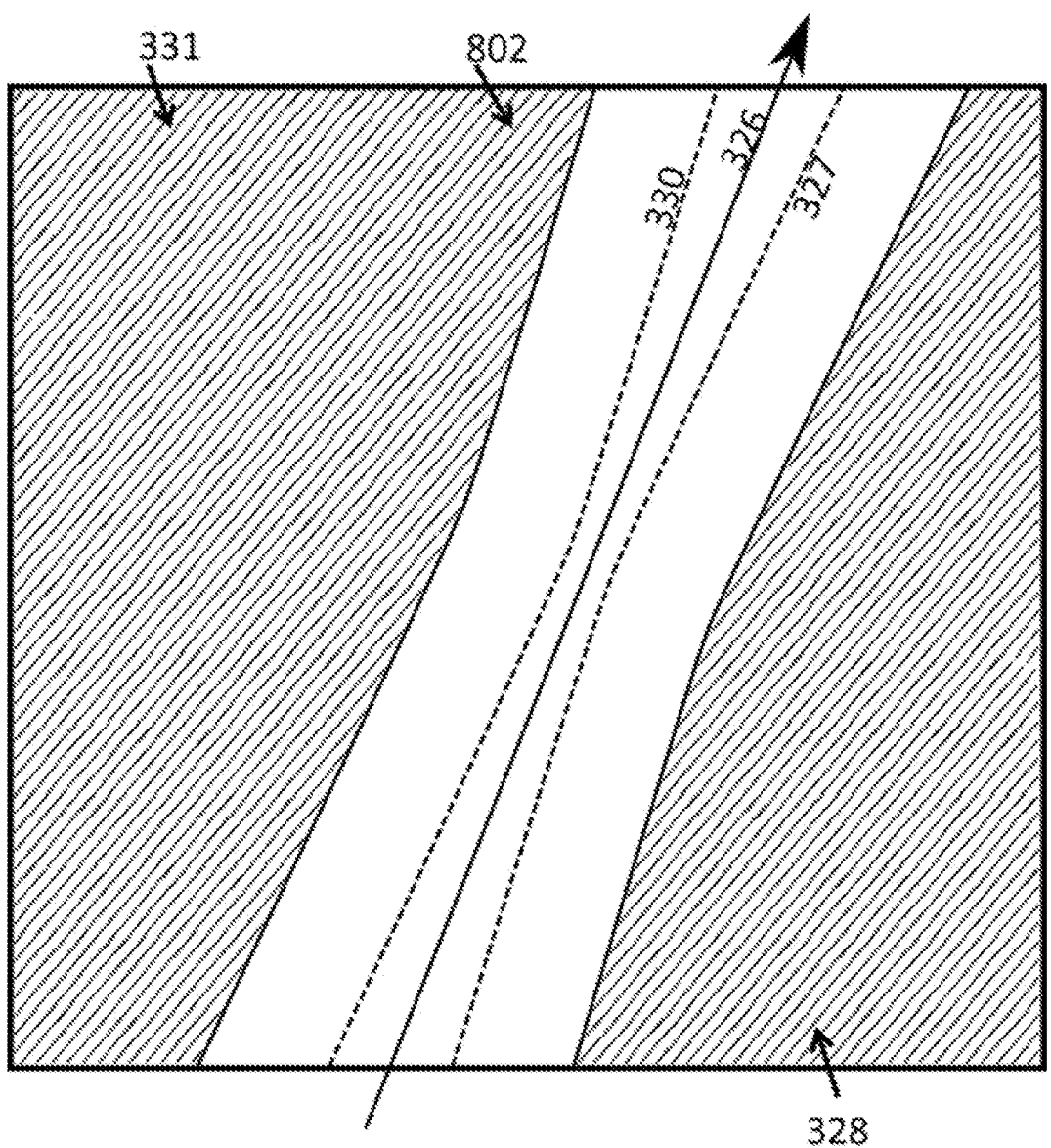

FIG. 26 shows the areas 328 and 331 remaining in Q (in screen 802) based on this partially detected wide beam. Thus, areas 331 and 328 are convex, as a result of the fact that more than 50% of the wide beam was detected, in other words, less than 50% of the beam was blocked. When less than 50% of the wide beam is detected, the resulting areas in Q are concave, as explained below.

Figure 27:
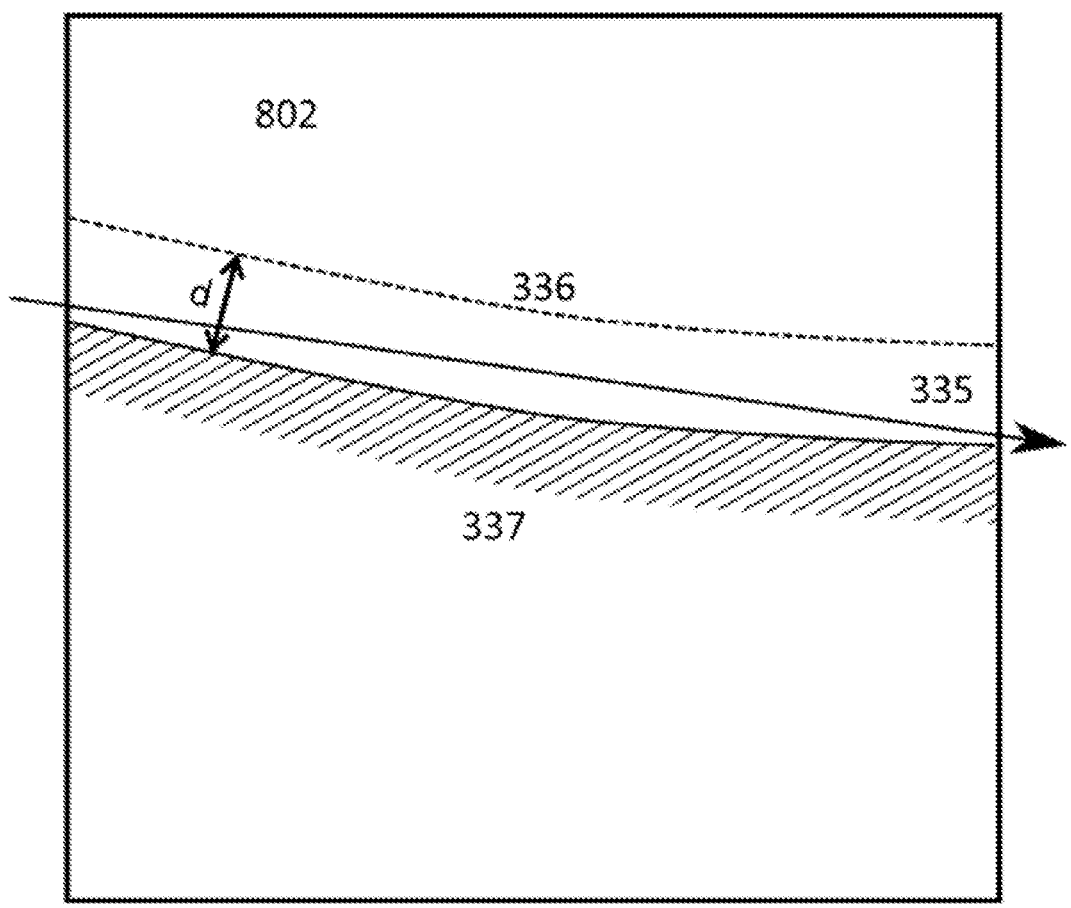

FIG. 27 shows the center 335 of a wide horizontal beam that is partially blocked. In this case, more than 50% of the beam is blocked, i.e., less than 50% of the expected light for this beam was detected. As above, it is unknown from which side of the beam the object entered the beam. FIG. 27 shows shaded area 337 as the remaining area Q if the object was inserted into the beam from below. In this case, iso-curve 336 is the curve along which the outer edge of the object may lie. It is noted that because the object is assumed to have been inserted from the bottom of the beam, and blocks more than 50% of the wide beam's light, the object is assumed to cover center 335 of this beam and iso-curve 336 is therefore above center 335. The object cannot extend upward of iso-curve 336 and therefore this area within the wide beam is removed from Q. Also, because this method searches for the center of the object, a margin of width d, the assumed radius of the object, below iso-curve 336 can also be removed from Q. Thus, the area remaining in Q is shaded area 337.

Figure 28:
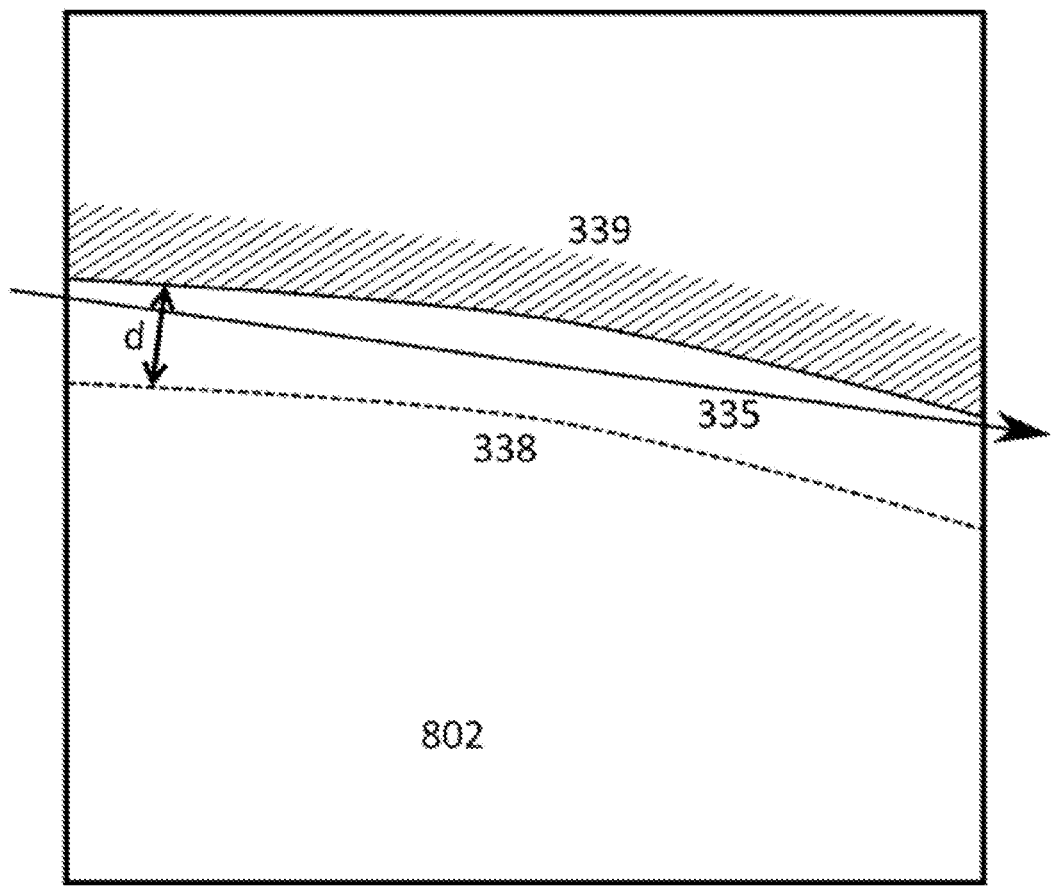

FIG. 28 shows how much remains in Q when it is assumed that the object enters the beam from above. FIG. 28 shows the center 335 of the beam, iso-curve 338 below center 335, and shaded area 339 remaining in Q. The border of area 339 is offset a margin d from iso-curve 338.

Figure 29:
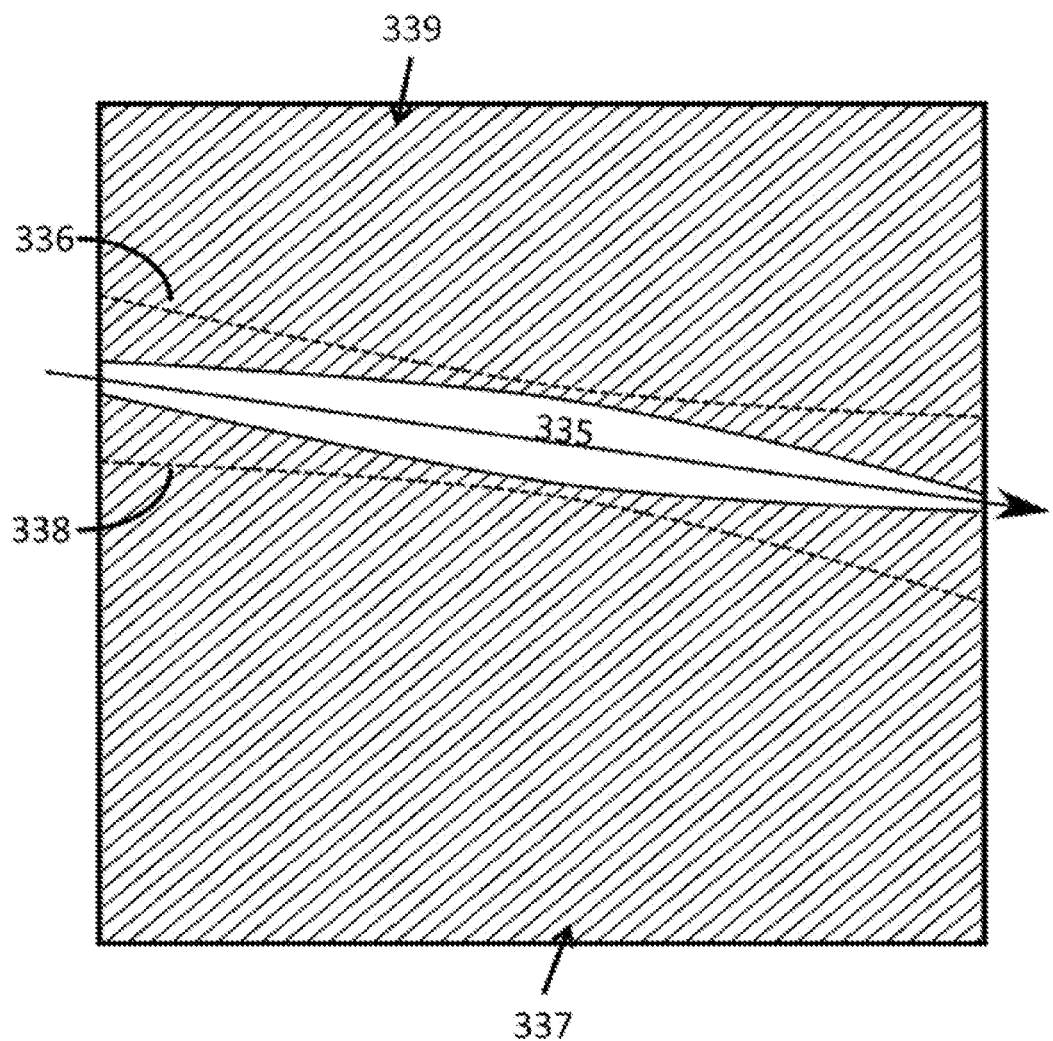

FIG. 29 shows the area remaining in Q after analyzing this horizontal beam that is mostly blocked, by combining the results of FIGS. 27 and 28. Areas 337 and 339 remaining in Q are concave.

Figure 30:
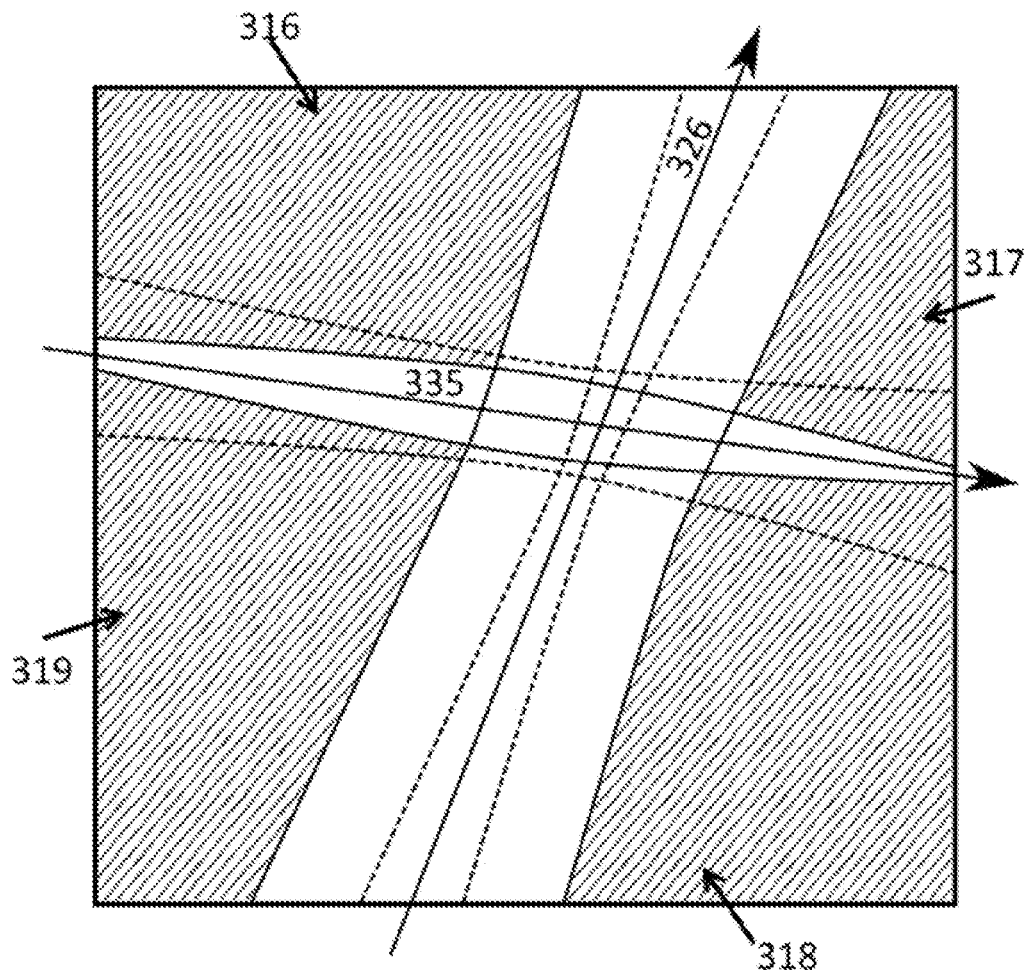

FIG. 30 shows a map of remaining areas Q after combining the analyses of the beams in FIGS. 26 and 29. Q is now made up of four separate areas 316-319.

Figure 31:
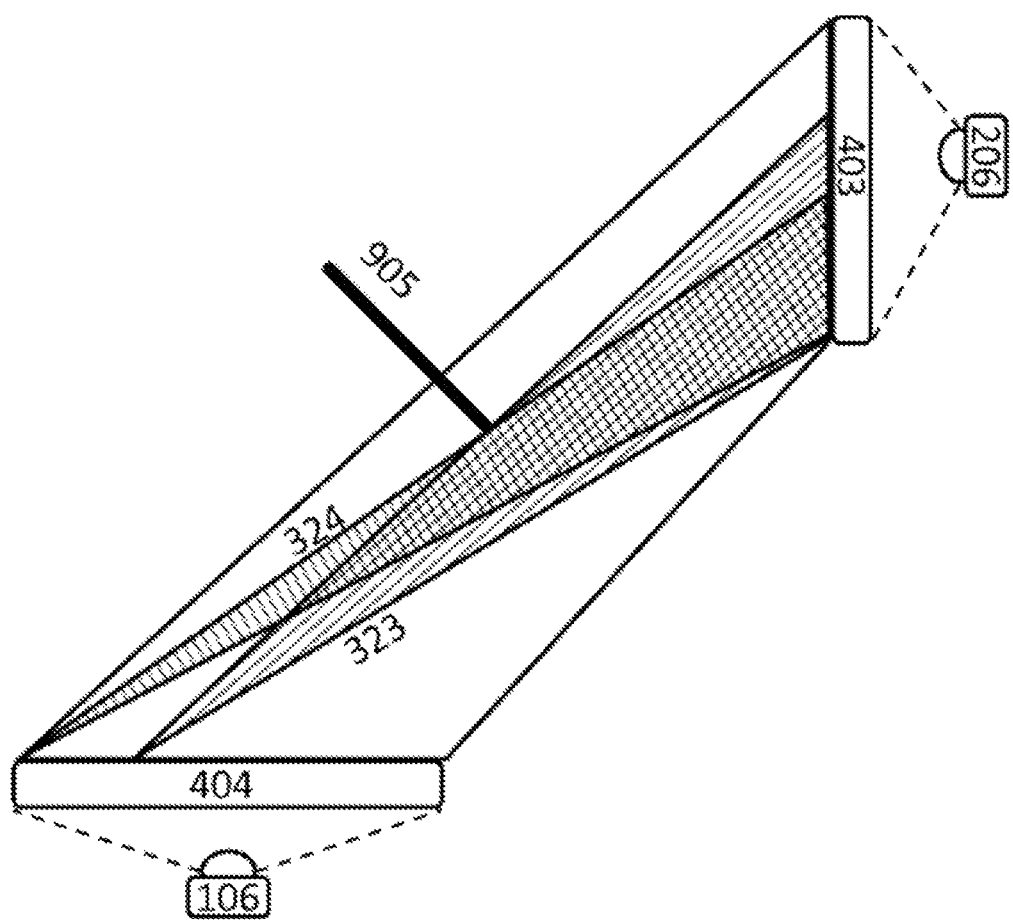
FIG. 31 is a simplified illustration of a partially blocked wide beam that extends between two adjacent screen edges, in accordance with an embodiment of the present invention.

Although the illustrated wide beams span an area between opposite sides of screen 802, this method also applies to beams that span an area between adjacent screen edges. Reference is made to FIG. 31, which is a simplified illustration of a partially blocked wide beam that extends between two adjacent screen edges, in accordance with an embodiment of the present invention. FIG. 31 shows a diagonal beam extending from a bottom edge to the right edge of the screen. The wide beam generated by LED 106 and emitter lens 404 terminates at receiver lens 403 which directs the beam to receiver 206. An object 905 is blocking a portion of the beam. Two simulated point-source beams 323 and 324 are shown, similar to those in FIGS. 21 and 22. Based on the calculations described hereinabove, a set of iso-curves is calculated for this beam to map possible edges of an object according to the amount of the beam that is blocked.

Figure 32:
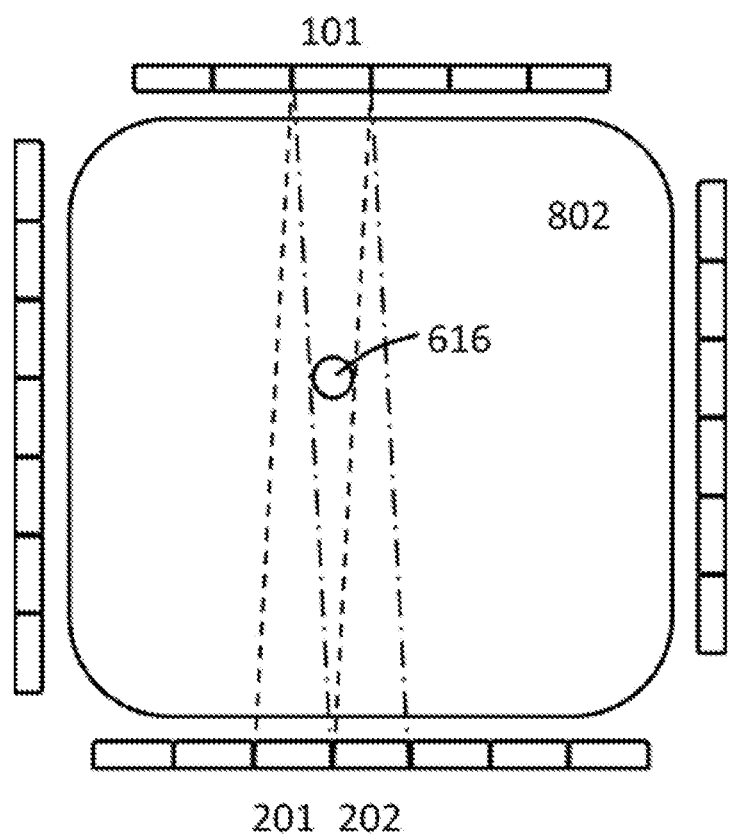
FIGS. 32-34 are simplified drawings of an object being detected, in accordance with another method of the present invention, utilizing wide light beams.
Figure 33:
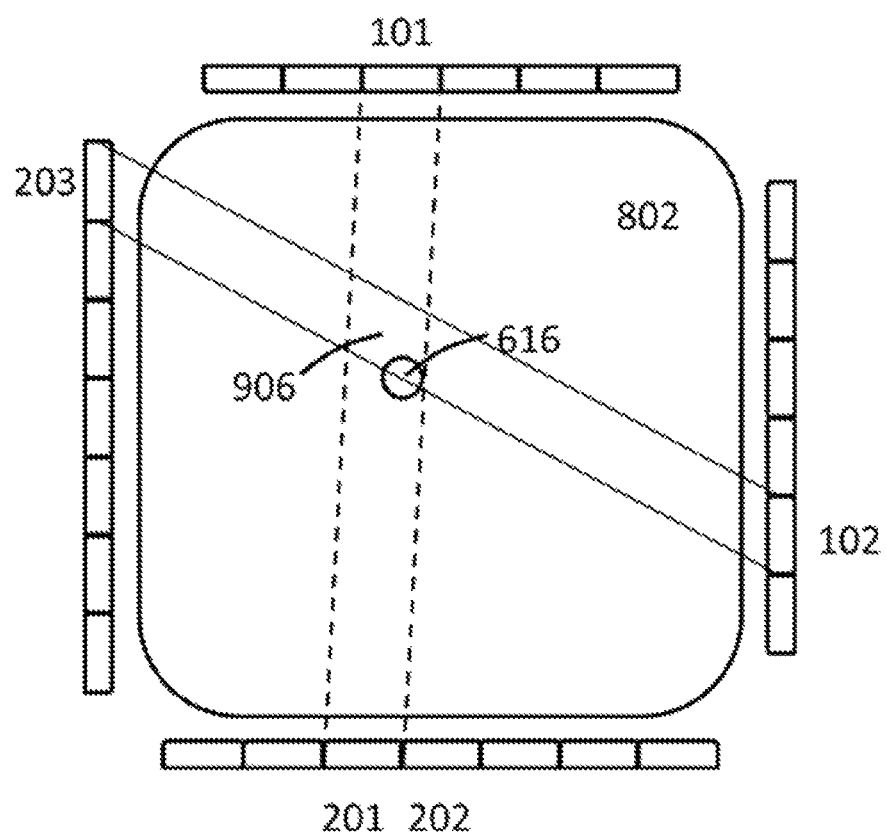
Figure 34:
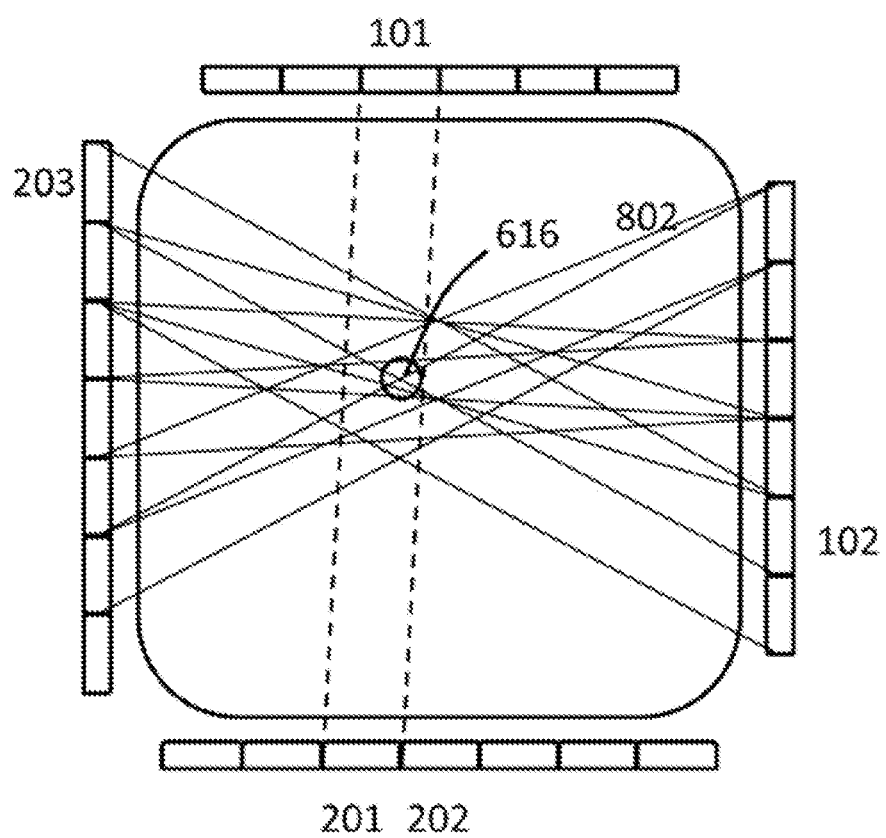

Reference is made to FIGS. 32-34, which are simplified drawings of an object being detected, in accordance with another method of the present invention, utilizing wide light beams. In some embodiments of the present invention, opposing rows of emitters and receivers are used, each emitter being opposite a respective receiver, whereas in other embodiments of the present invention the emitters are shift-aligned with the receivers. For example, each emitter may be positioned opposite a midpoint between two opposing receivers, or each emitter may be off-axis aligned with an opposite receiver, but not opposite the midpoint between two receivers. In addition, certain embodiments employ collimating lenses coupled with a surface of micro-lenses that refract light to form multiple wide divergent beams. A discussion of these different embodiments is included in U.S. Pat. No. 8,674,966 entitled ASIC CONTROLLER FOR LIGHT-BASED TOUCH SCREEN, incorporated by reference hereinabove. Once touch locations have been determined using any of the systems and methods described in U.S. Pat. No. 8,674,966, the present application teaches how to resolve possible ghost touches.

FIG. 32 shows touch location 616, the initial location of which on the horizontal axis of screen 802 is determined based on a weighted sum of two detection signals: the partially blocked beams from emitter 101 to receiver 201, and from emitter 101 to receiver 202. That is, the beams from emitter 101 to receiver 201 and from emitter 101 to receiver 202 are wide beams and each beam has a respective coordinate value along the horizontal axis of screen 802, $X_a$ and $X_b$. The coordinate value associated with each beam is assigned a weight W, corresponding to the amount of light blocked from that beam by the object at location 616. The location is thus determined using the weighted average $$X_P = (W_a X_a + W_b X_b)/(W_a + W_b), \quad (3)$$

where the weights $W_a$ and $W_b$ are normalized signal differences for the two beams.

If the pointer is detected by more than two emitter-receiver pairs, then the above weighted average is generalized to $$X_P = \Sigma(W_n X_n)/(\Sigma W_n), \quad (4)$$

where the weights $W_n$ are normalized signal differences, and the $X_n$ are weight positions. These calculations are described in U.S. Pat. No. 8,674,966, with reference to FIGS. 137 and 143-150 therein, based on an initial assumed Y axis coordinate of the touch. Thus, both an X-coordinate and a Y-coordinate are determined initially. For the sake of exposition, the beams crossing screen 802 in a vertical direction, e.g., beams 101-201 and 101-202, are referred to as vertical wide beams, and beams crossing screen 802 in a horizontal direction, e.g., beams between emitters and receivers along the left and right sides of screen 802, are referred to as horizontal wide beams.

In order to refine the touch coordinate further and resolve any possibility that this determined location is actually a ghost point, a second set of calculations is performed. The first step in this second process is to assemble a list of all of the vertical wide beams that contributed to the X coordinate calculation, e.g., beams 101-201 and 101-202 in the example of FIG. 32. For each vertical wide beam in this list, a secondary list is compiled of all wide beams from any emitter on the right side of the screen to any receiver on the left of the screen that crosses the determined location. FIG. 33 shows two intersecting wide beams: vertical wide beam 101-201 and horizontal wide beam 102-203. The secondary list of wide beams crossing beam 101-201 and also covering coordinate 616 is illustrated in FIG. 34. A similar secondary list is compiled for wide beams crossing beam 101-202 and also covering coordinate 616.

Thus, numerous pairs of intersecting beams are identified in which the intersection covers the determined location. Each such intersection between two wide beams forms a two-dimensional shape, such as rhombus 906 in FIG. 33. The center of gravity of each rhombus is used as a coordinate in calculating a weighted sum to refine the touch location. However, if any of the intersecting beams in the secondary list is entirely unblocked, it is evident that the current touch location is a ghost touch, not a real touch.

When all of the intersecting beams in the secondary list are at least partially blocked, the touch location is refined by calculating a weighted sum using the center of gravity of each rhomboid intersection area multiplied by a weight corresponding to the degree to which that rhomboid's intersecting horizontal beam is blocked. In some embodiments, the weight corresponds to the degree to which both of that rhomboid's intersecting beams are blocked—i.e., both the vertical beam and the horizontal beam.

This process is repeated for the Y coordinate calculation, using horizontal beams that contribute to the initial Y coordinate calculation. In this case, the secondary list for each horizontal wide beam includes wide beams from any emitter along the top edge of the screen to any receiver along the bottom edge of the screen that covers the initial touch location.

Figure 35:
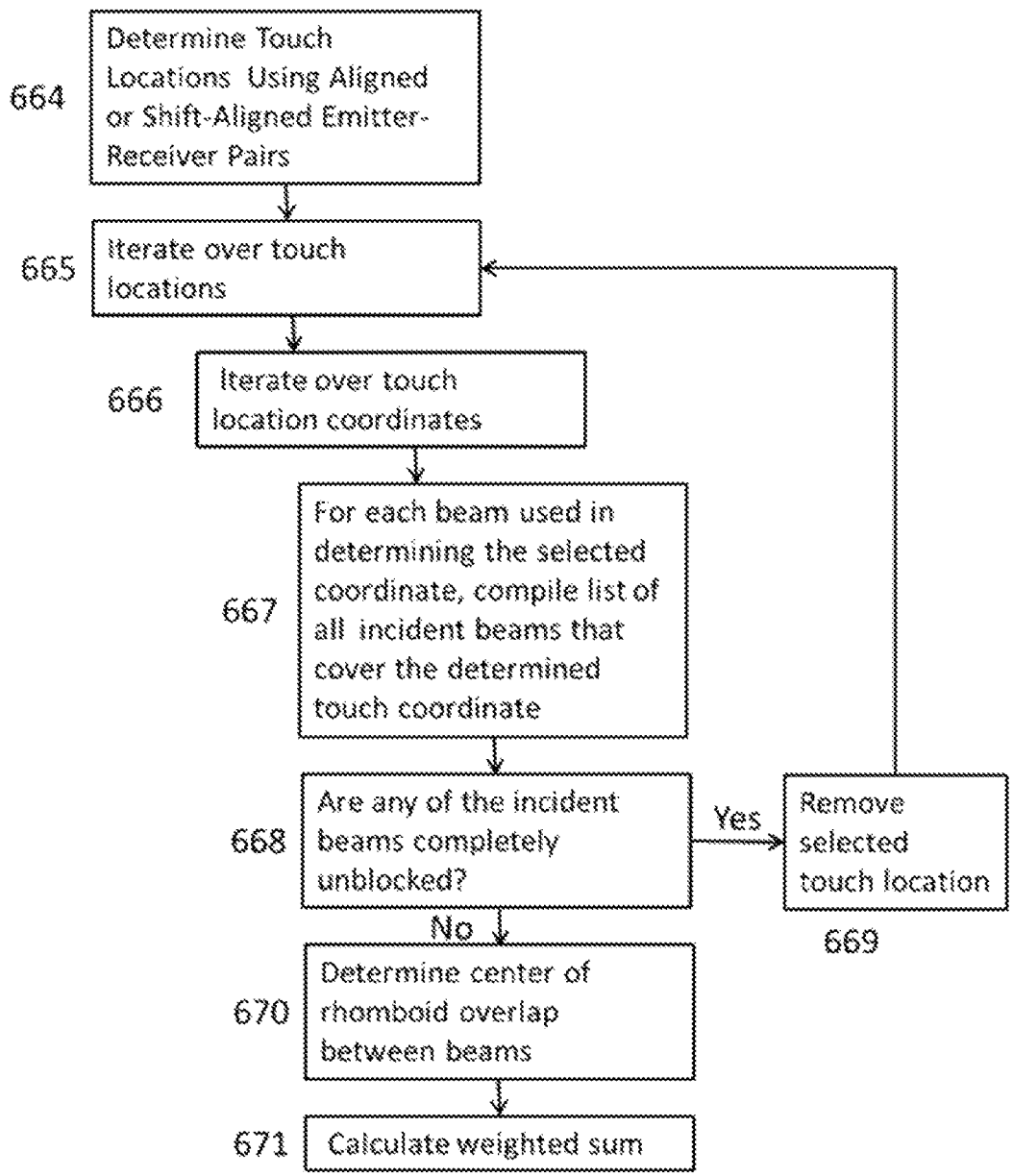
FIG. 35 is a flowchart for a method of eliminating ghost touches, in accordance with an embodiment of the present invention.

Reference is made to FIG. 35, which is a flowchart for a method of eliminating ghost touches, in accordance with an embodiment of the present invention. At step 664, an initial set of possible touch coordinates is calculated using only vertical and horizontal light beams, but not diagonal beams. In systems in which the emitters are shift-aligned with the receivers, only shift-aligned emitter-receiver pairs are used. This includes divergent pairs of beams from one emitter to two receivers.

Step 665 is a loop that iterates over each touch candidate calculated in step 664. Step 666 is a loop over the x and y coordinates of each touch candidate. The body of this inner loop is steps 667-671.

At step 667 the system compiles a list of all beams that cross one of the beams used in step 664 and also traverse the coordinate calculated in step 664. In some embodiments this is done by consulting a look up table. In other embodiments, calculations are used to compile this list.

At step 668 the system checks whether any of these incident beams is completely unblocked. If any of these beams is completely unblocked, the candidate touch location is determined to be a ghost point (step 669) and the system advances to the next touch candidate.

If all of the beams at step 668 are partially blocked, the system refines the touch coordinate by calculating a weighted sum of all of the incident beams crossing this touch location. The rhomboid area of overlap between each of the wide beams used in step 664 and each of the wide beams identified in step 667 is calculated at step 670. Then the center of gravity of this area is calculated, and the center of gravity's coordinate along the desired axis is used in the weighted sum. A respective weight is assigned to each center of gravity according to the degree to which the incidental beam is blocked. The refined touch coordinate is a weighted sum of all the center-of-gravity coordinates along the desired axis, calculated at step 670. This weighted sum is calculated at step 671.

Lenses

In some embodiments of the invention each LED and each PD is coupled with a lens. This section explains several lens structure alternatives that maximize the amount of light utilized for touch detection.

Figure 36:
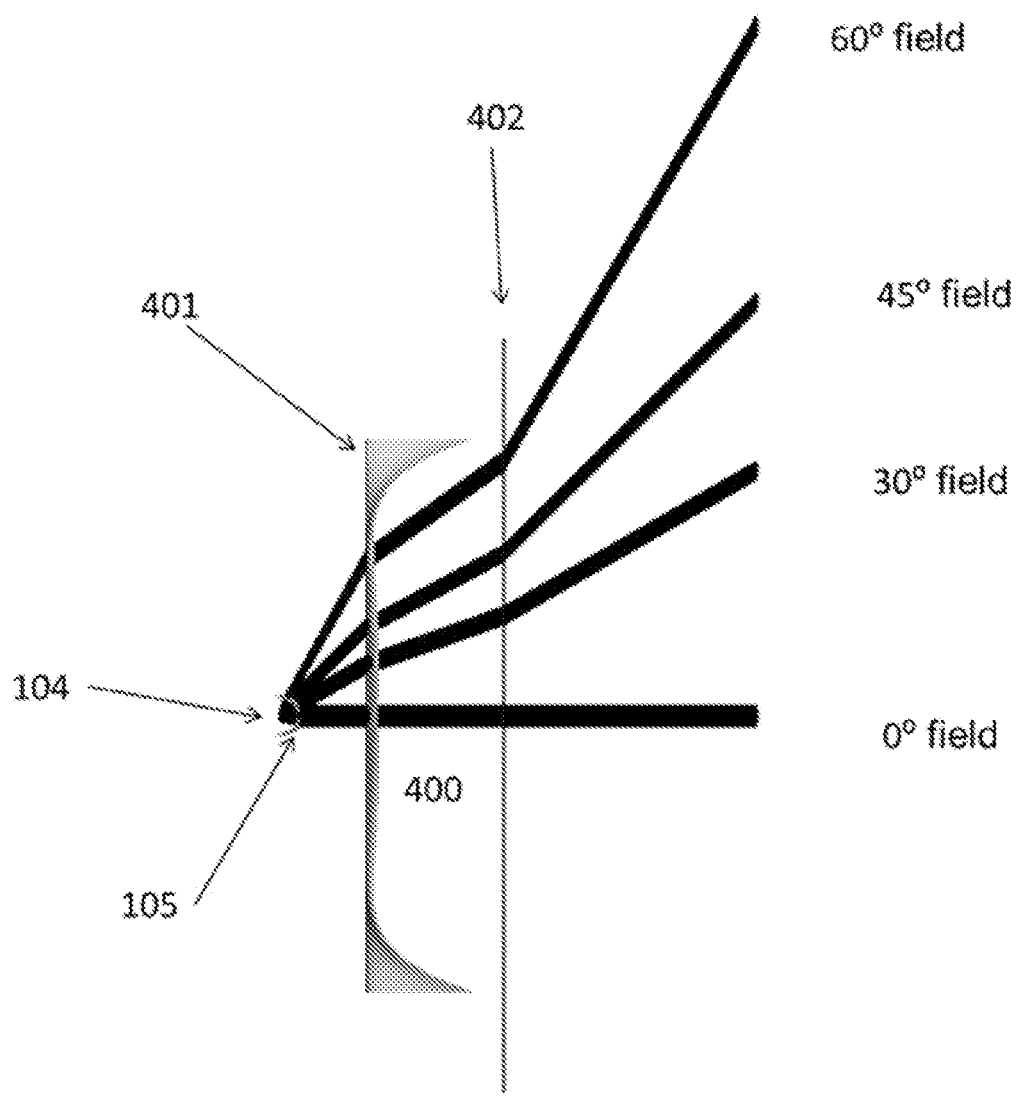
FIG. 36 is a simplified drawing of a lens that distributes beams across many angles, in accordance with an embodiment of the present invention.

A first lens is acylindrical, with a progressive focal length, in order to keep good focus on the associated LED or PD chip for all angles. Reference is made to FIG. 36, which is a simplified drawing of a lens that distributes beams across many angles, in accordance with an embodiment of the present invention. FIG. 36 is a view from above, showing an LED chip 104 emitting light beams through its plastic shell 105 and into lens 400 of the present invention. Lens 400 has a curved entry surface 401 and a flat exit surface 402. Four beams are shown exiting the lens at angles of 0°-60°. However, a continuous array of beams exits along the lens exit surface 402, and their angles gradually increase along the exit surface 402. The curvature of entry surface 401 is optimized for this progression of exit angles. Entry surface 401 is only curved in the plane perpendicular to the screen, and thus has no optical power in the plane of the screen.

Figure 37:
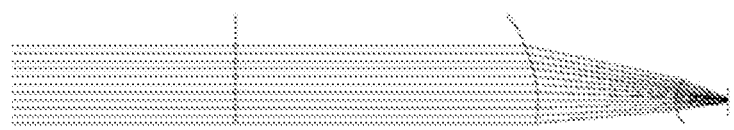
FIG. 37 is a simplified figure of four different fields of view that are all focused on a single diode, in accordance with an embodiment of the present invention.
Figure 37:
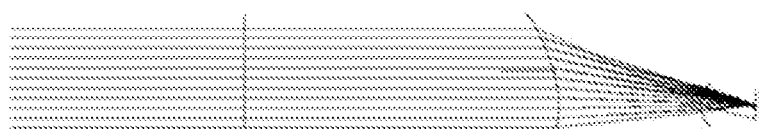
Figure 37:
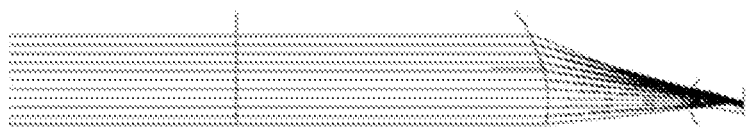
Figure 37:
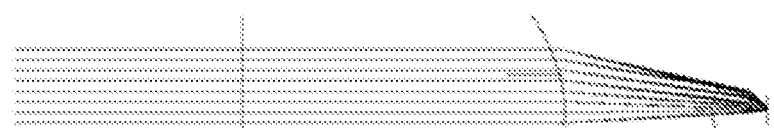

Reference is made to FIG. 37, which is a simplified figure of four different fields of view that are all focused on a single diode, in accordance with an embodiment of the present invention. FIG. 37 is composed of four side views of fields of collimated beams each entering the light guide at a different angle, namely the same angles shown in the FIG. 36 view from above. Despite these different angles, FIG. 37 shows how all four fields are focused on the diode chip, despite their largely varying effective focal lengths.

Figure 38:
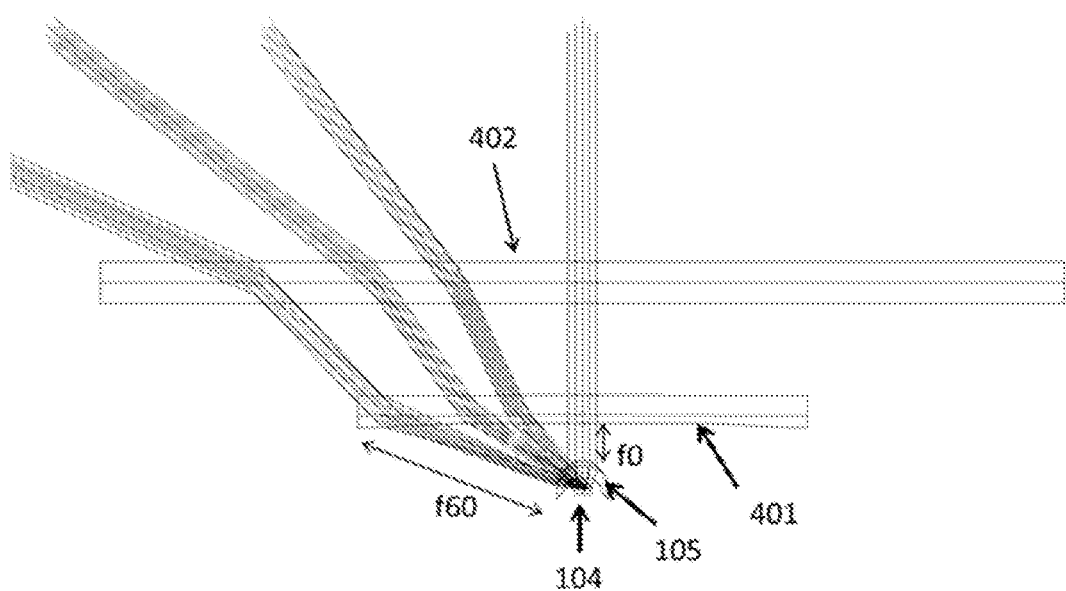
FIG. 38 is a simplified illustration of the four fields of view of FIG. 37 as viewed from above, in accordance with an embodiment of the present invention.

Reference is made to FIG. 38, which is an illustration of the four fields of view of FIG. 37 as viewed from above, in accordance with an embodiment of the present invention. FIG. 38 shows a short focal length f0 for 0° and a long focal length f60 for 60°. The same numbered elements represent the same objects, in FIGS. 36 and 38. Although lens 400 is described with reference to LED 104, identical lenses are used for the PDs as well.

Figure 39:
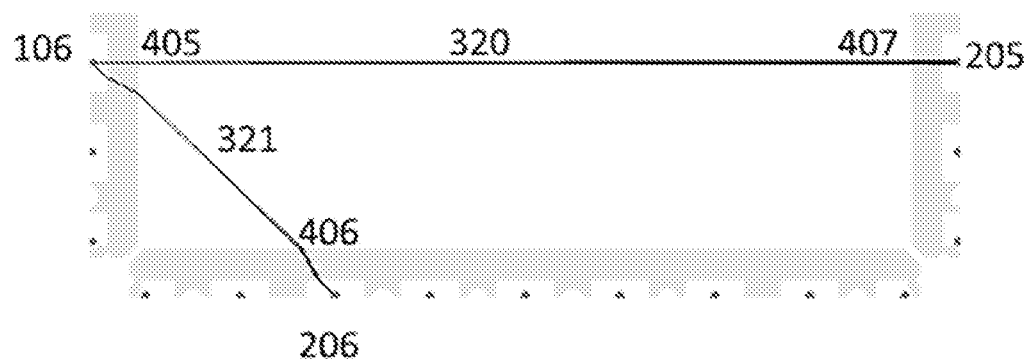
FIGS. 39 and 40 are simplified illustrations of two beams from one emitter to two respective PDs, in accordance with an embodiment of the present invention.
Figure 40:
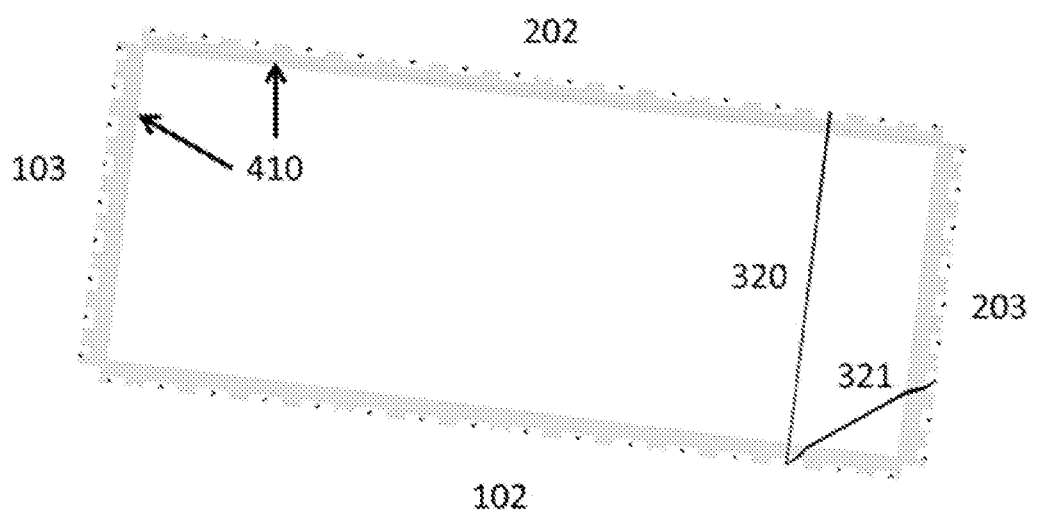

Reference is made to FIGS. 39 and 40, which are illustrations of two beams from one emitter to two respective PDs, in accordance with an embodiment of the present invention. FIG. 39 shows how beams from one LED 106 arrive at two PDs 205 and 206 as a result of lenses 405-407. Shown in FIG. 39 are beam 320 from LED 106 to PD 205 and beam 321 from LED 106 to PD 206. FIG. 40 shows beams 320 and 321 inside an entire light guide frame 410 surrounded by LEDs 102-103 and PDs 202-203.

Figure 41:
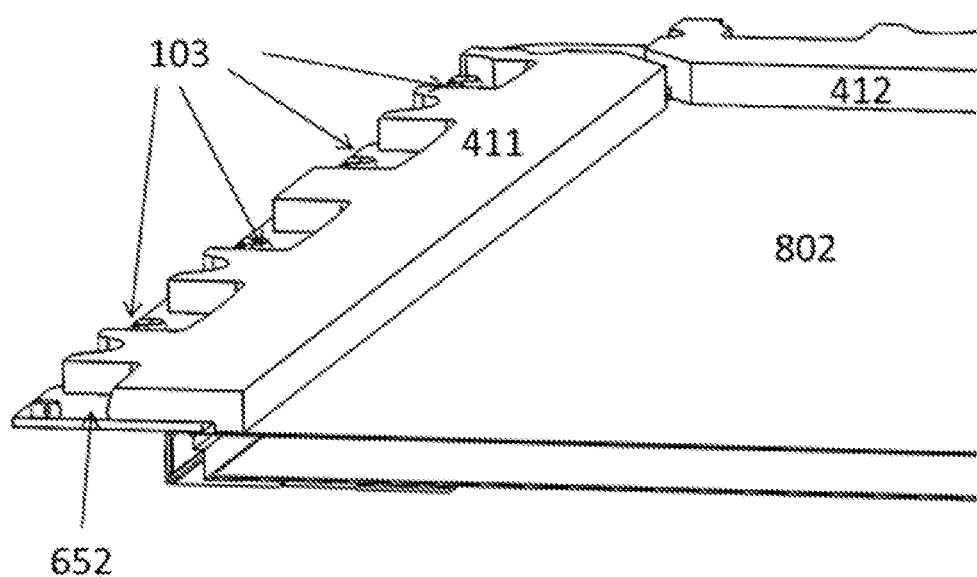
FIGS. 41-43 are simplified illustrations of an arrangement of components, light guides, PCB and screen in a device, in accordance with an embodiment of the present invention.
Figure 42:
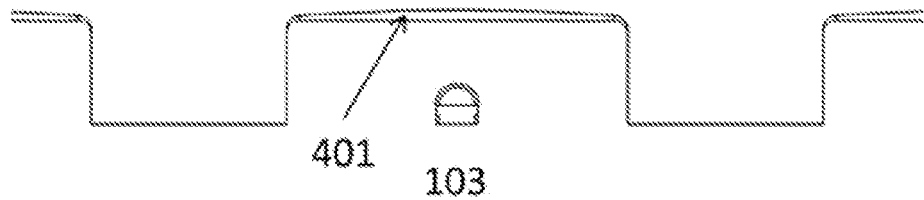
Figure 43:
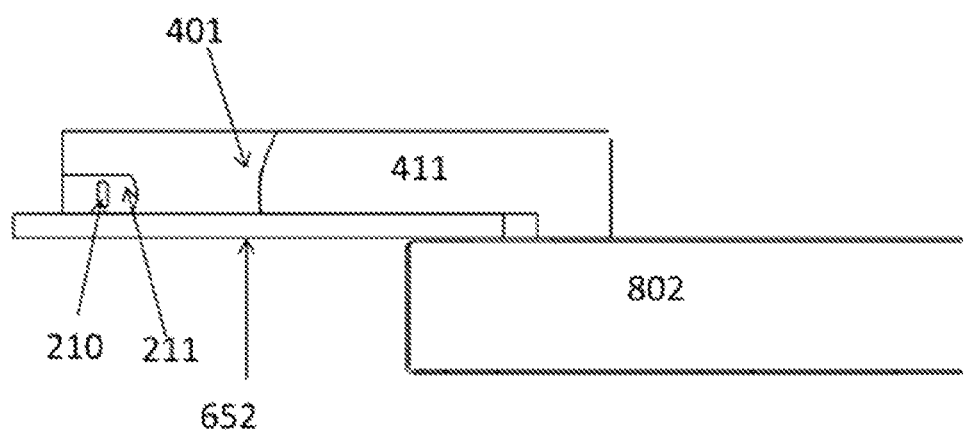

Reference is made to FIGS. 41-43, which are illustrations of an arrangement of components, light guides, PCB and screen in a device, in accordance with an embodiment of the present invention. FIG. 41 shows a portion of a touch screen assembly according to the present invention. Two light guides 411 and 412 are placed along two perpendicular edges of screen 802. An array of LEDs 103 is arranged on PCB 652 behind light guide 411.

FIG. 42 shows a view from above of a portion of the arrangement shown in FIG. 41. FIG. 42 shows one LED 103 facing light guide 411; PCB 652 and screen 802. Curved inner lens surface 401 faces LED 103.

FIG. 43 shows a side cutaway view of a portion of the arrangement shown in FIG. 41, except that LED 103 is replaced by PD 210 encased in PD shell 211. FIG. 43 also shows light guide 411 having inner surface 401, PCB 652 and screen 802. In the cross-section view shown in FIG. 43 inner surface 401 is curved along its height in order to collimate light along the height of lens 411, i.e., perpendicular to the screen. This cross-section is through the optical axis, which is the center of PD 201, and the curve seen is for the forward 0° field illustrated in FIGS. 36-38. If the cross-section were done in another plane, the curvature would be different to suit the corresponding field angle.

A second option is a light guide featuring both refractive elements and reflective elements. This light guide enables utilizing light emitted from the LED at more extreme angles than lenses that use only refraction, thereby gathering more of the emitted LED light. This light guide allows for a wider pitch within a limited space in the light direction, i.e., a more extreme ratio between the pitch and the depth/length from the chip to the end of the light guide.

Figure 44:
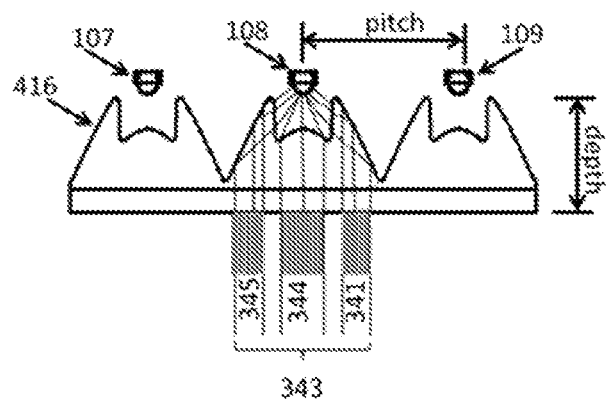
FIGS. 44 and 45 are simplified illustrations of a light guide, in accordance with an embodiment of the present invention.
Figure 45:
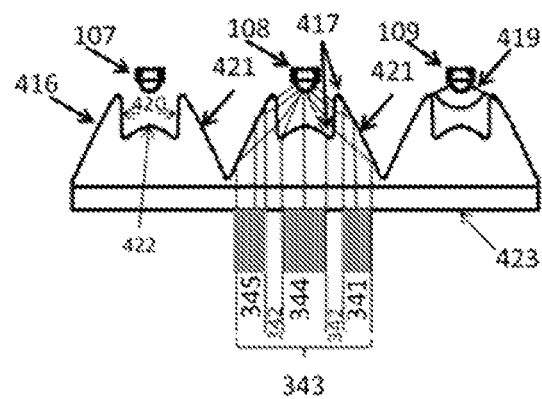

Reference is made to FIGS. 44 and 45, which are simplified illustrations of a light guide, in accordance with an embodiment of the present invention. FIG. 44 shows a light guide 416, three light emitters 107-109 and the "pitch" and "depth" mentioned above. FIG. 45 shows a compound lens embodiment, including light guide 416 and three LEDs 107-109. Light guide 416 has three identical sections, one opposite each of the LEDs. Similar compound lenses are used for the PDs. Light guide 416 has an exceptionally wide viewing angle 419 as a result of refractive surfaces 420 and reflective surfaces 421. Light directed forward from the emitter is not reflected; it is collimated by collimating optical surface 422.

Thus three portions of the output light field 343 are: central, collimated portion 344, and left and right collimated portions 345 and 341. Two gaps 342 in output light field 343 are shown. These are caused by radii 417 joining refractive surface 420 to refractive surface 422 and to reflective surface 421, respectively. Several methods are provided for covering gaps 342, using either microstructures, air gaps in the light guide, or a combination thereof. The air gap solutions close gaps 342, whereas the microstructure configurations reduce the severity of gaps 342, but do not remove them entirely.

Figure 46:
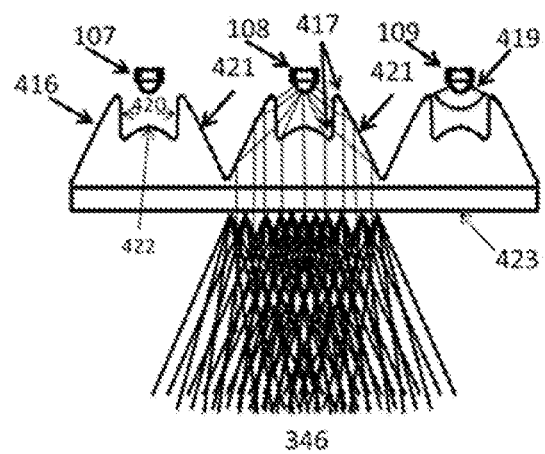
FIG. 46 is a simplified illustration of how microstructures correct the problem of gaps in the light field, in the light guide of FIGS. 44 and 45, in accordance with an embodiment of the present invention.

Reference is made to FIG. 46, which is a simplified illustration of how microstructures reduce the problem of gaps in the light field, in the light guide of FIGS. 44 and 45, in accordance with an embodiment of the present invention. FIG. 46 shows the effect of light-scattering microstructures applied to outer lens surface 423. Gaps 342 in light field 341 illustrated in FIG. 45 are now covered by scattered beams 346.

Figure 47:
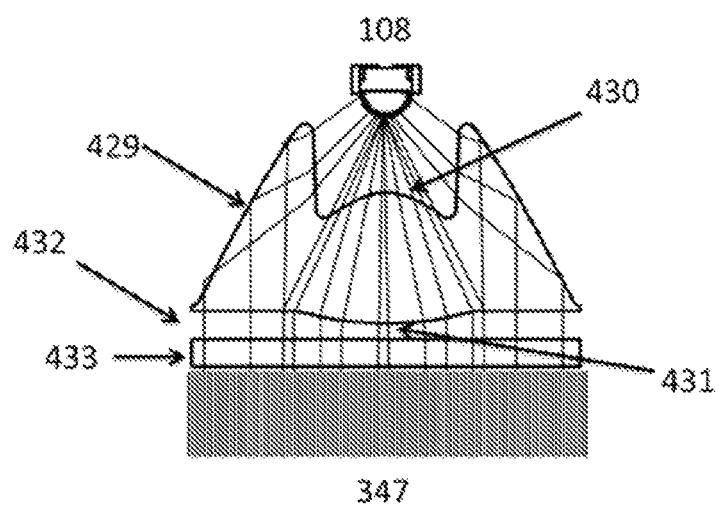
FIGS. 47-49 are simplified illustrations of light guides, in accordance with an embodiment of the present invention.
Figure 48:
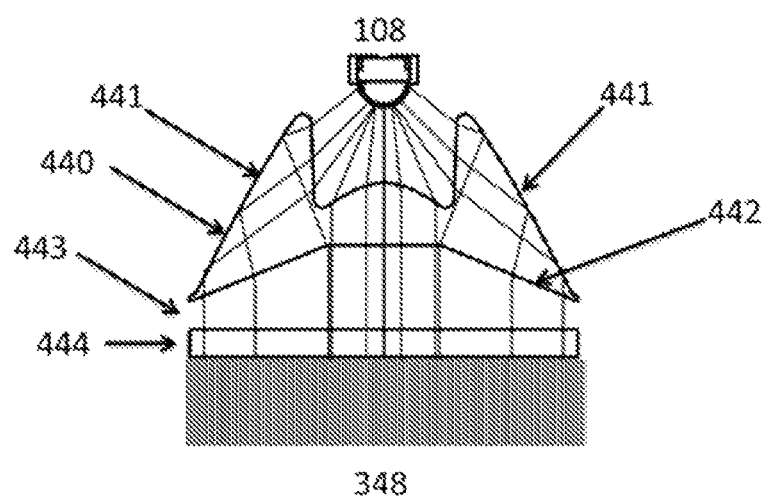
Figure 49:
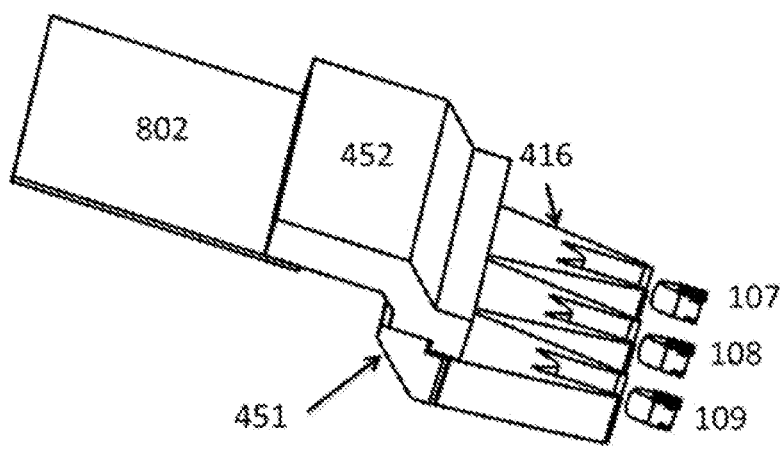

Another method of covering gaps 342 uses an air-gap in the light guide. Two variations are provided. Reference is made to FIGS. 47-49, which are simplified illustrations of light guides, in accordance with an embodiment of the present invention. FIG. 47 shows light guide 429 separated by air gap 432 from lens 433. Lens 433 may be a flat transparent sheet used to provide a straight border to the touch area. Light guide 429 differs from light guide 416 mainly in its central collimating portion. In light guide 416 the forward-directed light is collimated by a single refraction at entry surface 422, whereas in light guide 429, this light is collimated by two refractions: at entry surface 430 and at exit surface 431. The refraction at entry surface 430 directs the light such that when it exits surface 431, it covers the gap in the light field, as illustrated by light field 347.

FIG. 48 shows an alternative light guide 440 that covers gaps 432 by directing light in the left and right portions of light guide 440, instead of the in the central portion. Light guide 440 is separated by air gap 443 from lens 444. Lens 444 may be a flat transparent sheet used to provide a straight border to the touch area, as lens 433 in FIG. 47. Light guide 440 differs from light guide 416 mainly in its left and right reflecting and refracting portions. In light guide 416 the wide-angle light is collimated by a refraction at entry surface 420 followed by a reflection at surface 421, whereas in light guide 440, one further refraction is required at exit surface 442. The reflection at surface 441 directs the light such that when it exits surface 432, it covers the gap in the light field, as illustrated by light field 348.

Light guides 416, 429 and 440 all collimate light in a first dimension, parallel to the screen surface. A curved mirror is used to collimate the light beams in the dimension incident to the screen surface. FIG. 49 shows LEDs 107-109, light guide 416 for collimating light from these LEDs in a first direction, and curved mirror 451 for collimating these light beams in a second direction. A second light guide 452 directs these beams across screen 802.

Figure 50:
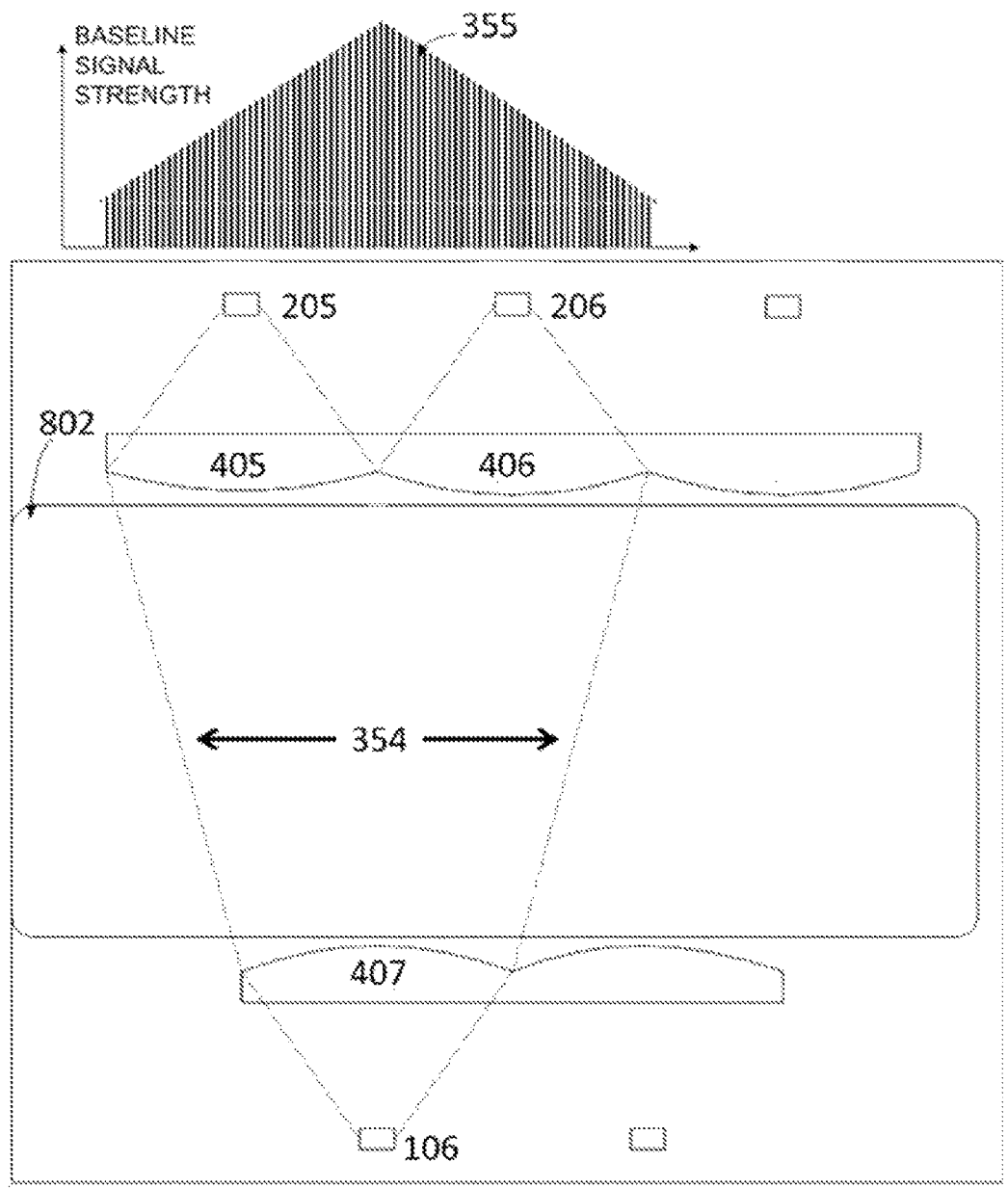
FIG. 50 is a simplified illustration of a light intensity distribution across the width of a wide light beam, in accordance with an embodiment of the present invention.

For some methods it is useful that the beam intensity varies linearly along the width of light field 343. Reference is made to FIG. 50, which is a simplified illustration of a light intensity distribution across the width of a wide light beam, in accordance with an embodiment of the present invention. FIG. 50 shows linear light intensity distribution 355 across the width of wide beam 354. The other elements in FIG. 50 are screen 802, LED 106 and its associated lens 407, PDs 205 and 206, and their associated lenses 405, 406. Reference is made to U.S. Publication No. 2011/0163998 A1 entitled OPTICAL TOUCH SCREEN SYSTEMS USING REFLECTED LIGHT, the contents of which are incorporated herein in their entirety by reference, which explains how a linear light intensity distribution is used to determine a touch location inside a wide beam. However, due to the reflection at the outer edges of light guides 416, 429 and 440, the outer sections of light field 343 are inverted, as will be explained with reference to FIG. 51.

Figure 51:
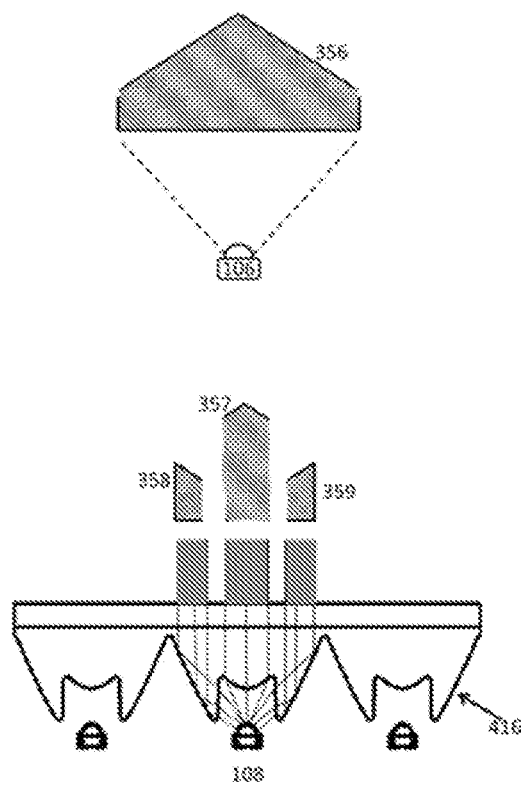
FIG. 51 is a simplified illustration comparing light intensity distribution across the width of an un-reflected wide light beam with that of a wide beam that has passed through the light guide of FIGS. 44 and 45, in accordance with an embodiment of the present invention.

Reference is made to FIG. 51, which is a simplified illustration comparing light intensity distribution across the width of an un-reflected wide light beam with that of a wide beam that has passed through the light guide of FIGS. 44 and 45, in accordance with an embodiment of the present invention. FIG. 51 compares the light intensity distributions from a first emitter 106 with those from a second emitter 108 passing through light guide 416. The linear distribution 356 from emitter 106 is rearranged by light guide 416 into three distributions 357-359. Distributions 358 and 359 are directionally different than their neighboring portions of distribution 357. The microstructures discussed in reference to FIG. 46 ameliorate this problem. However, an alternative light guide avoids this problem entirely while still capturing a wide viewing angle.

Figure 52:
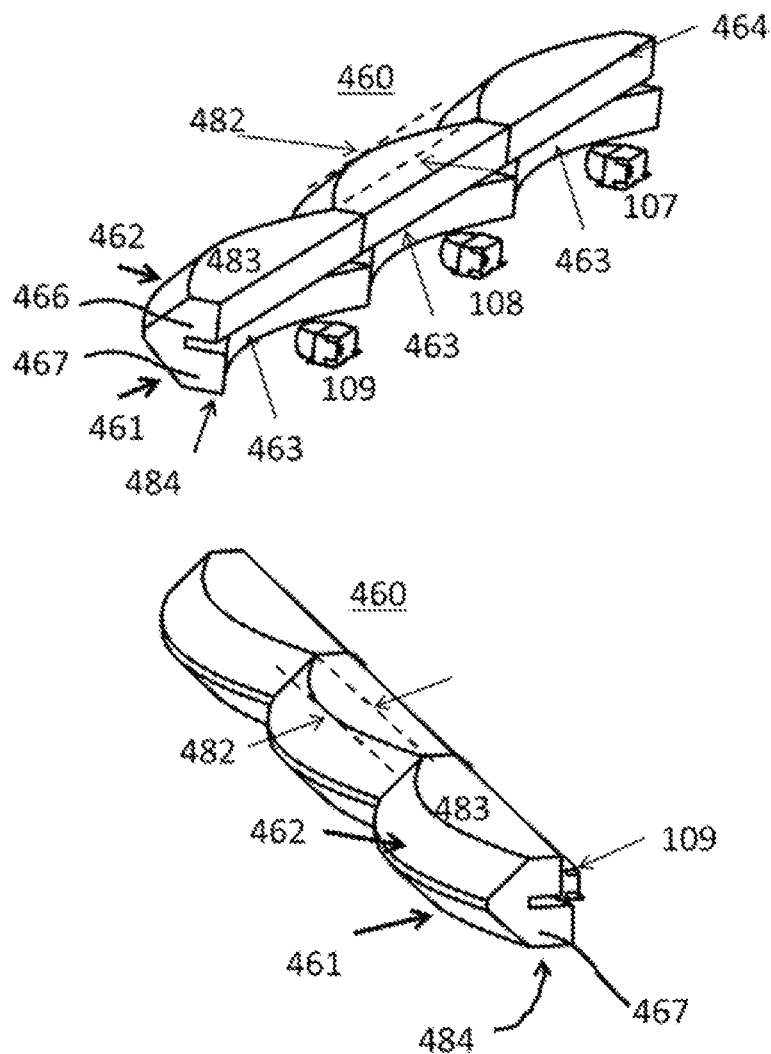
FIGS. 52-54 are simplified illustrations of a light guide, in accordance with an embodiment of the present invention.
Figure 53:
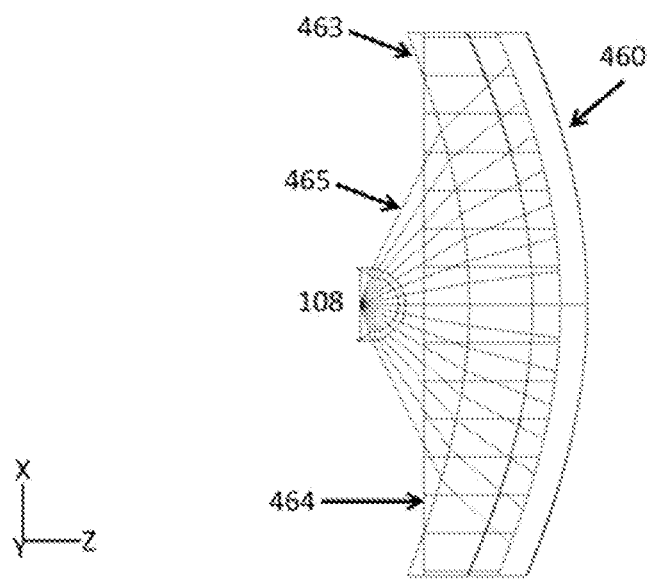
Figure 54:
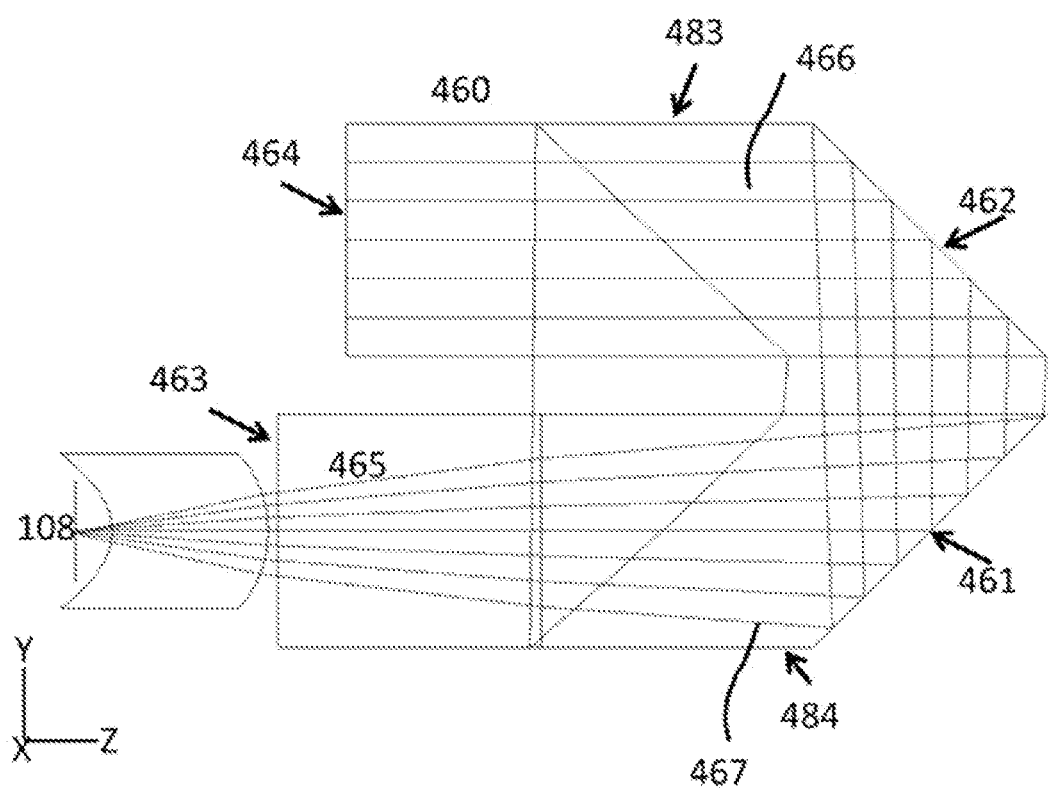

Reference is made to FIGS. 52-54, which are simplified illustrations of a light guide, in accordance with an embodiment of the present invention. FIG. 52 shows three lenses 460 of a light guide that also captures a wide viewing angle, and has the added advantages of no gaps in the light field and the light field can be easily shaped, e.g., to provide linear light intensity distributions as discussed hereinabove with reference to FIGS. 50 and 51. Lens 460 uses refraction and reflection to capture and collimate light across a wide viewing angle. Each lens in FIG. 52 is opposite respective diode 107-109. This lens features an upper portion 466 and a lower portion 467. Lower portion 467 features refractive surface 463 facing the lens's respective diode and curved internally reflective surface 461 cut horizontally by a bottom horizontal plane 484. Upper portion 462 features refractive surface 464 above the lens's respective diode and curved internally reflective surface 462 cut horizontally by a top horizontal plane 483.

In some embodiments, refractive surface 463 is a single-curved (x-dimension) surface. In other embodiments the surface facing the diode is straight. Internally reflective surfaces 461 and 462 further collimate the light in both the x- and y-directions. When diodes 107-109 are emitters, collimated light exits lens 460 through flat exit surface 464. When diodes 107-109 are receivers, collimated light enters lens 460 through flat exit surface 464. By cutting reflective surfaces 461 and 462 horizontally with horizontal planes 483 and 484, instead of vertically, the lens has a lower height, as explained above.

FIG. 53 shows a view from above of lens 460. Diode 108 is either an LED or PD. FIG. 53 shows curved entry surface 463 and flat exit surface 464 of lens 460. Light beams 465 are refracted at entry surface 463.

FIG. 54 shows a cutaway view from the side of light guide 460. FIG. 54 shows how reflective surfaces 461 and 462 collimate light beams 465 in the y and x directions. Surfaces 461 and 462 are curved in both the x and y directions to collimate the light in both these directions, and are cut horizontally by respective horizontal planes 484 and 483. Surfaces 461 and 462 are vertically aligned mirror images of each other. This ensures that any light reflected by one of these surfaces is also reflected by the other surface. Entry surface 463 and exit surface 464 of lens 460 are also shown.

Lens 460 is an extremely fast lens suitable for applications requiring much light, yet is extremely compact. For example, in prior art systems in which a diode is placed underneath the screen, light guides for collimating light in the x-direction, i.e., parallel to the screen surface, employ a curved reflective surface that receives the light traveling downward, perpendicular to the x-direction. In prior art lenses, a double-curved reflector is cut vertically by a rear vertical plane of the light guide. The advantages of lens 460 are evident when it is compared to a prior art light guide illustrated in FIG. 55.

Figure 55:
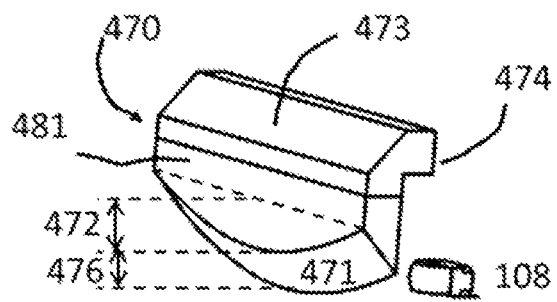
FIG. 55 is a prior art illustration of a light guide.

Reference is made to FIG. 55, which is a prior art illustration of a light guide. FIG. 55 shows diode 108 opposite a prior art collimating light guide 470 having a single reflector curved in two-dimensions for collimating light from LED 108. The reflector has a height 478 which is the sum of two heights: (a) height 476 which is determined by the height of exit surface 474. This is the height of the incoming light channel which must be maintained as the light travels through light guide 470; and (b) height 472 of the parabola resulting from the fact that double-curved reflector 471 is intersected by backplane 481. The magnitude of height 472 depends on the width of the pitch between neighboring LEDs and the proximity of LED 108 to light wide 470. Namely, a wider viewing angle requires a greater parabolic height.

By contrast, the minimum height of lens 460 of FIGS. 52, 53, 54 and 56, is limited only to twice the height of the incoming light channel, i.e., the sum of the heights of surfaces 463 and 464. The parabola of FIG. 55 is rotated from the vertical plane to the horizontal plane in lens 460. Therefore height 472 in light guide 470 is transposed into depth 482 in the horizontal plane in lens 460 as illustrated in FIG. 52.

Moreover, because lens 460 has two double-curved reflectors it is more powerful, nearby twice as powerful, as light guide 470. Thus, for wide viewing angles the parabolic depth required in lens 460 is substantially less than the parabolic height required in light guide 470.

Figure 56:
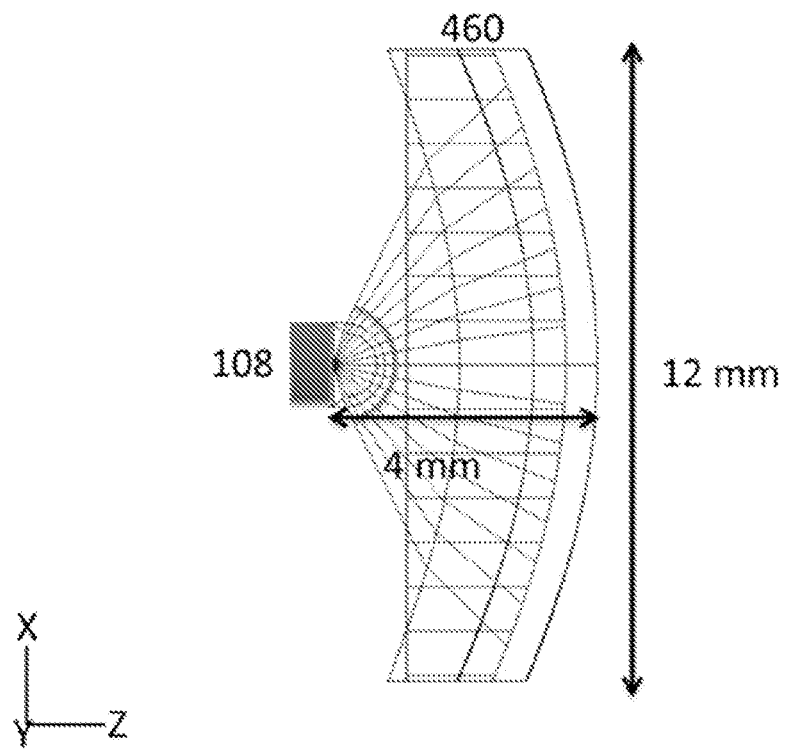
FIG. 56 is a simplified illustration of a light guide, in accordance with an embodiment of the present invention.
Figure 56:
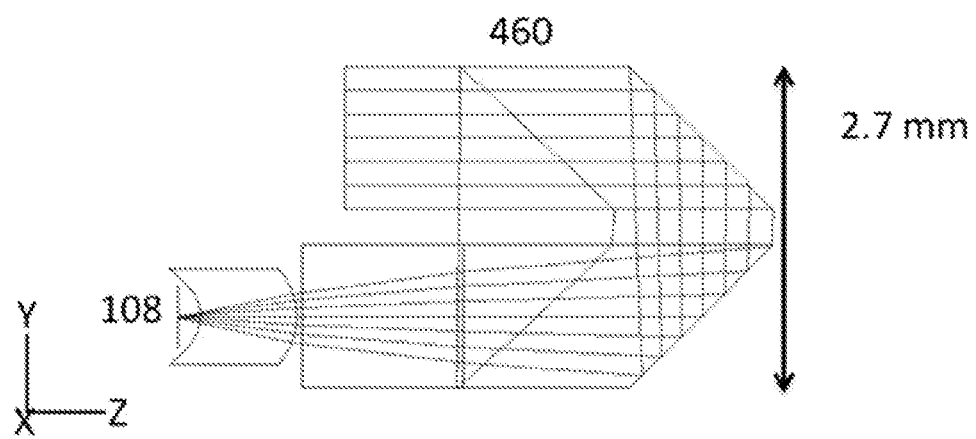

Reference is made to FIG. 56, which is a simplified illustration showing example dimensions of lens 460 of FIGS. 52, 53, 54, in accordance with an embodiment of the present invention. Lens 460 can be made less extreme with a flat entry surface and longer focal length. The distance between neighboring lenses can also be increased if needed. Unusual curves used in lens 460 may result in extreme vignetting, which can be compensated with microstructures at exit surface 464.

Edge Sweep Detection

Figure 57:
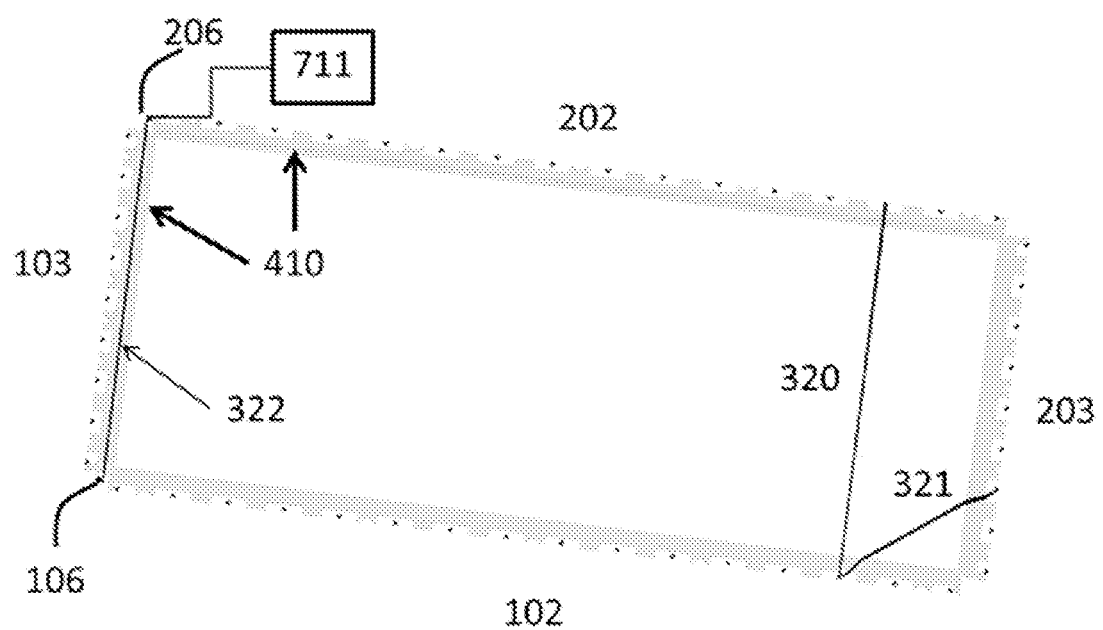
FIGS. 57 and 58 are simplified illustrations of a light guide arrangement for detecting touches and sweep gestures performed upon the light guide, in accordance with an embodiment of the present invention.
Figure 58:
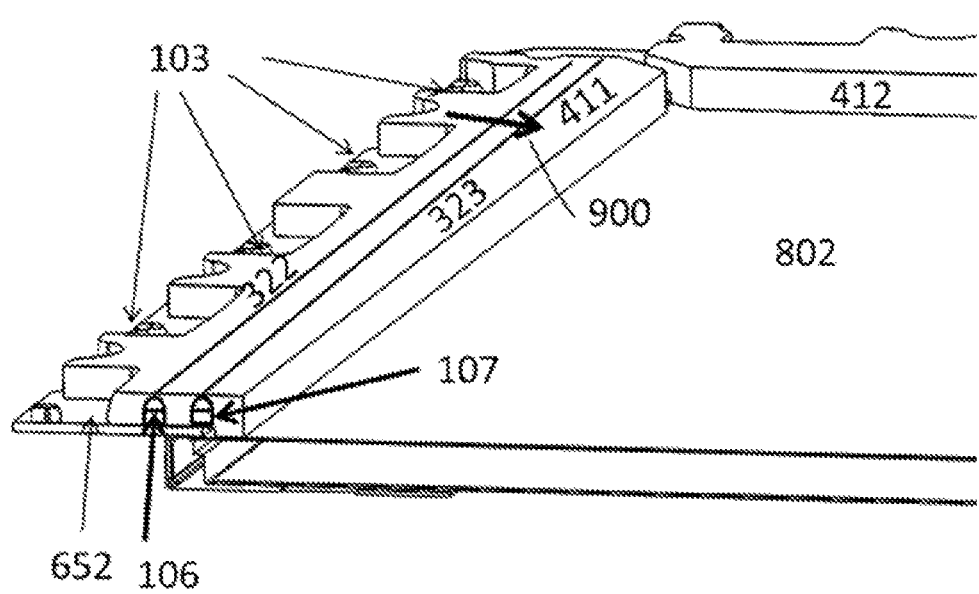

Reference is made to FIGS. 57 and 58, which are simplified illustrations of a light guide arrangement for detecting touches and sweep gestures performed upon the light guide, in accordance with an embodiment of the present invention. FIG. 57 shows an optical touch screen with an LED-PD pair for detecting an object touching the left edge of a light guide frame, in accordance with an embodiment of the present invention. FIG. 57 shows the optical touch screen of FIG. 40 where, in addition to the LEDs and PDs for detecting touch locations on the screen, an additional LED-PD pair 106-206 is added for detecting an object touching the left edge of light guide frame 410. LED 106 projects light beam 322 into the left border of light guide frame 410 where light beam 322 is captured inside a slab portion of frame 410 by total internal reflection as it travels through. At the opposite end of this border, light beam 322 is detected by light detector 206. The upper surface of the slab is exposed to touch by an object from outside. Such a touch absorbs a portion of light beam 322 before it arrives at detector 206, resulting in reduced detection at detector 206. Calculating unit 711 connected to detector 206 determines that an object is touching the upper surface of the slab portion through which beam 322 passes based on this reduced light detection.

In certain embodiments more than one LED-PD pair is provided in order to detect movement of the object across the upper surface in a direction perpendicular to beam 322. This enables the computer to determine that a sweep gesture across the border is being performed, corresponding to the sweep gesture employed by Windows 8 to open the charms bar or to toggle between different running applications. FIG. 58 shows two emitters 106, 107 that emit beams 322, 323, respectively, through light guide 411, with each beam being detected by a corresponding detector (not shown) at the opposite end of each beam, in accordance with an embodiment of the present invention. FIG. 58 shows emitters 106 and 107 that emit respective beams 322 and 323 through light guide 411. These beams are confined inside light guide 411 by total internal reflection. Each beam is detected by a corresponding detector (not shown) at the opposite end of each beam. A sweep gesture indicated by arrow 900 across light guide 411 is detected as a result of portions of internally reflected beams 322 and 323 being absorbed by a finger performing the gesture as the finger comes into contact with each beam. Furthermore, in certain embodiments, each border of frame 410 (in FIG. 57) has multiple LED-PD pairs for detecting these Windows 8 edge-related sweep gestures along each edge of the screen.

Reference is made to assignee's U.S. Pat. No. 8,553,014, and co-pending U.S. patent application Ser. No. 14/016,076, both entitled OPTICAL TOUCH SCREEN USING TOTAL INTERNAL REFLECTION, which are incorporated herein in their entirety by reference, and which describe how to project light beam 322 from emitter 106 into a light guide slab and determine location of an object touching the slab's upper surface based on outputs of an opposite detector 206.

Reduced-Component Flexible Touch Screens

Figure 59:
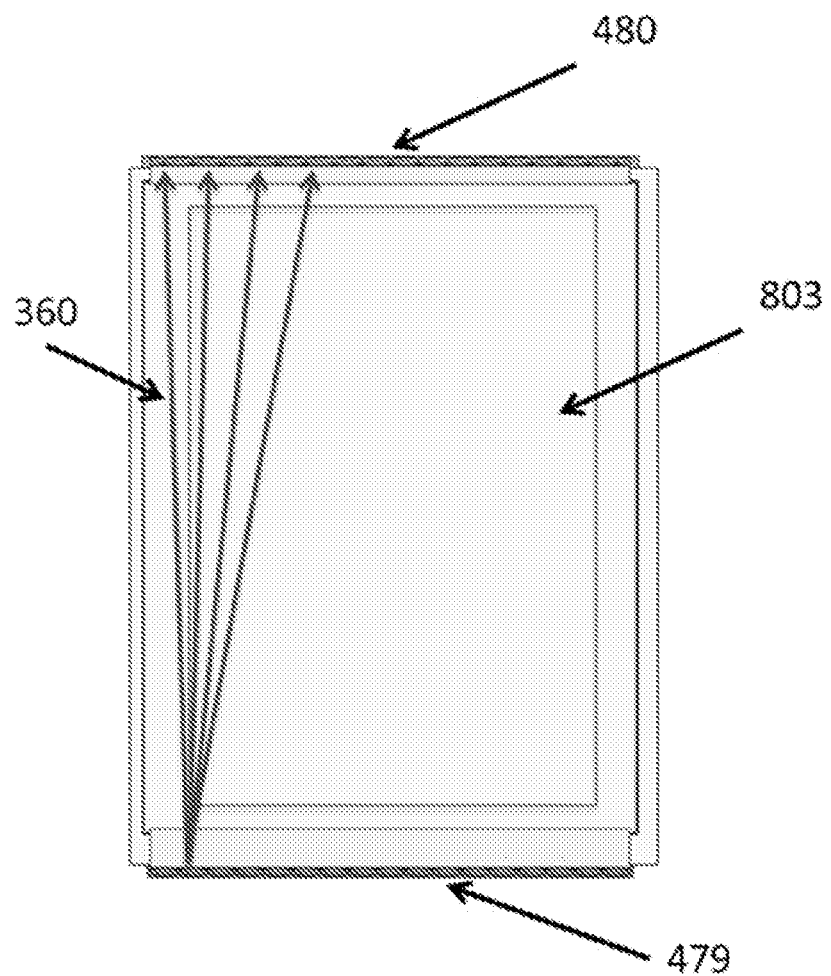
FIG. 59 is a simplified illustration of a touch screen having a row of emitters along the bottom edge of the screen and a row of receivers among the top edge of the screen, in accordance with an embodiment of the present invention.

Discussion now turns to embodiments of the invention wherein a touchscreen has light guides along only two edges of the screen. Reference is made to FIG. 59, which is a simplified illustration of a touch screen having a row of emitters along the bottom edge of the screen and a row of receivers along the top edge of the screen, in accordance with an embodiment of the present invention. FIG. 59 shows screen 803, emitter light guide 479, detector light guide 480 and light beams 360.

Figure 60:
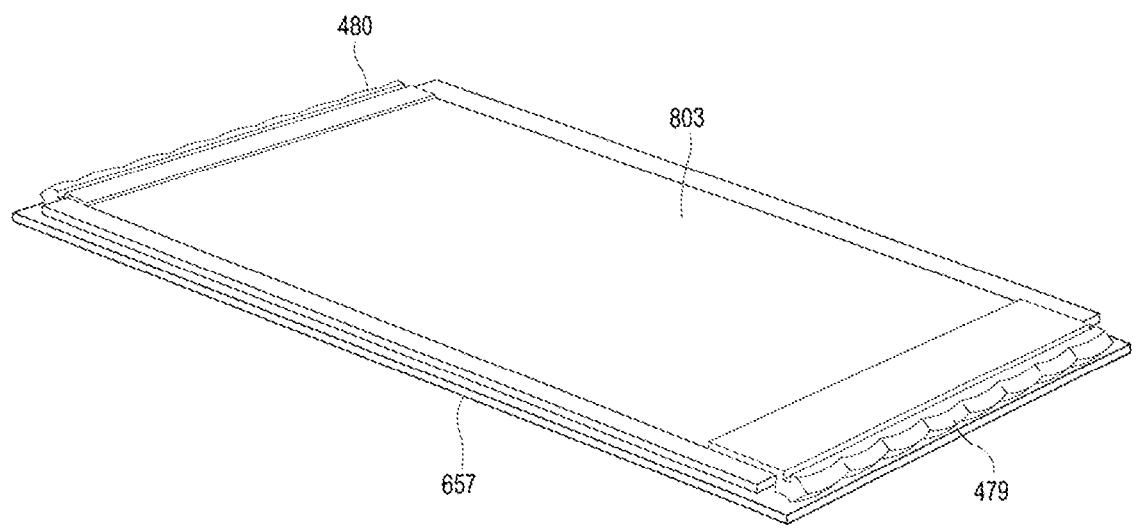
FIG. 60 is a simplified illustration of the touchscreen of FIG. 59, in accordance with an embodiment of the present invention.

Reference is made to FIG. 60, which is a simplified illustration of the touchscreen of FIG. 59, in accordance with an embodiment of the present invention. FIG. 60 shows screen 803, emitter light guide 479, detector light guide 480 and PCB 657.

Figure 61:
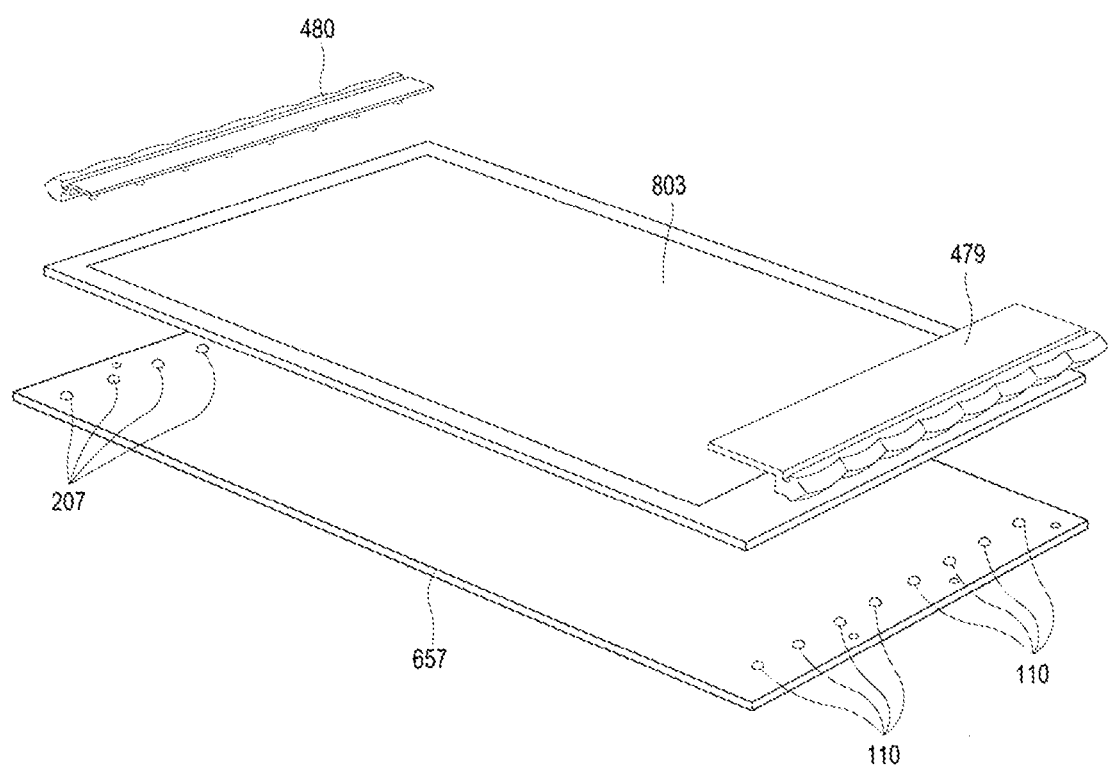
FIG. 61 is an exploded view of the touchscreen of FIGS. 59 and 60, in accordance with an embodiment of the present invention.

Reference is made to FIG. 61, which is an exploded view of the touchscreen of FIG. 59, in accordance with an embodiment of the present invention. This view exposes LEDs 110 and PDs 207 mounted on PCB 657 underneath their respective light guides.

Figure 62:
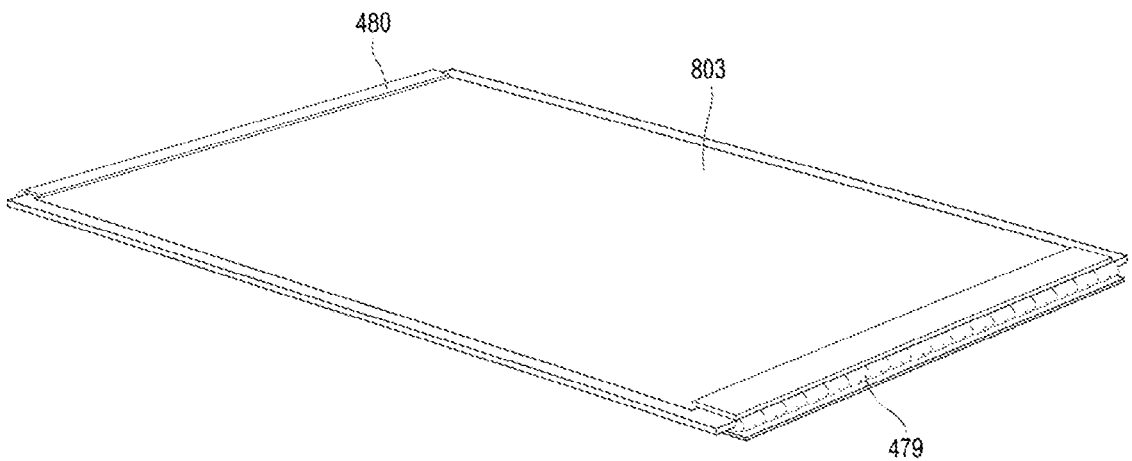
FIG. 62 is a simplified illustration of a touchscreen having a row of emitters along the bottom edge of the screen mounted on a first thin strip PCB and a row of receivers along the top edge of the screen mounted on a second thin strip PCB, in accordance with an embodiment of the present invention.

In another embodiment of the present invention, PCB 657 is replaced by two PCB strips. In this regard reference is made to FIG. 62, which is a simplified illustration of a touchscreen having a row of emitters along the bottom edge of the screen mounted on a first thin strip PCB and a row of receivers among the top edge of the screen mounted on a second thin strip PCB, in accordance with an embodiment of the present invention. FIG. 62 shows a touchscreen embodiment with screen 803, emitter light guide 479 and detector light guide 480.

Figure 63:
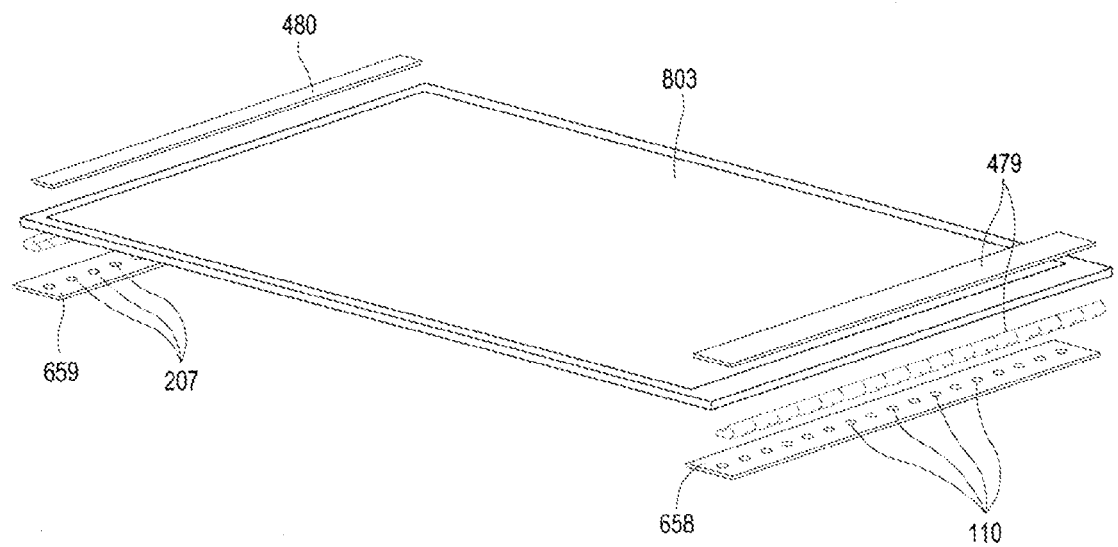
FIG. 63 is an exploded view of the touchscreen of FIG. 62, in accordance with an embodiment of the present invention.

Reference is made to FIG. 63, which is an exploded view of the touchscreen of FIG. 62, in accordance with an embodiment of the present invention. Thus FIG. 63 shows two PCB strips 658 and 659 on which LEDs 110 and PDs 207 are mounted, respectively. As shown in FIG. 63, light guides 479 and 480 are each made up of two parts: one above screen 803 and the other below screen 803.

Figure 64:
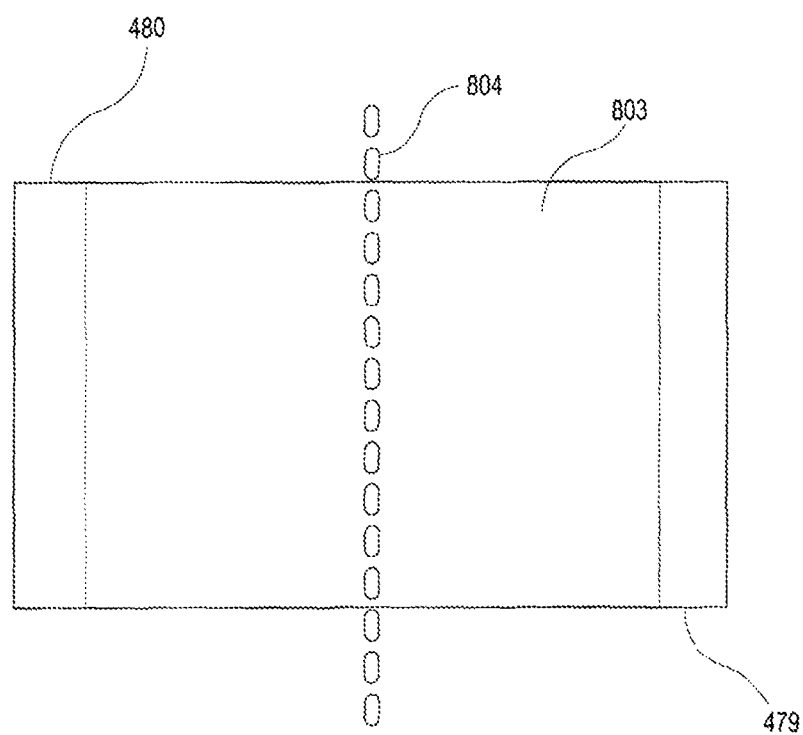
FIG. 64 is a simplified illustration of a foldable touchscreen, in accordance with an embodiment of the present invention.
Figure 65:
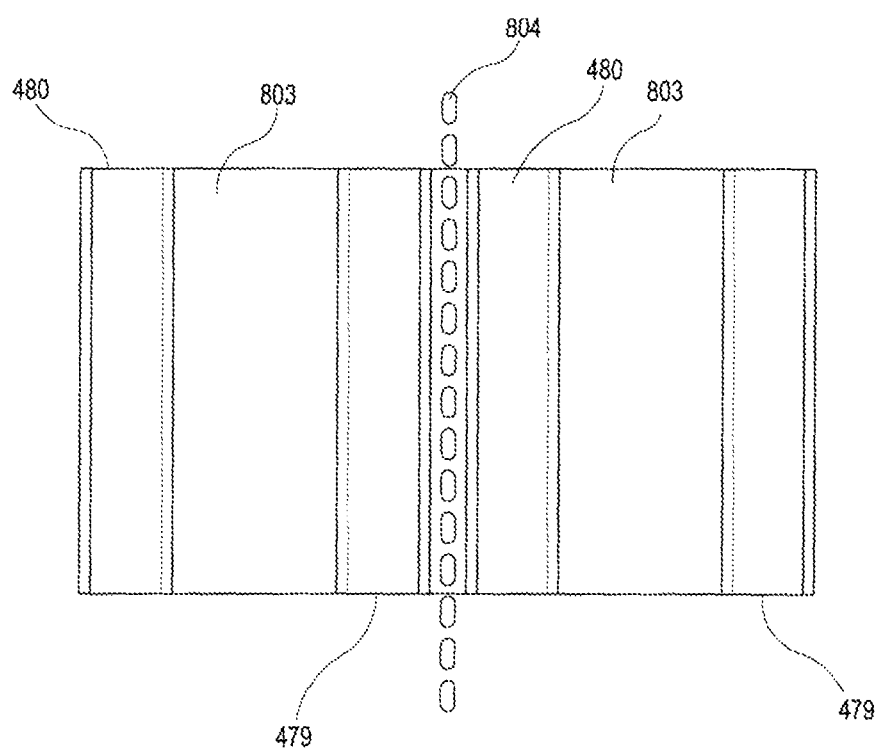
FIG. 65 is a simplified illustration of a second foldable touchscreen, in accordance with an embodiment of the present invention.

These embodiments of touchscreens having light guides along only two edges of the screen enable providing optical touch functionality on a flexible screen. In this regard reference is made to FIG. 64, which is a simplified illustration of a foldable touchscreen, in accordance with an embodiment of the present invention. FIG. 64 shows foldable screen 803 having emitter light guide 479 along its right edge and detector light guide 480 along its left edge. Crease 804 down the middle of screen 803 indicates where the screen can be folded in half for compact storage. The unfolded screen is touch-sensitive as long as the beams projected from emitter light guide 479 arrive at detector light guide 480. Reference is made to FIG. 65 illustrating an embodiment in which both the left and right halves of the screen have respective pairs of emitter and detector light guides 479 and 480. In this case, even when the screen is folded along crease 804, each half of the screen is touch sensitive. For example, when the screen of FIG. 65 is folded to roughly a 90° angle so that half of the screen lies flat on a table and the other half stands upright facing the user, in the manner of an open laptop both halves remain touch sensitive.

Figure 66:
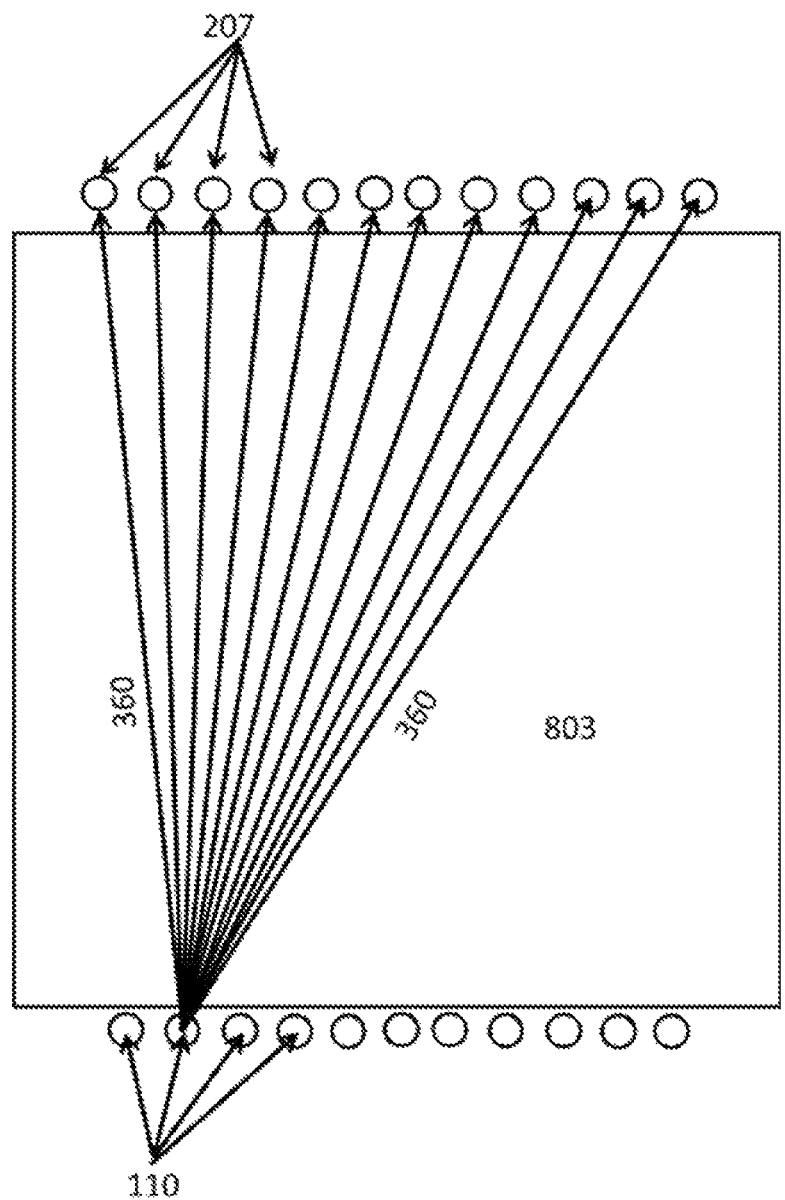
FIG. 66 is a simplified illustration of light beams from one emitter reaching all of the detectors, in accordance with an embodiment of the present invention.

The determination of a touch location in these embodiments is described with reference to FIGS. 66-69. Reference is made to FIG. 66, which is a simplified illustration of light beams from one emitter reaching all of the detectors, in accordance with an embodiment of the present invention. FIG. 66 shows screen 803 with a row of LEDs 110 along its bottom edge and a row of PDs 207 along its top edge. Light beams 360 from one of the LEDs arrive at all of the PDs.

Figure 67:
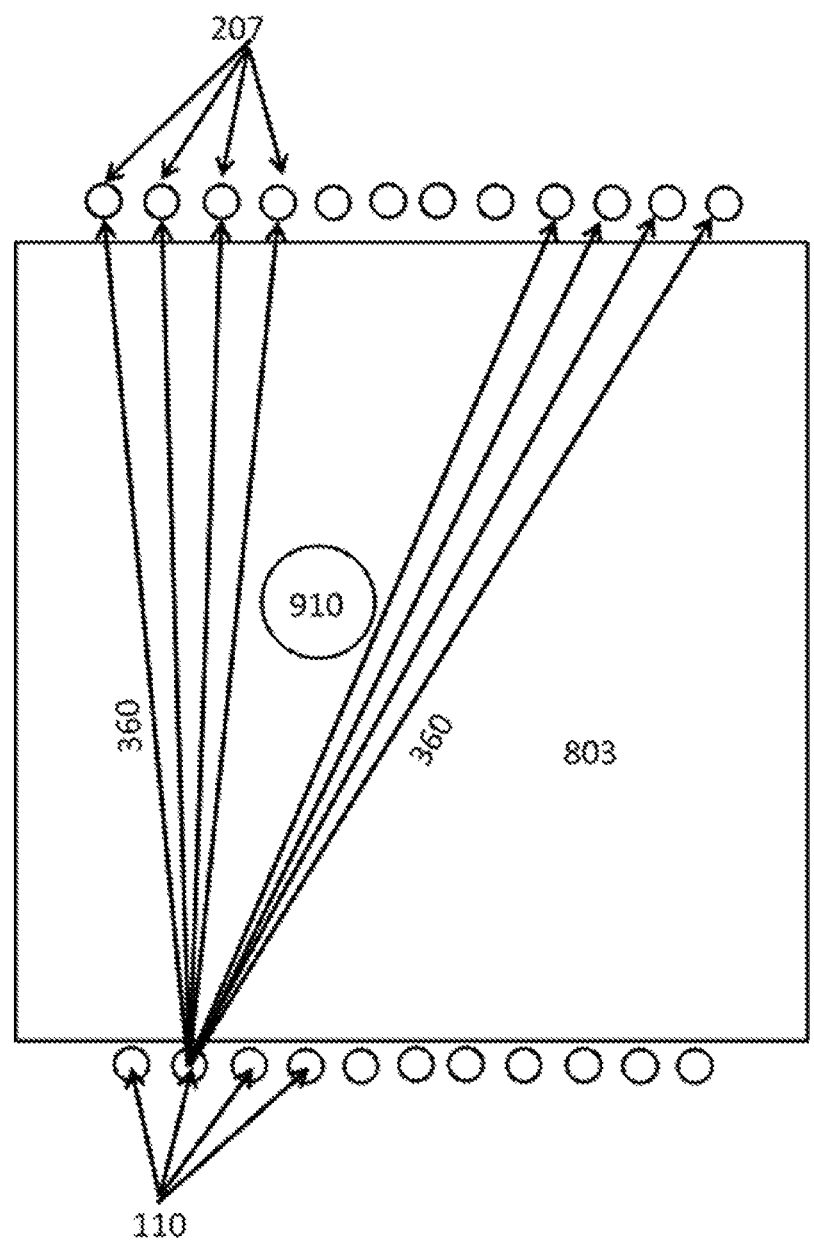
FIG. 67 is a simplified illustration showing which beams from FIG. 66 are blocked by an object touching the center of the screen, in accordance with an embodiment of the present invention.

Reference is made to FIG. 67, which is a simplified illustration showing which beams from FIG. 66 are blocked by an object touching the center of the screen, in accordance with an embodiment of the present invention. FIG. 67 shows what happens to beams 360 when an object 910 is placed on the screen. Thus, comparing FIGS. 67 and 66 it is evident that some of beams 360 are blocked by object 910 and their absence is detected at respective ones of PDs 207.

Figure 68:
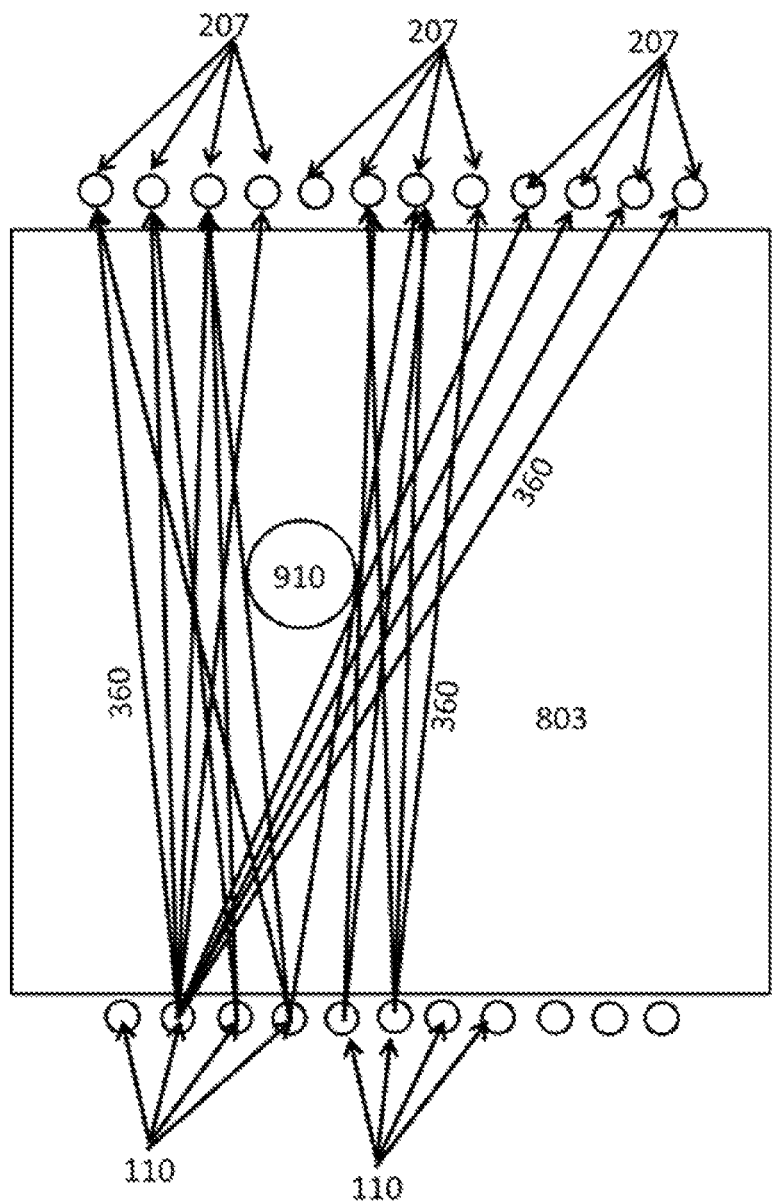
FIG. 68 is a simplified illustration showing additional beams from other emitters that are not blocked by the object of FIG. 67, in accordance with an embodiment of the present invention.

Reference is made to FIG. 68, which is a simplified illustration showing additional beams from other emitters that are not blocked by the object of FIG. 67, in accordance with an embodiment of the present invention. FIG. 68 shows unblocked beams 360 from several of the LEDs.

Figure 69:
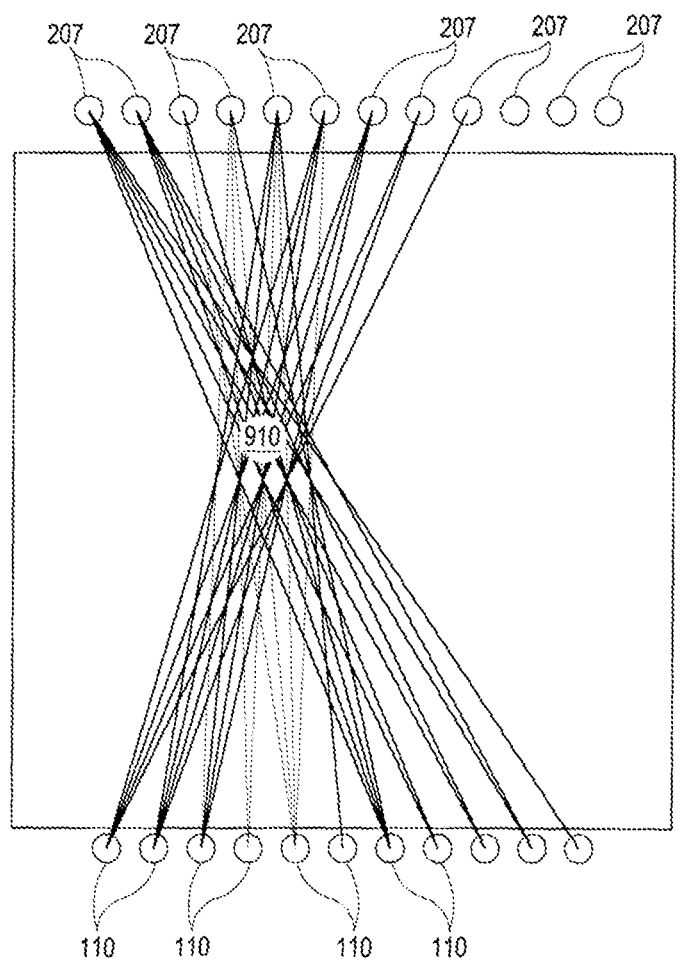
FIG. 69 is a simplified illustration showing all of the beams blocked by the object of FIG. 67, in accordance with an embodiment of the present invention.

Reference is made to FIG. 69, which is a simplified illustration showing all of the beams blocked by object 910 of FIG. 67, in accordance with an embodiment of the present invention. The area around which the intersections of these blocked beams are concentrated corresponds to the location of the object 910 on the screen. The two dimensional location of the object is thus determined. Thus, 2D coordinates of a location of a touch object correspond to the intersections of the blocked beams. Several methods for determining a touch coordinate based on a configuration of many intersecting beams have been described hereinabove with regard to avoiding ghosting. Some methods process blocked beams and others process non-blocked beams. All of these methods are also applicable to the present reduced-component embodiments.

In these embodiments the resolution of the x-coordinate, namely, the coordinate along the length of light guides 479 and 480, is higher than the resolution of the y-coordinate. Therefore, in some embodiments of the invention the touchscreen driver software distinguishes between situations of a single touch and situations of dual touch, or multi-touch. In particular, in some embodiments, multi-touch gestures such as pinch and spread gestures are determined based only on the x-coordinates of the touches. Whereas when only one object is touching the screen the system determines both the x-coordinate and the y-coordinate of the touch object.

Furthermore, x-coordinate detection extends the entire width of the screen, i.e., to the edges of light guides 479 and 480, whereas y-coordinate detection is limited to an inscribed rectangle within the screen in order to provide the multiple diagonal intersecting beams required in order to determine the y-coordinate.

Circular Touch Panel

Embodiments of the subject invention relate to circular touch panels. Certain circular touch panel embodiments target small touch pads and watches, and are roughly 40 mm in diameter. These embodiments support multi-touch. In certain optical touch screen implementations the channel between an LED and a PD consists of a wide beam of light, but for a round touch surface narrow ray-like beams from LED to PD are used. Thus, these embodiments are relatively small and use tightly spaced components. This enables good light coverage even though the individual light fields are narrow.

Component Placement

Reference is made to FIGS. 70-73, which are illustrations of alternative LED and PD layouts for a circular touch surface, in accordance with alternative embodiments of the present invention. The LEDs and PDs are positioned so that the light coverage of the touch area is maximized, i.e., the holes in the ray grid that covers the touch area are as small as possible.

Two different setup geometries are used: namely,
(i) alternating LED/PD, whereby every LED is positioned between two PDs and vice versa; and
(ii) the LEDs and PDs are positioned on separate semicircles.

(i) Alternating LED/PD

Figure 70:
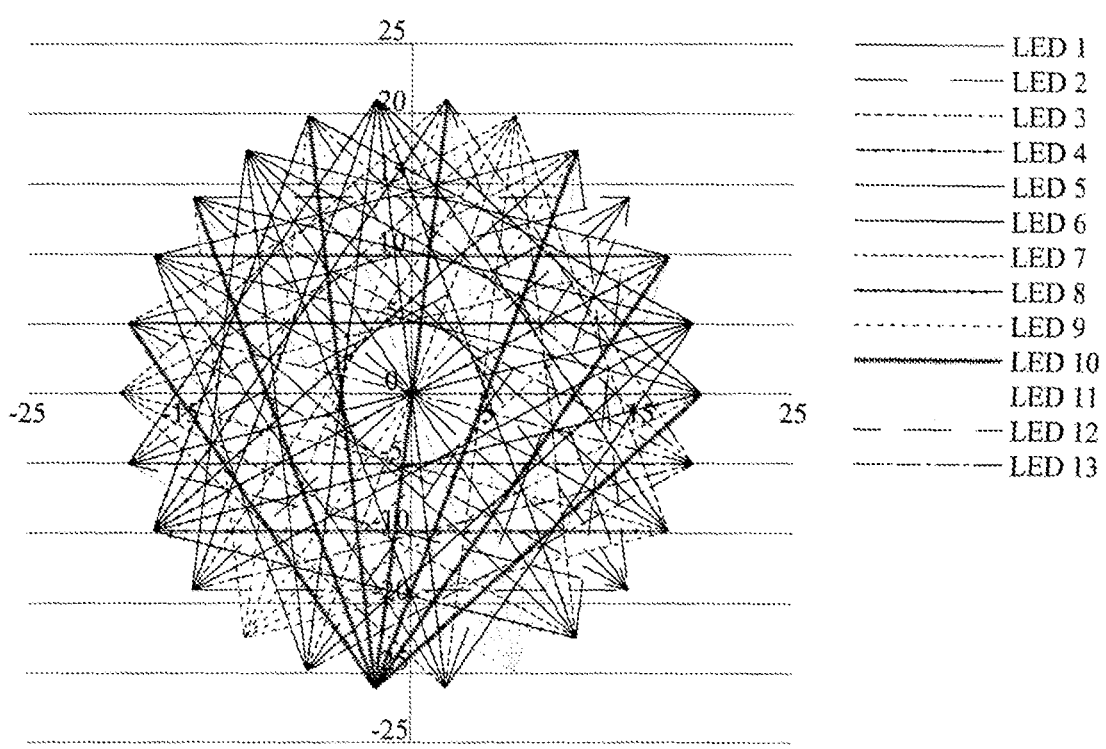
FIGS. 70-73 are illustrations of alternative LED and PD layouts for a circular touch surface, in accordance with alternative embodiments of the present invention.

FIG. 70 shows an arrangement of alternating LEDs and PDs with an odd number of LEDs. In this case, each LED is diametrically mirrored by a PD. This kind of radial symmetry generates a large circle in the center of the touch area, mimicking a spoked wheel.

Within this circle, there is a lack of positional accuracy. When blocking one or more rays on one side of the center, there will always be another position diametrically opposite where the same rays can be blocked, thus generating the same signals. Therefore, within this circle it is not possible to determine on which side of the center a touch is located.

Figure 71:
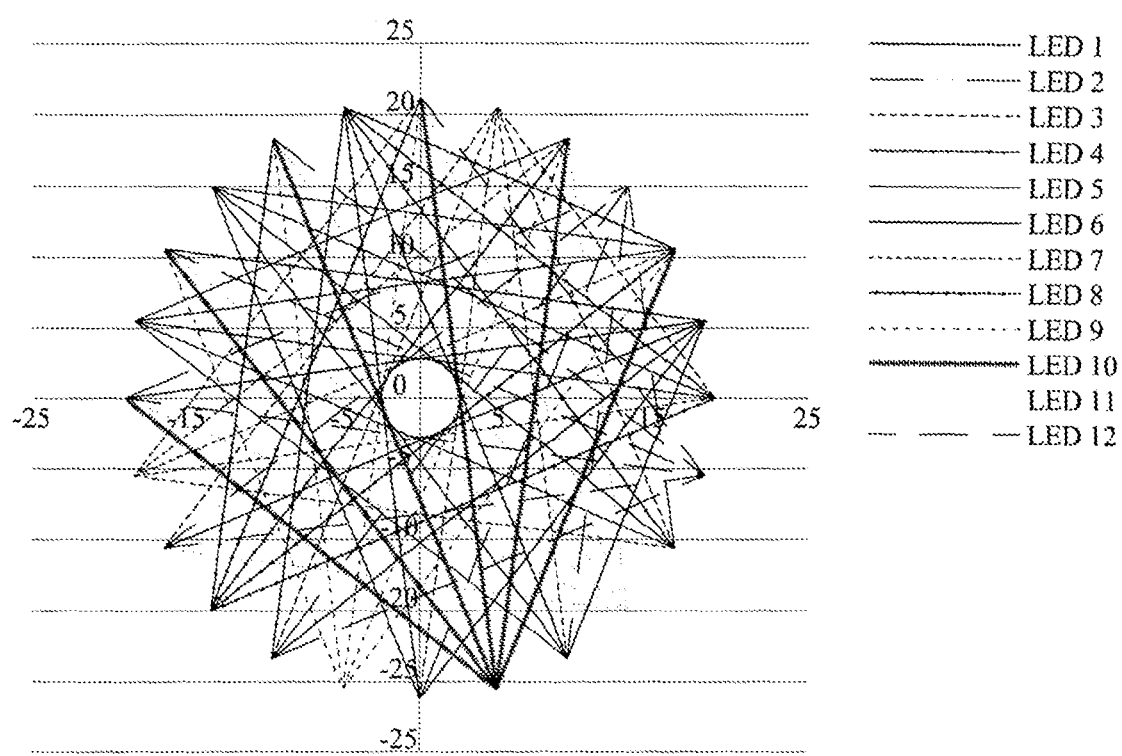

FIG. 71 shows an arrangement of alternating LEDs and PDs with an even number of LEDs. In this case, each LED is diametrically mirrored by another LED. This kind of radial symmetry generates a circular hole in the ray pattern at the center of the touch area. No touch information can be generated within this circle. However, it is noted that the problematic circle is smaller in this case.

(ii) LEDs and PDs Positioned on Separate Semicircles

Figure 72:
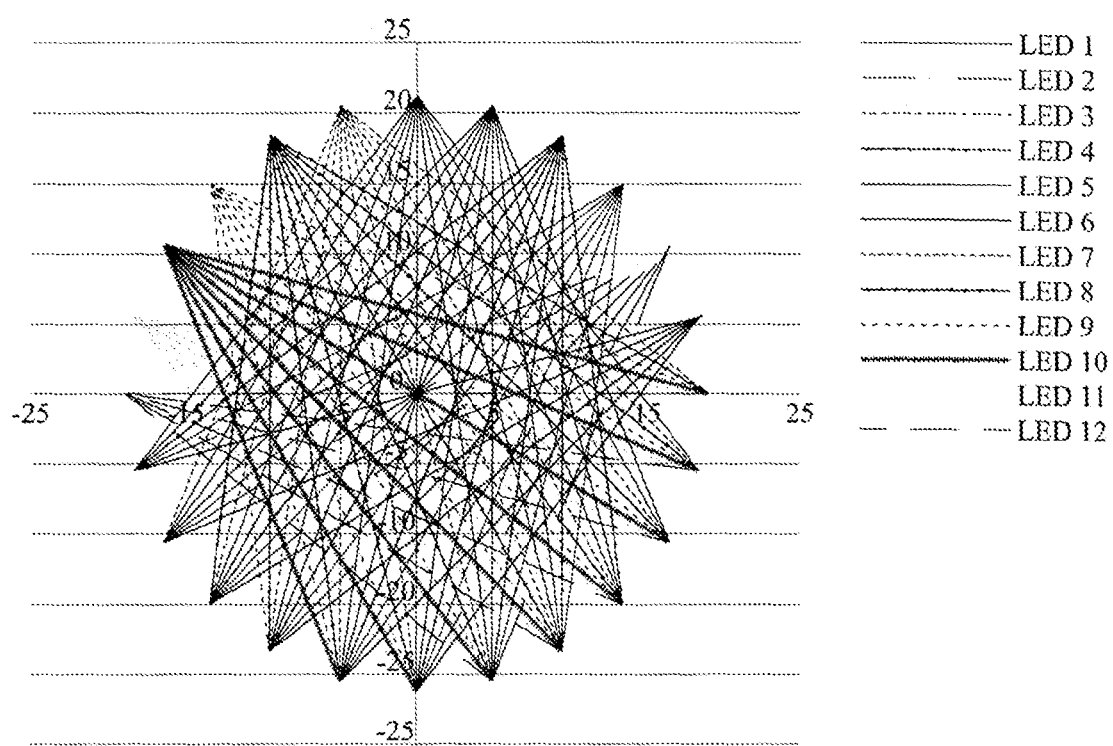
Figure 73:
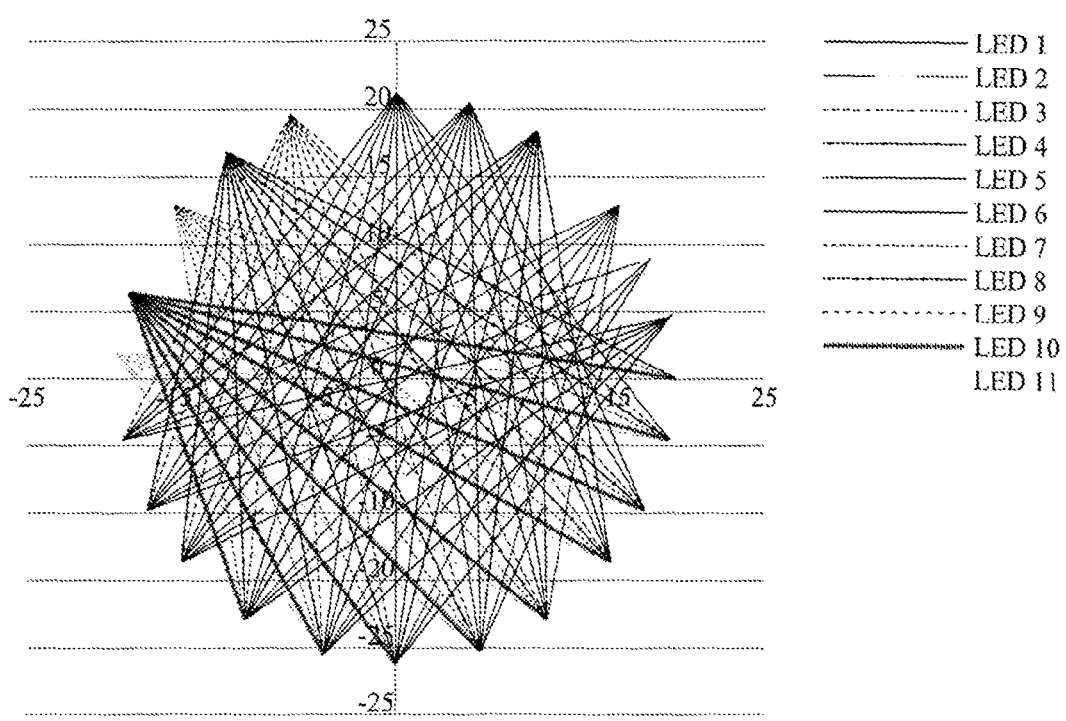
Figure 75:
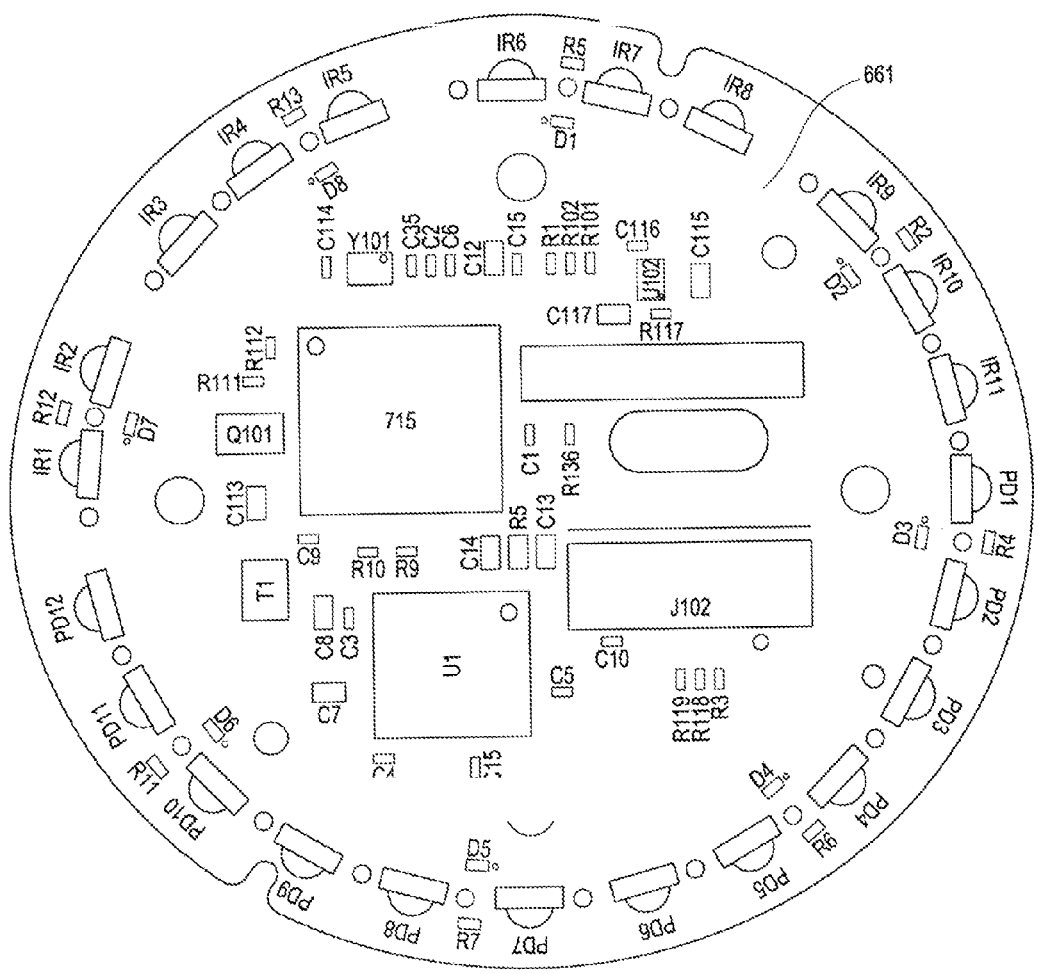
FIG. 75 is an illustration of a PCB layout for a circular touch surface, in accordance with an embodiment of the present invention.
Figure 76:
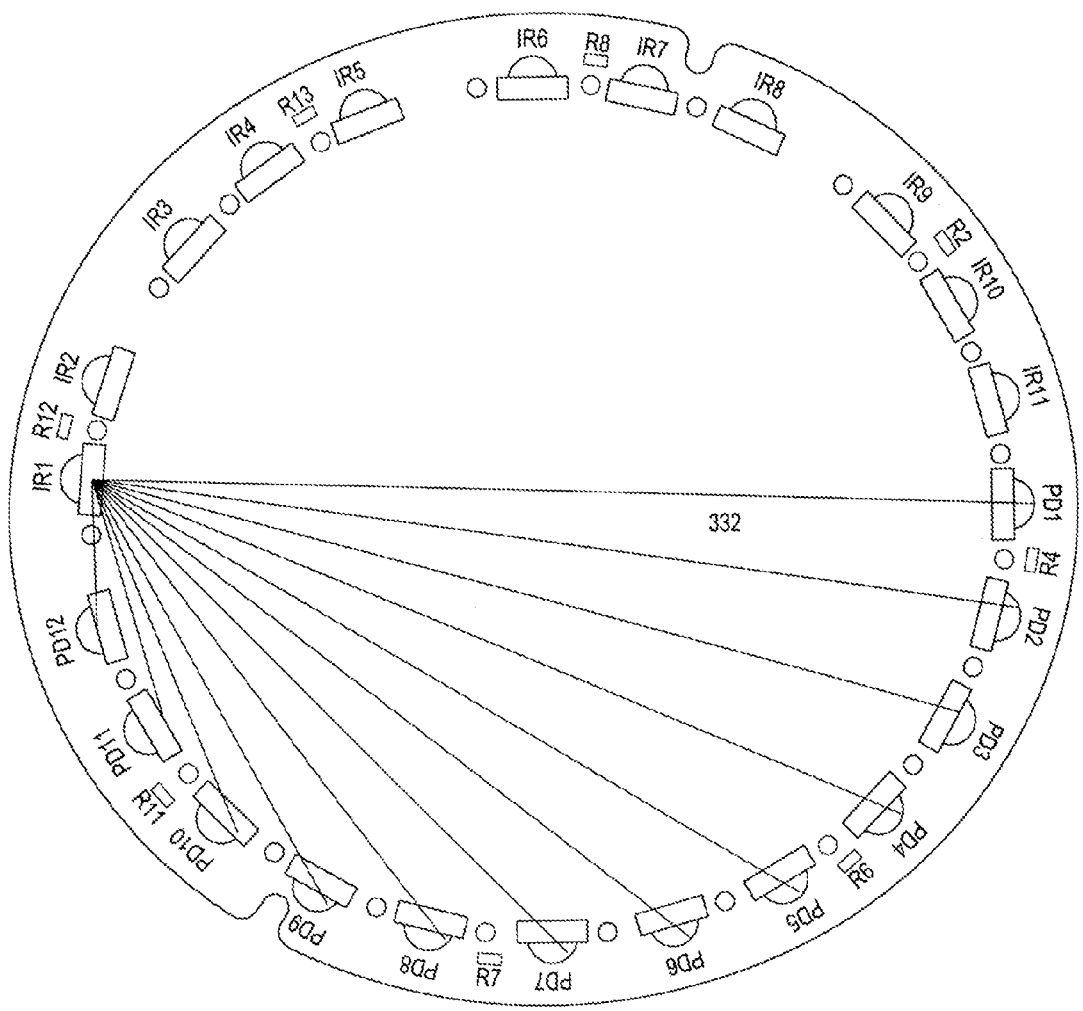
FIG. 76 is an illustration of light beams emitted by one LED detected by a plurality of PDs surrounding a circular touch surface, in accordance with an embodiment of the present invention.
Figure 77:
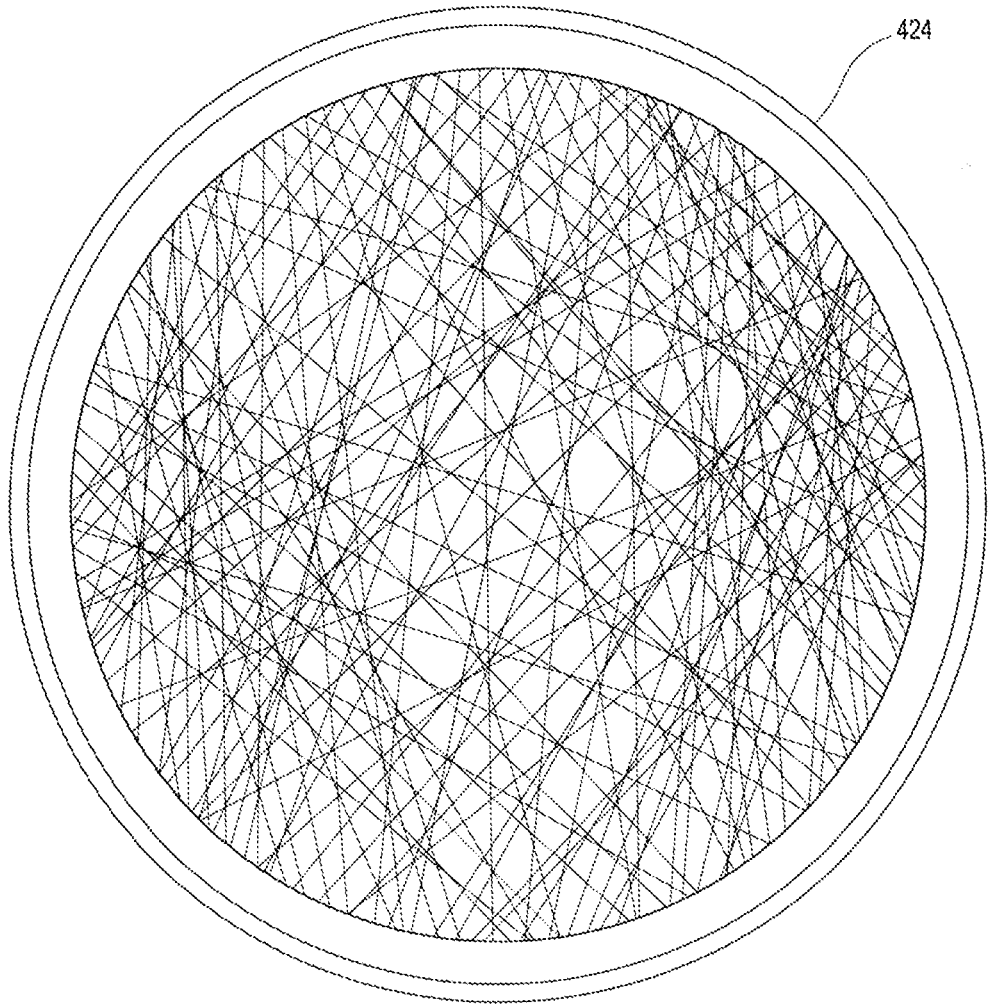
FIG. 77 is an illustration of a network of intersecting light beams used in a circular touch surface, in accordance with an embodiment of the present invention.

In an embodiment of the present invention, breaking the radial symmetry associated with alternating components is achieved by splitting the circle in half and placing all of the LEDs on one side and the PDs on the other side, where the LEDs and PDs are evenly distributed. FIG. 72 shows this configuration. The PDs are arranged along the bottom semicircle and the LEDs are arranged along the upper semicircle. Having the same number of LEDs and PDs provides a combination of the two previous layouts. There is still a central area with poor positional accuracy. The result is similar for an odd number of LEDs and PDs as each LED is now always mirrored by a PD. This setup still has a left-right symmetry associated with it. The ray pattern is improved by eliminating this symmetry. This is done, inter alia, by slightly altering the LED pitch and introducing an extra spacing of half a pitch between every third LED. This also decreases the number of LEDs. This arrangement of LEDs and PDs is illustrated in FIGS. 75 and 76. The resulting pattern of detection beams is shown in FIGS. 73 and 77.

Light Guide Design

Figure 74:
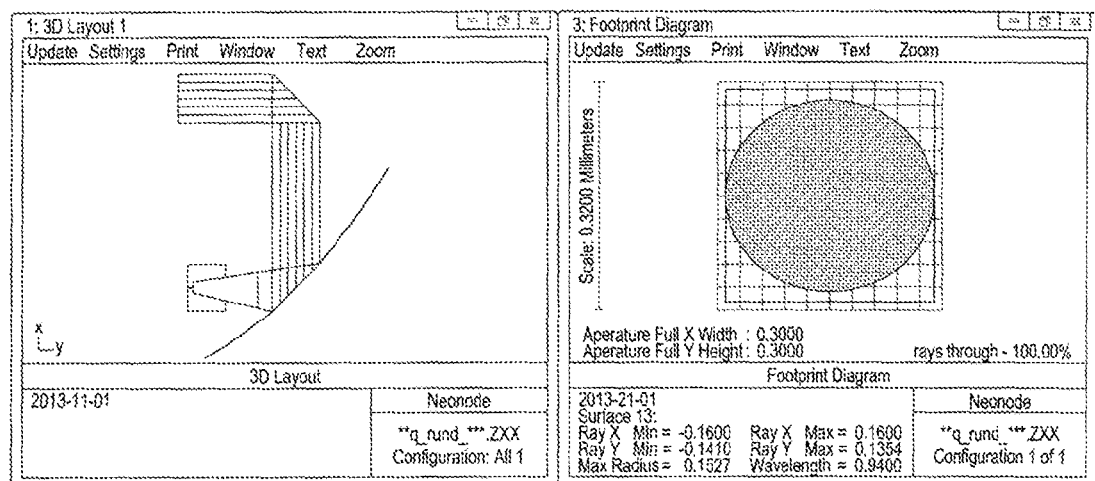
FIG. 74 is an illustration of a light guide for a circular touch surface, in accordance with an embodiment of the present invention.

Reference is made to FIG. 74, which is an illustration of a light guide for a circular touch surface, in accordance with an embodiment of the present invention. The left pane in FIG. 74 is a cross-section of the light guide. The many-to-many mapping of LEDs to PDs requires a large angular spread of light, which is provided by the LEDs and PDs. A small focusing effect in height is introduced in the folding mirror closest to the components, as illustrated by the arc along the bottom right corner of the cross-section shown in the left pane in FIG. 74. Other than that, the plastic light guide serves as a redirecting component to get the light across the touch area with an arrangement of mirror surfaces using total internal reflection. The curved mirror is slightly defocussed, roughly filling its corresponding diode. No draft angles are present in embodiments using a milled light guide. A consequence of the straight bezel is that the unit works when fully submerged in water, provided that it is watertight. The cross section shown in the left pane of FIG. 74 is rotated 360° to create a circularly symmetric light guide. The bezel height is 1 mm and the touch area diameter is 40 mm.

Reference is made to FIG. 75, which is an illustration of a PCB layout for a circular touch surface, in accordance with an embodiment of the present invention. FIG. 75 shows different numbers of LEDs and PDs; namely, 11 LEDs IR1-IR11 along the upper half of PCB 661, and 12 PDs PD1-PD12 along the bottom half of PCB 661. Whereas the PDs are evenly spaced, with an angular displacement of 15° between each detector and its neighbor, the LEDs are divided into four groups with an angular displacement of 14° within each group and 21° (1.5*14°) between the groups.

In the interior of PCB 661 a plurality of electronic components is provided for the proper function of the touch sensitive surface, inter alia, controller 715, which selectively activates and deactivates the LEDs and PDs.

Reference is made to FIG. 76, which is an illustration of light beams emitted by one LED detected by a plurality of PDs surrounding a circular touch surface, in accordance with an embodiment of the present invention. FIG. 76 shows a range of detected beams 332 emitted by LED IR1. As explained above, tables measuring detected intensities of non-blocked beams are prepared in order to examine which beams are not sufficiently detectable and in order to determine a threshold value, e.g., half of the expected intensity of the non-blocked beam, for the usable beams. Thus, in practice, not all beams 332 are used to detect touches by the system. For example, the IR1-PD12 beam is not used as it is detected even when the entire circular input surface is covered by an opaque object.

Reference is made to FIG. 77, which is an illustration of a network of intersecting light beams used in a circular touch surface, in accordance with an embodiment of the present invention. FIG. 77 shows all of the used beams encircled by light guide 424 in a circular touch system according to the present invention.

Figure 78:
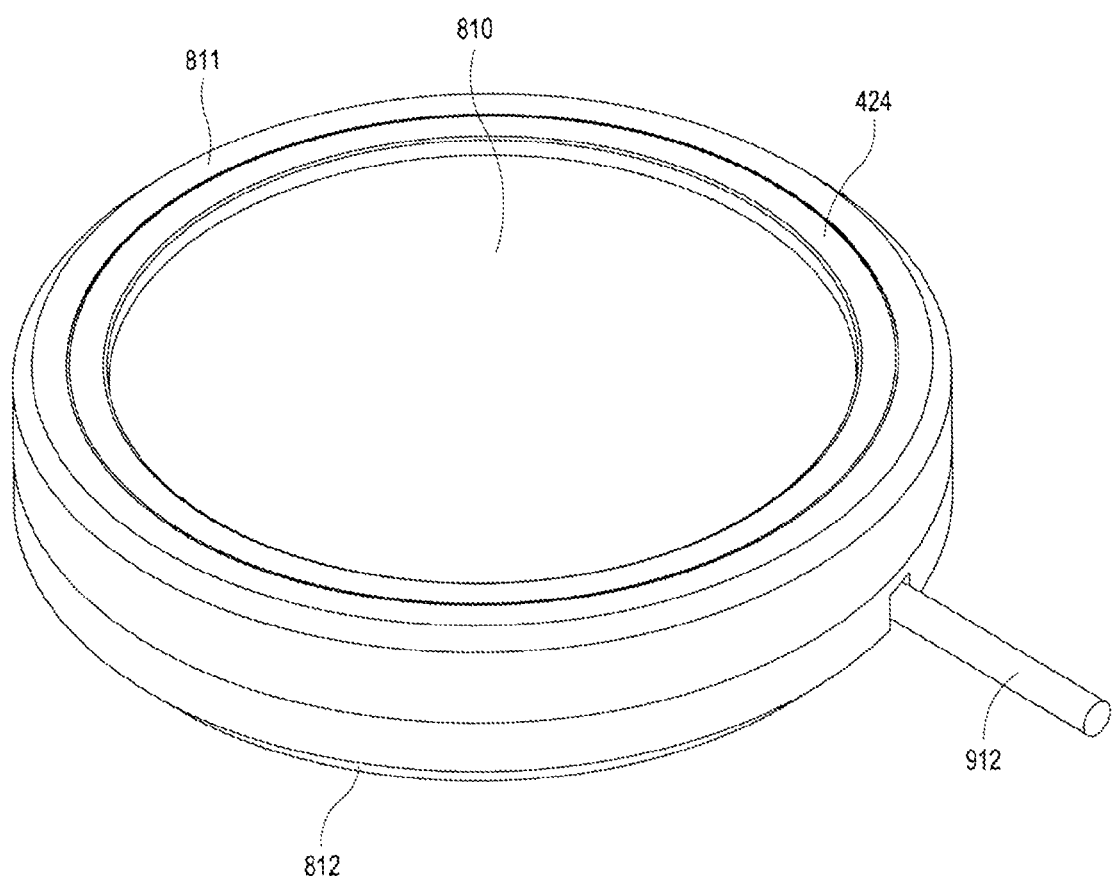
FIG. 78 is a simplified illustration of a circular touch surface sensor, in accordance with an embodiment of the present invention.

Reference is made to FIG. 78, which is a simplified illustration of a circular touch surface sensor, in accordance with an embodiment of the present invention. FIG. 78 shows a 3D model of a circular touch panel according to the present invention. A touch plate 810 is surrounded by a light guide 424. The light beams 332, shown in FIGS. 76 and 77, are projected through light guide 424. Also shown in FIG. 78 are top and bottom covers 811 and 812 and a connecting wire 912 for a haptic vibrator explained below.

Figure 79:
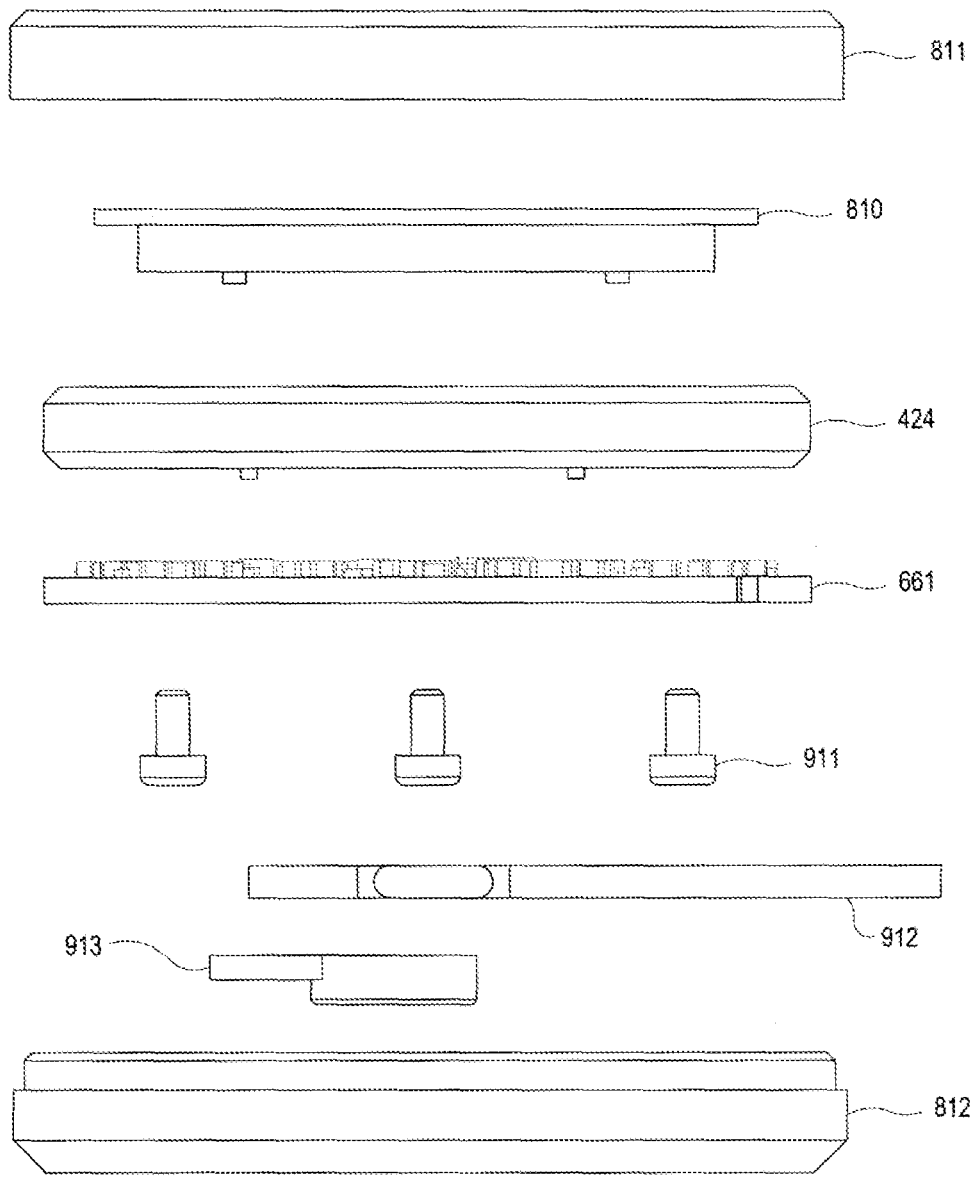
FIG. 79 is an illustration of the components used to assemble a circular touch surface, in accordance with an embodiment of the present invention.

Reference is made to FIG. 79, which is an illustration of the components used to assemble a circular touch surface, in accordance with an embodiment of the present invention. FIG. 79 shows the main components in an exemplary circular touch sensor according to the present invention, namely, front cover 811, back cover 812, touch plate 810, light guide 424, PCB 661, screws 911, haptic vibrator 913 and its cable 912.

Figure 80:
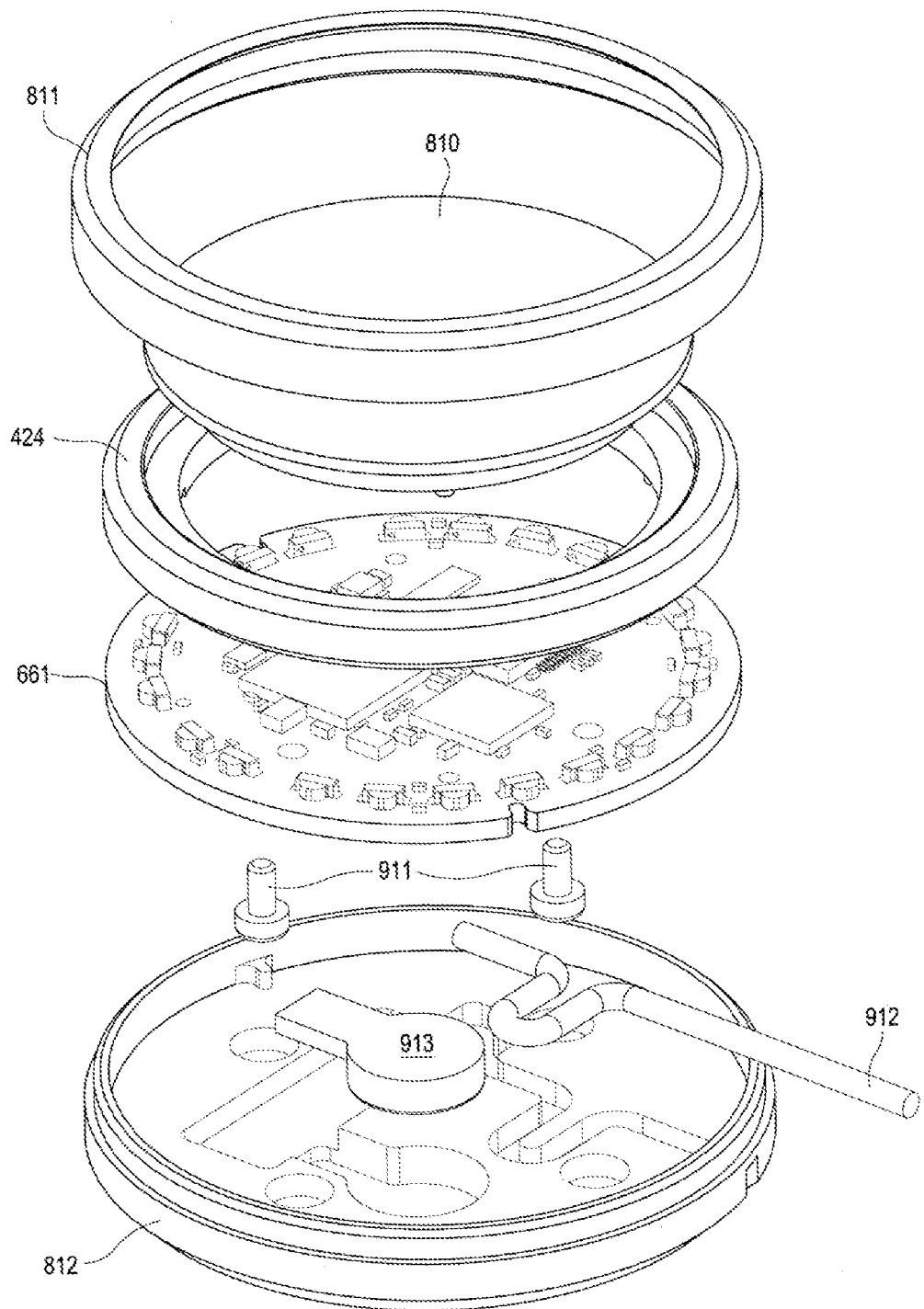
FIG. 80 is an exploded view of the circular touch surface of FIG. 78, in accordance with an embodiment of the present invention.

Reference is made to FIG. 80, which is an exploded view of the circular touch surface of FIG. 78, in accordance with an embodiment of the present invention. Front and back covers 811, 812 encase touch plate 810, light guide 424 and PCB 661. Also shown are screws 911, haptic vibrator 913 and associated cable 912 that connects the device to a host system. Haptic vibrator 913 provides tactile sensory feedback through touch plate 810 in response to touch inputs detected thereon.

Figure 81:
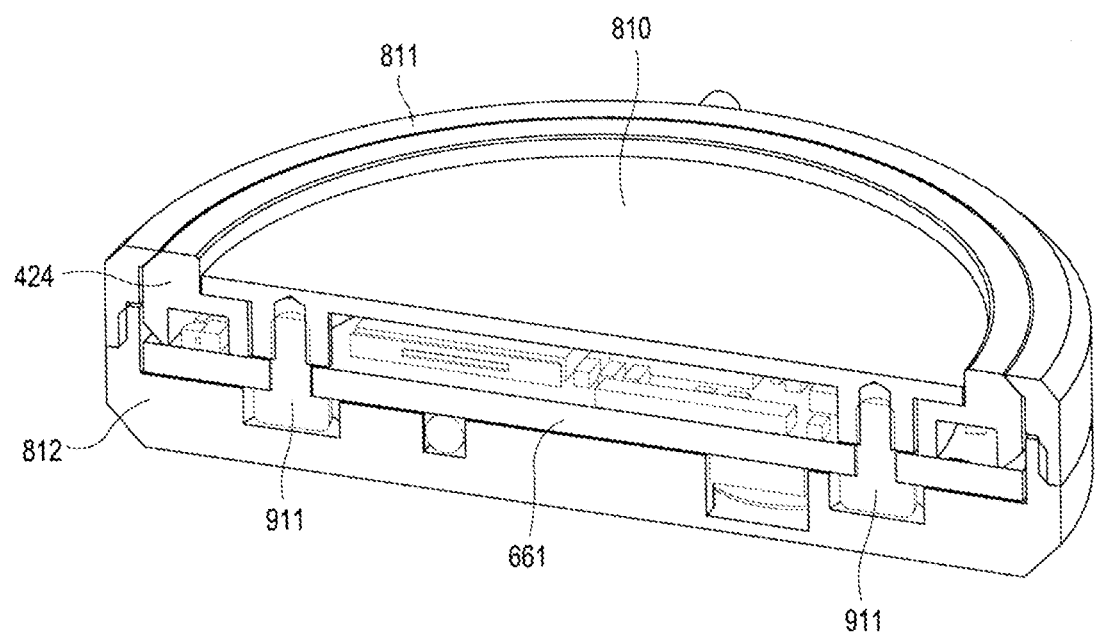
FIG. 81 is a cutaway view of the circular touch surface of FIG. 78, in accordance with an embodiment of the present invention.

Reference is made to FIG. 81, which is a cutaway view of the circular touch surface of FIG. 78, in accordance with an embodiment of the present invention. Like reference numerals in FIGS. 80 and 81 indicate the same elements. The upper rim of light guide 424 extends above touch plate 810 forming a bezel.

Figure 82:
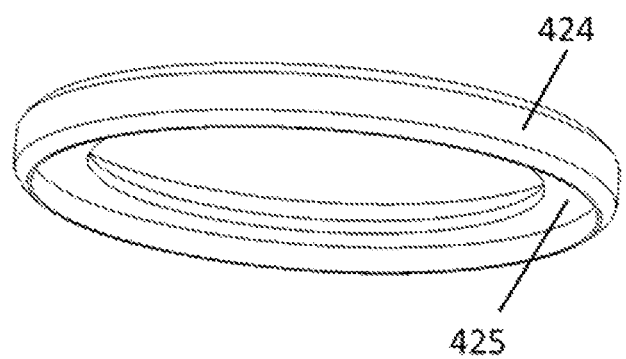
FIG. 82 is a simplified illustration of a light guide for the circular touch surface of FIG. 78, in accordance with an embodiment of the present invention.

Reference is made to FIG. 82, which is a simplified illustration of a light guide for the circular touch surface of FIG. 78, in accordance with an embodiment of the present invention. FIG. 82 shows light guide 424 with two reflective surfaces for redirecting the light beams. A light shield 421 along the inner perimeter of circular light guide 424 prevents stray light from above from hitting the light detectors.

Figure 83:
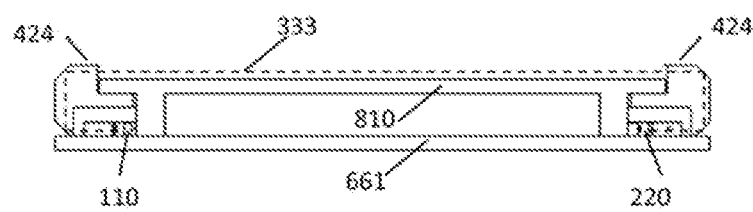
FIGS. 83 and 84 are illustrations of paths of light beams used in a circular touch surface, in accordance with an embodiment of the present invention.
Figure 84:
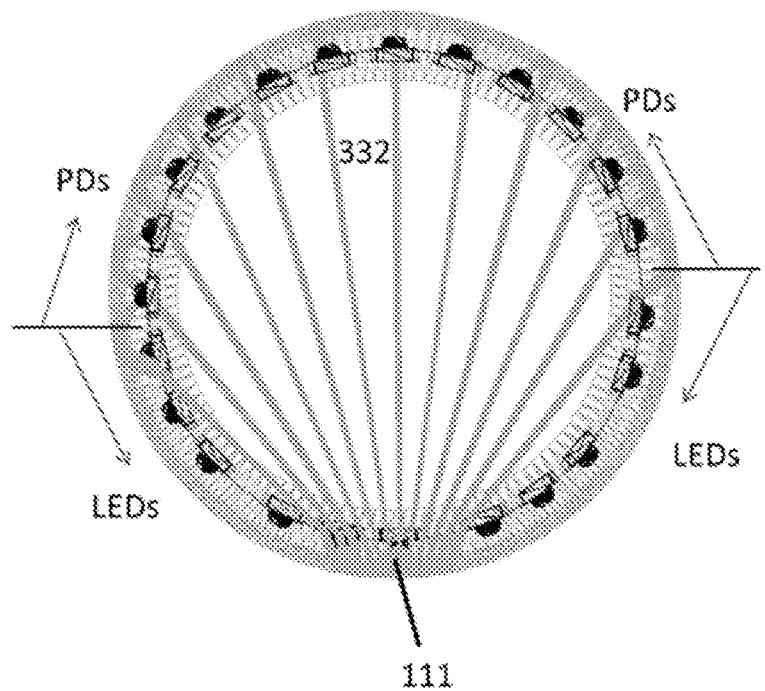

Reference is made to FIGS. 83 and 84, which illustrations of paths of light beams used in a circular touch surface, in accordance with an embodiment of the present invention. FIG. 83 shows the reflective properties of light guide 424. LED 110 and PD 220 are shown facing outward of circular light guide 424. Light beam 333 from LED 110 is projected outward into light guide 424. Two reflective facets redirect beam 333 over and across touch plate 810. Similar reflective facets at the opposite edge of plate 810 redirect beam 333 onto PD 220. Light guide 424 is optimized to spread the light such that each LED has detectable beams arriving at all, or at least at many, of the PDs.

FIG. 84 shows beams 332 from LED 111, at the center of the arc of emitters, projected onto all of the PDs. In FIG. 84, the upper half of the circular touch area is lined with 12 PDs, and the lower half of the circular touch area is lined with 11 LEDs. The multi-tiered arrangement of LEDs, whereby groups of LEDs have a different angular displacement than neighboring LEDs within a group is described above and illustrated in FIGS. 75 and 76.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

The invention claimed is:

1. A method for calculating multiple touch locations on a screen comprising:
    activating a plurality of light emitters and light detectors around the perimeter of a screen, each emitter-detector pair corresponding to a light path crossing the screen, wherein some of the light paths are blocked when one or more objects touch the screen;
    providing a look-up table, listing, for each cell from a plurality of cells, those light paths that traverse that cell when no object is touching the screen, wherein the cells partition the screen;
    for each cell:
        accessing the look-up table to identify those light paths that traverse that cell; and
        determining whether the thus-identified light paths are blocked during said activating and, if affirmative, recognizing that cell as being a touched cell; and
    combining adjacent touched cells into a common touch location, thereby calculating one or more touch locations wherein each touch location is a combination of one or more constituent touched cells.

2. The method of claim 1, wherein the cells are of different sizes.

3. The method of claim 1, wherein each cell surrounds a point of intersection between two light paths.

4. The method of claim 1, further comprising calculating an area for each touch location according to the sum of the areas of that touch location's constituent cells.

5. The method of claim 4, further comprising:
    providing a range of values for the area of a touch location; and
    validating those touch locations whose calculated area is within the range.

6. The method of claim 5, further comprising associating each touch location whose calculated area exceeds the range, with a plurality of objects touching the screen at that location.

7. A method for calculating multiple touch locations on a screen comprising:
    activating a plurality of light emitters and light detectors around the perimeter of a screen, each emitter-detector pair corresponding to a light path crossing the screen, wherein some of the light paths are blocked when one or more objects touch the screen;
    providing a look-up table, listing, for each light path, those cells from a plurality of cells, that are traversed by that light path when no object is touching the screen, wherein the cells partition the screen;
    for each light path that is not blocked during said activating, accessing the look-up table to identify those cells that the identified light path traverses, and recognizing the thus-identified cells as being untouched cells;

classifying those cells that are not recognized as being untouched cells, as being touched cells; and combining adjacent touched cells into a common touch location, thereby calculating one or more touch locations wherein each touch location is a combination of one or more constituent cells.

8. The method of claim 7, wherein the cells are of different sizes.

9. The method of claim 7, wherein each cell surrounds a point of intersection between two light paths.

10. The method of claim 7, further comprising calculating an area of each touch location according to the sum of the areas of that touch location's constituent cells.

11. The method of claim 10, further comprising:

providing a range of values for the area of a touch location; and validating those touch locations whose calculated area is within the range.

12. The method of claim 11, further comprising associating each touch location whose calculated area exceeds the range with a plurality of objects touching the screen at that location.

* * * * *